US011408572B2

(12) United States Patent
Lim et al.

(10) Patent No.: US 11,408,572 B2
(45) **Date of Patent: *Aug. 9, 2022**

(54) LUMINAIRES UTILIZING OPTICAL WAVEGUIDE

(71) Applicant: IDEAL Industries Lighting LLC, Racine, WI (US)

(72) Inventors: Jin Hong Lim, Durham, NC (US); Curt Progl, Raleigh, NC (US); Kurt Wilcox, Libertyville, IL (US); Steve Wilcenski, Cary, NC (US); Zongjie Yuan, Libertyville, IL (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,978

(22) Filed: Apr. 24, 2019

(65) Prior Publication Data

US 2019/0250324 A1 Aug. 15, 2019

Related U.S. Application Data

(60) Division of application No. 15/192,979, filed on Jun. 24, 2016, now Pat. No. 10,317,608, and a (Continued)

(51) Int. Cl.

*G02B 6/24* (2006.01)
*F21S 8/08* (2006.01)

(Continued)

(52) U.S. Cl.

CPC ............... *F21S 8/088* (2013.01); *F21S 8/086* (2013.01); *F21V 5/00* (2013.01); *F21V 21/116* (2013.01);

(Continued)

(58) Field of Classification Search

None

See application file for complete search history.

(56) References Cited

U.S. PATENT DOCUMENTS

| | | | |
|---|---|---|---|
| 3,372,740 A | 3/1968 | Kastovich et al. |
| 5,676,457 A | 10/1997 | Simon |

(Continued)

FOREIGN PATENT DOCUMENTS

| | | | |
|---|---|---|---|
| JP | 3384483 B2 | 3/2003 |
| WO | 2014145283 A1 | 9/2014 |

OTHER PUBLICATIONS

Supplementary European Search Report, corresponding to EP 17763756.8, dated Sep. 22, 2019, 12 pgs.

(Continued)

*Primary Examiner* — Chad H Smith

(74) *Attorney, Agent, or Firm* — Withrow & Terranova, P.L.L.C.

(57) ABSTRACT

A lighting device comprises a body of optically transmissive material exhibiting a total internal reflection characteristic, the body further comprising a light input surface for receiving light, a light extraction portion spaced from the light input surface, a light transmission portion disposed between the light input surface and the light extraction portion, and at least one light deflection surface for deflecting light toward the light extraction portion. Further in accordance with this aspect the light extraction portion comprises a first extraction surface for extracting light deflected by the at least one light deflection surface out of the body and a second extraction surface for extracting light other than light deflected by the at least one light deflection surface out of the body.

22 Claims, 47 Drawing Sheets

Related U.S. Application Data continuation-in-part of application No. PCT/US2014/030017, filed on Mar. 15, 2014, and a continuation-in-part of application No. 14/485,609, filed on Sep. 12, 2014, now Pat. No. 9,952,372, which is a continuation-in-part of application No. 15/060,306, filed on Mar. 3, 2016, now Pat. No. 9,841,154, and a continuation-in-part of application No. 15/060,354, filed on Mar. 3, 2016, now Pat. No. 9,835,317, which is a continuation-in-part of application No. 14/657,988, filed on Mar. 13, 2015, now Pat. No. 9,709,725, which is a continuation-in-part of application No. 29/496,754, filed on Jul. 16, 2014, now Pat. No. Des. 764,091.

(60) Provisional application No. 62/005,965, filed on May 30, 2014, provisional application No. 62/025,436, filed on Jul. 16, 2014, provisional application No. 62/025,905, filed on Jul. 17, 2014, provisional application No. 62/301,559, filed on Feb. 29, 2016, provisional application No. 62/301,572, filed on Feb. 29, 2016, provisional application No. 62/005,963, filed on May 30, 2014, provisional application No. 62/025,436, filed on Jul. 16, 2014, provisional application No. 62/025,905, filed on Jul. 17, 2014.

(51) Int. Cl.

| | |
|---|---|
| ***F21V 21/116*** | (2006.01) |
| ***F21V 8/00*** | (2006.01) |
| ***G02B 6/26*** | (2006.01) |
| ***G02B 6/30*** | (2006.01) |
| ***G02B 6/32*** | (2006.01) |
| ***G02B 6/34*** | (2006.01) |
| ***F21V 5/00*** | (2018.01) |
| *F21V 29/51* | (2015.01) |
| *F21Y 113/13* | (2016.01) |
| *F21Y 115/10* | (2016.01) |
| *F21W 131/103* | (2006.01) |

(52) U.S. Cl.

CPC ......... *G02B 6/0006* (2013.01); *G02B 6/0016* (2013.01); *G02B 6/0021* (2013.01); *G02B 6/0031* (2013.01); *G02B 6/0035* (2013.01); *G02B 6/0036* (2013.01); *G02B 6/0045* (2013.01); *G02B 6/0055* (2013.01); *G02B 6/24* (2013.01); *G02B 6/262* (2013.01); *G02B 6/305* (2013.01); *G02B 6/32* (2013.01); *G02B 6/34* (2013.01); *F21V 29/51* (2015.01); *F21W 2131/103* (2013.01); *F21Y 2113/13* (2016.08); *F21Y 2115/10* (2016.08)

(56) References Cited

U.S. PATENT DOCUMENTS

| | | | |
|---|---|---|---|
| 5,839,823 A | 11/1998 | Hou et al. | |
| 5,863,113 A | 1/1999 | Oe et al. | |
| 6,193,383 B1 | 2/2001 | Onikiri et al. | |
| 6,443,594 B1 | 9/2002 | Marshall et al. | |
| 6,554,451 B1 | 4/2003 | Keuper | |
| 6,971,781 B2 | 12/2005 | Guy | |
| 7,006,097 B2 | 3/2006 | Hulse | |
| 7,090,370 B2 | 8/2006 | Clark et al. | |
| 7,488,093 B1 | 2/2009 | Huang et al. | |
| 7,534,013 B1 | 5/2009 | Simon | |
| 7,563,011 B2 | 7/2009 | Hatjasalo et al. | |
| 7,566,159 B2 | 7/2009 | Oon et al. | |
| 7,593,615 B2 | 9/2009 | Chakmakjian et al. | |
| 7,628,508 B2 | 12/2009 | Kita et al. | |
| 7,635,205 B2 | 12/2009 | Yu et al. | |
| 7,641,363 B1 | 1/2010 | Chang et al. | |
| 7,736,019 B2 | 6/2010 | Shimada et al. | |
| 7,810,960 B1 | 10/2010 | Soderman et al. | |
| 7,813,131 B2 | 10/2010 | Liang | |
| 8,113,687 B2 | 2/2012 | Villard et al. | |
| 8,277,106 B2 | 10/2012 | Van Gorkom et al. | |
| 8,287,152 B2 | 10/2012 | Gill | |
| 8,317,366 B2 | 11/2012 | Dalton et al. | |
| 8,353,606 B2 | 1/2013 | Jeong | |
| 8,382,387 B1 | 2/2013 | Sandoval | |
| 8,408,737 B2 | 4/2013 | Wright et al. | |
| 8,419,224 B2 | 4/2013 | Wan-Chih et al. | |
| 8,425,071 B2 | 4/2013 | Ruud et al. | |
| 8,434,892 B2 | 5/2013 | Zwak et al. | |
| 8,434,893 B2 | 5/2013 | Boyer et al. | |
| 8,475,010 B2 | 7/2013 | Vissenberg et al. | |
| 8,485,684 B2 | 7/2013 | Lou et al. | |
| 8,547,022 B2 | 10/2013 | Summerford et al. | |
| 8,567,983 B2 | 10/2013 | Boyer et al. | |
| 8,573,823 B2 | 11/2013 | Dau et al. | |
| 8,593,070 B2 | 11/2013 | Wang et al. | |
| 8,750,671 B1 | 6/2014 | Kelly et al. | |
| 9,099,592 B2 | 8/2015 | Derryberry et al. | |
| 10,317,608 B2 * | 6/2019 | Lim | G02B 6/0036 |
| 2006/0209563 A1 | 9/2006 | Hirota et al. | |
| 2007/0076435 A1 * | 4/2007 | Chang | G02B 6/0038 362/626 |
| 2007/0115569 A1 | 5/2007 | Tang et al. | |
| 2008/0002399 A1 | 1/2008 | Villard et al. | |
| 2010/0110335 A1 * | 5/2010 | Viala | G02F 1/133615 349/64 |
| 2010/0238671 A1 | 9/2010 | Catone et al. | |
| 2010/0301360 A1 | 12/2010 | Van De Ven et al. | |
| 2010/0302783 A1 | 12/2010 | Shastry et al. | |
| 2011/0044022 A1 | 2/2011 | Ko et al. | |
| 2011/0233568 A1 | 9/2011 | An et al. | |
| 2011/0267659 A1 * | 11/2011 | Kawano | H04N 1/02835 358/474 |
| 2011/0305027 A1 | 12/2011 | Ham | |
| 2011/0317436 A1 | 12/2011 | Kuan | |
| 2012/0020066 A1 * | 1/2012 | Chang | G02B 6/001 362/217.05 |
| 2012/0026728 A1 | 2/2012 | Lou et al. | |
| 2012/0062105 A1 | 3/2012 | Li et al. | |
| 2012/0152490 A1 | 6/2012 | Wen et al. | |
| 2012/0287654 A1 | 11/2012 | He et al. | |
| 2012/0287677 A1 | 11/2012 | Wheatley et al. | |
| 2012/0307496 A1 | 12/2012 | Phillips, III et al. | |
| 2013/0003363 A1 | 1/2013 | Lu et al. | |
| 2013/0128593 A1 | 5/2013 | Luo | |
| 2013/0170210 A1 | 7/2013 | Athalye | |
| 2013/0215612 A1 | 8/2013 | Garcia | |
| 2013/0242231 A1 * | 9/2013 | Kurata | G02B 6/0018 349/65 |
| 2013/0250584 A1 | 9/2013 | Wang et al. | |
| 2013/0258709 A1 | 10/2013 | Thompson et al. | |
| 2013/0265761 A1 | 10/2013 | Kinnune et al. | |
| 2013/0300310 A1 | 11/2013 | Hu | |
| 2013/0343045 A1 | 12/2013 | Lodhie et al. | |
| 2013/0343055 A1 | 12/2013 | Eckert et al. | |
| 2013/0343079 A1 | 12/2013 | Unger et al. | |
| 2014/0029257 A1 | 1/2014 | Boyer et al. | |
| 2014/0140091 A1 | 5/2014 | Vasylyev | |
| 2014/0211502 A1 | 7/2014 | Keller et al. | |
| 2014/0211504 A1 | 7/2014 | Yuan et al. | |
| 2014/0313777 A1 | 10/2014 | Wang He | |
| 2015/0055369 A1 | 2/2015 | Tarsa et al. | |
| 2015/0055371 A1 | 2/2015 | Van De Ven et al. | |
| 2015/0160396 A1 | 6/2015 | Wilcox et al. | |
| 2015/0253488 A1 | 9/2015 | Wilcox et al. | |
| 2015/0285461 A1 | 10/2015 | Xiaolu | |
| 2016/0047969 A1 | 2/2016 | Lim et al. | |

OTHER PUBLICATIONS

Supplementary European Search Report, corresponding to EP 17816329.1, dated Oct. 22, 2019, 9 pgs.

(56) References Cited

OTHER PUBLICATIONS

Communication Pursuant to Article 94(3), corresponding to European Patent application No. 17779482.3, dated Jun. 16, 2020, 5 pages.
Examination Report for European Patent Application No. 17763756.8, dated Oct. 29, 2020, 6 pages.
Examination Report for European Patent Application No. 17763756.8, dated Jun. 9, 2021, 7 pages.
Extended European Search Report for European Patent Application No. 17779482.3, dated Sep. 17, 2019, 6 pages.
Examination Report for European Patent Application No. 17779482.3, dated Apr. 23, 2021, 5 pages.
Examination Report for European Patent Application No. 17816329.1, dated Nov. 19, 2020, 4 pages.
International Search Report and Written Opinion for International Patent Application No. PCT/US2017/039101, dated Nov. 8, 2017, 10 pages.
International Search Report and Written Opinion for International Patent Application No. PCT/US17/20014, dated Apr. 20, 2017, 12 pages.
Non-Final Office Action for U.S. Appl. No. 15/192,979, dated Jul. 13, 2018, 7 pages.
Notice of Allowance for U.S. Appl. No. 15/192,979, dated Jan. 24, 2019, 9 pages.

* cited by examiner

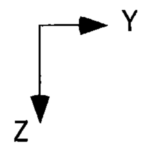
Fig. 16C
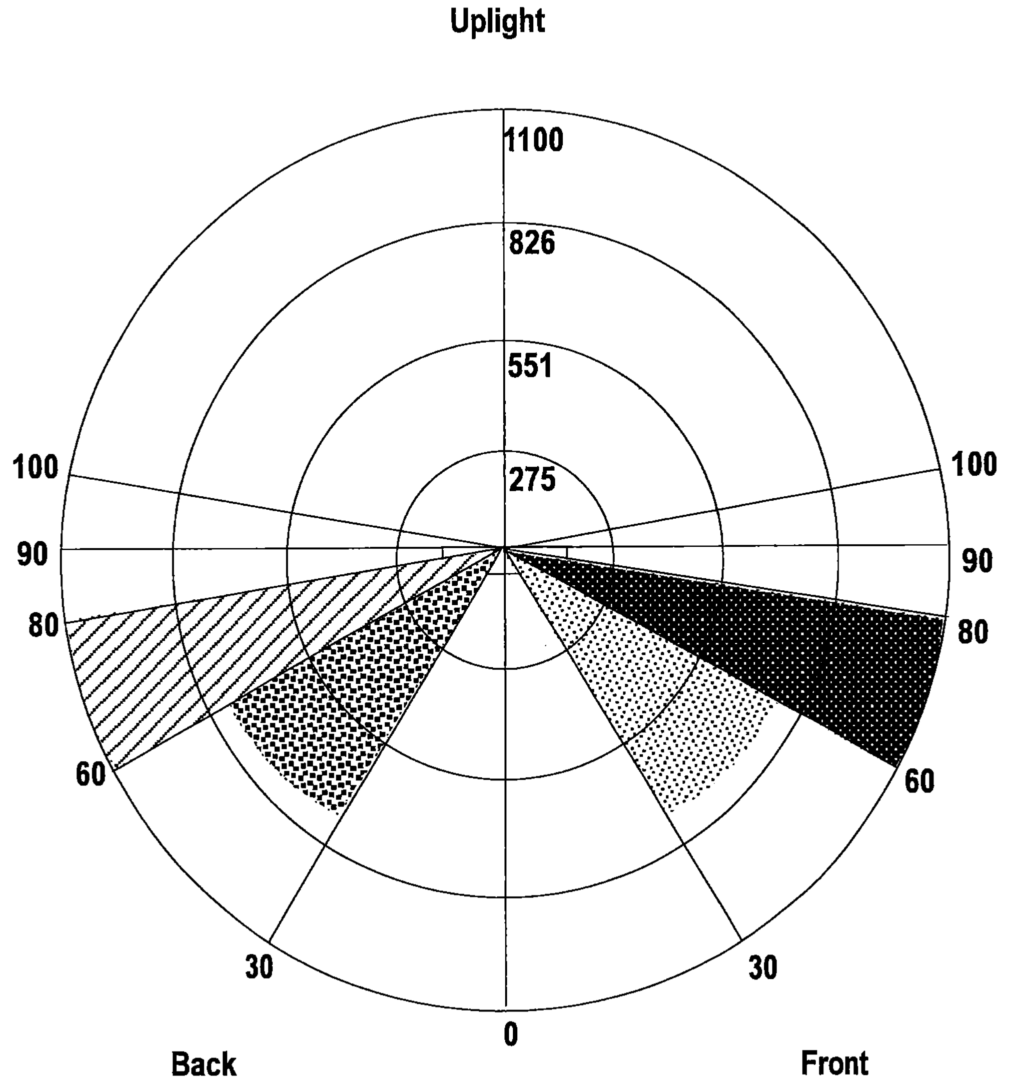

102

LUMINAIRES UTILIZING OPTICAL WAVEGUIDE

CROSS-REFERENCE TO RELATED APPLICATION

The present application is a divisional application of U.S. application Ser. No. 15/192,979, filed on Jun. 24, 2016, which is a continuation-in-part of International Application No. PCT/US2014/30017, filed Mar. 15, 2014, entitled "Optical Waveguide Body", and further comprises a continuation-in-part of U.S. patent application Ser. No. 14/485,609, filed Sep. 12, 2014, entitled "Luminaire Utilizing Waveguide" (Now U.S. Pat. No. 9,952,372; issued Apr. 24, 2018), which claims the benefit of U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", and U.S. Provisional Patent Application No. 62/025,905, filed Jul. 17, 2014, entitled "Luminaire Utilizing Waveguide", all owned by the assignee of the present application and the disclosures of which are incorporated by reference herein. The present application further comprises a continuation-in-part of U.S. patent application Ser. No. 14/657,988, filed Mar. 13, 2015, entitled "Luminaire Utilizing Waveguide" (Now U.S. Pat. No. 9,709,725; issued Jul. 18, 2017), which claims the benefit of U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", and U.S. Provisional Patent Application No. 62/025,905, filed Jul. 17, 2014, entitled "Luminaire Utilizing Waveguide", all owned by the assignee of the present application and the disclosures of which are incorporated by reference herein. The present application further comprises a continuation-in-part of U.S. Design patent application Ser. No. 29/496,754, filed Jul. 16, 2014, entitled "Roadway Luminaire" (Now U.S. Pat. No. D764,091; issued Aug. 16, 2016), and further comprises a continuation-in-part of U.S. patent application Ser. No. 15/060,354, filed Mar. 3, 2016, entitled "Luminaire Utilizing Waveguide"(Now U.S. Pat. No. 9,835,317; issued Dec. 5, 2017), and further comprises a continuation-in-part of U.S. patent application Ser. No. 15/060,306, filed Mar. 3, 2016, entitled "Luminaire Utilizing Light Emitting Diodes" (Now U.S. Pat. No. 9,841,154; issued Dec. 12, 2017), and further claims the benefit of U.S. Provisional Patent Application No. 62/301,559, filed Feb. 29, 2016, entitled "Luminaire Utilizing Waveguide", and further claims the benefit of U.S. Provisional Patent Application No. 62/301,572, filed Feb. 29, 2016, entitled "Luminaire Utilizing Light Emitting Diodes", all owned by the assignee of the present application and the disclosures of which are incorporated by reference herein.

REFERENCE REGARDING FEDERALLY SPONSORED RESEARCH OR DEVELOPMENT

Not applicable

SEQUENTIAL LISTING

Not applicable

FIELD OF THE DISCLOSURE

The present subject matter relates to optical devices, and more particularly, to luminaries utilizing an optical waveguide.

BACKGROUND

An optical waveguide mixes and directs light emitted by one or more light sources, such as one or more light emitting diodes (LEDs). A typical optical waveguide includes three main components: one or more coupling elements or optics, one or more distribution elements, and one or more extraction elements. The coupling element(s) or optic(s) direct light into the distribution element(s), and condition the light to interact with the subsequent components. The one or more distribution elements control how light flows through the waveguide and have characteristics dependent on the waveguide geometry and material. The extraction element(s) determine how light is removed by controlling where and in what direction the light exits the waveguide.

When designing a coupling optic, the primary considerations are: maximizing the efficiency of light transfer from the light source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that comprises the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance, light traveling through a waveguide is reflected back into the waveguide from an outer surface thereof, provided that the incident light does not exceed a particular angle with respect to the surface tangent or, equivalently, fall below a certain angle with respect to a surface normal.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Smith U.S. Pat. Nos. 7,083,313 and 7,520,650 disclose a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors out of from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

In some applications such as roadway, street, or parking lot lighting, it may be desirable to illuminate certain regions surrounding a light fixture while maintaining relatively low illumination of neighboring regions thereof. For example, along a roadway, it may be preferred to direct light in an x-dimension parallel with the roadway while minimizing illumination in a y-dimension toward roadside houses. Alternatively, symmetrical 360 degree illumination may be desirable. In the further alternative, asymmetrical 360 illumination may also be desirable.

SUMMARY

According to one aspect, a lighting device comprises a body of optically transmissive material exhibiting a total internal reflection characteristic, the body further comprising a light input surface for receiving light, a light extraction portion spaced from the light input surface, a light transmission portion disposed between the light input surface and the light extraction portion, and at least one light deflection surface for deflecting light toward the light extraction portion. Further in accordance with this aspect the light extraction portion comprises a first extraction surface for extracting light deflected by the at least one light deflection surface out of the body and a second extraction surface for extracting light other than light deflected by the at least one light deflection surface out of the body.

According to another aspect, a lighting device comprises a body of optically transmissive material exhibiting a total internal reflection characteristic, the body further comprising a light input surface for receiving light in a first direction, a light extraction portion spaced from the light input surface, and a light transmission portion at least partially surrounding the light extraction portion and disposed between the light input surface and the light extraction portion. Further in accordance with this aspect, the light extraction portion comprises at least two spaced surfaces for directing light out of the body in a second direction comprising a directional component opposite the first direction.

According to still another aspect, a lighting device comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion. Further regarding this aspect, the body comprises a width dimension, a length dimension, and a thickness dimension wherein the light extraction portion comprises first and second light reflecting surfaces disposed in a first thickness portion of the body and first and second light extraction surfaces disposed in a second thickness portion of the body for receiving light reflected off the first and second light reflecting surfaces and for directing light out of the body in a second direction comprising a directional component opposite the first direction.

According to yet another aspect, a lighting device comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion. Further, in accordance with this aspect, the light extraction portion comprises a light extraction feature including a surface for directing light out of the body in a second direction comprising a directional component opposite the first direction and a portion for directing light out of the body in a direction comprising a directional component along the first direction.

According to another aspect, a luminaire comprises a body of optically transmissive material exhibiting a total internal reflection characteristic, the body further comprising a light input surface for receiving light in a first direction, a light extraction portion spaced from the light input surface, and a light transmission portion at least partially surrounding the light extraction portion. Further regarding this aspect, the body comprises a width dimension, a length dimension, and a thickness dimension wherein the light input surface is disposed on one side of the light extraction portion and the light extraction portion comprises a light extraction feature for extracting light through a light output surface in exit directions comprising directional components along the first direction and opposite the first direction. Further still in accordance with this aspect, a luminaire housing comprises a mounting apparatus that mounts the body in an orientation such that the length and width extend in substantially horizontal directions and the thickness dimension extends in a substantially vertical direction.

According to another aspect, a luminaire comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion and at least partially surrounding the light extraction portion. Further according to this aspect, the body comprises a width dimension, a length dimension, and a thickness dimension wherein the light input surface is disposed on one side of the light extraction portion and the light extraction portion comprises a light extraction feature for extracting light through a light output surface in exit directions comprising directional components along the first direction and opposite the first direction. Still further regarding this aspect, a luminaire housing comprising a mounting apparatus that mounts the body in an orientation such that at least one of the length and width dimensions has a substantially vertical directional component and the thickness dimension extends in a substantially horizontal direction.

According to yet another aspect, a lighting device comprises a body of optically transmissive material exhibiting a total internal reflection characteristic, the body further comprising a light input surface for receiving light in a first direction from at least one LED, a light extraction feature comprising a light extraction surface and a light reflecting surface, and a light redirection feature configured to receive light from said input surface. Also according to this aspect, the light reflection surface of the light extraction feature is configured to receive light from the light redirection feature and reflect the light from the light redirection feature to the light extracting surface for extraction from the body in a second direction comprising a directional component opposite the first direction. Still further according to this aspect, the light reflection surface of the light extraction feature is configured to extract light other than the light from the light redirection feature from the body in a direction comprising a directional component along the first direction.

Other aspects and advantages of the present invention will become apparent upon consideration of the following detailed description and the attached drawings wherein like numerals designate like structures throughout the specification.

BRIEF DESCRIPTION OF THE DRAWINGS

FIG. 16C is a chart depicting luminous flux of the light distribution of FIG. 16B;

DETAILED DESCRIPTION

Referring to FIGS. 1-5 an embodiment of a lighting device in the form of a luminaire 100 that utilizes an optical waveguide is illustrated. FIGS. 1-5 illustrate an embodiment of the luminaire 100. The embodiments disclosed herein are particularly adapted for use in general lighting applications, for example, as an outdoor roadway (including a driveway) or parking lot luminaire, or as any other indoor or outdoor luminaire Embodiments of the luminaire 100 may comprise any one of a number of different embodiments of waveguide bodies 102. Accordingly, the housing and generally mechanical components of the luminaire 100 are described in detail once herein, while the waveguide body embodiments 102 are separately described. Further, post top luminaire embodiments 300, 300*a*, 300*b* are described hereinbelow, each embodiment thereof also utilizing any of the embodiments of the waveguide bodies 102. Embodiments of the waveguide bodies 102 described herein may be interchangeably swapped one for another within the luminaire 100 and/or the post top luminaire(s) 300, 300*a*, 300*b*.

Figure 1:
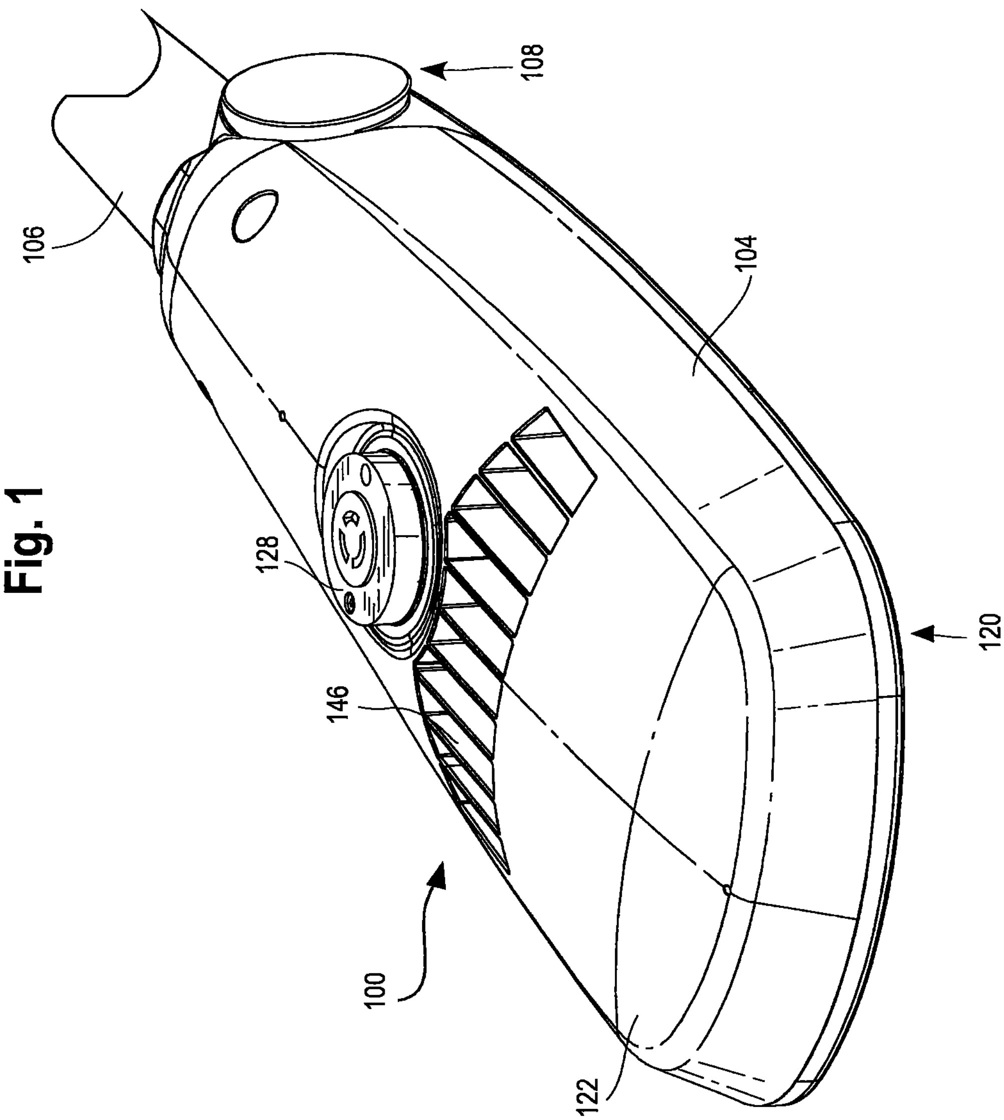
FIG. 1 is an isometric view from above of a luminaire.
Figure 2:
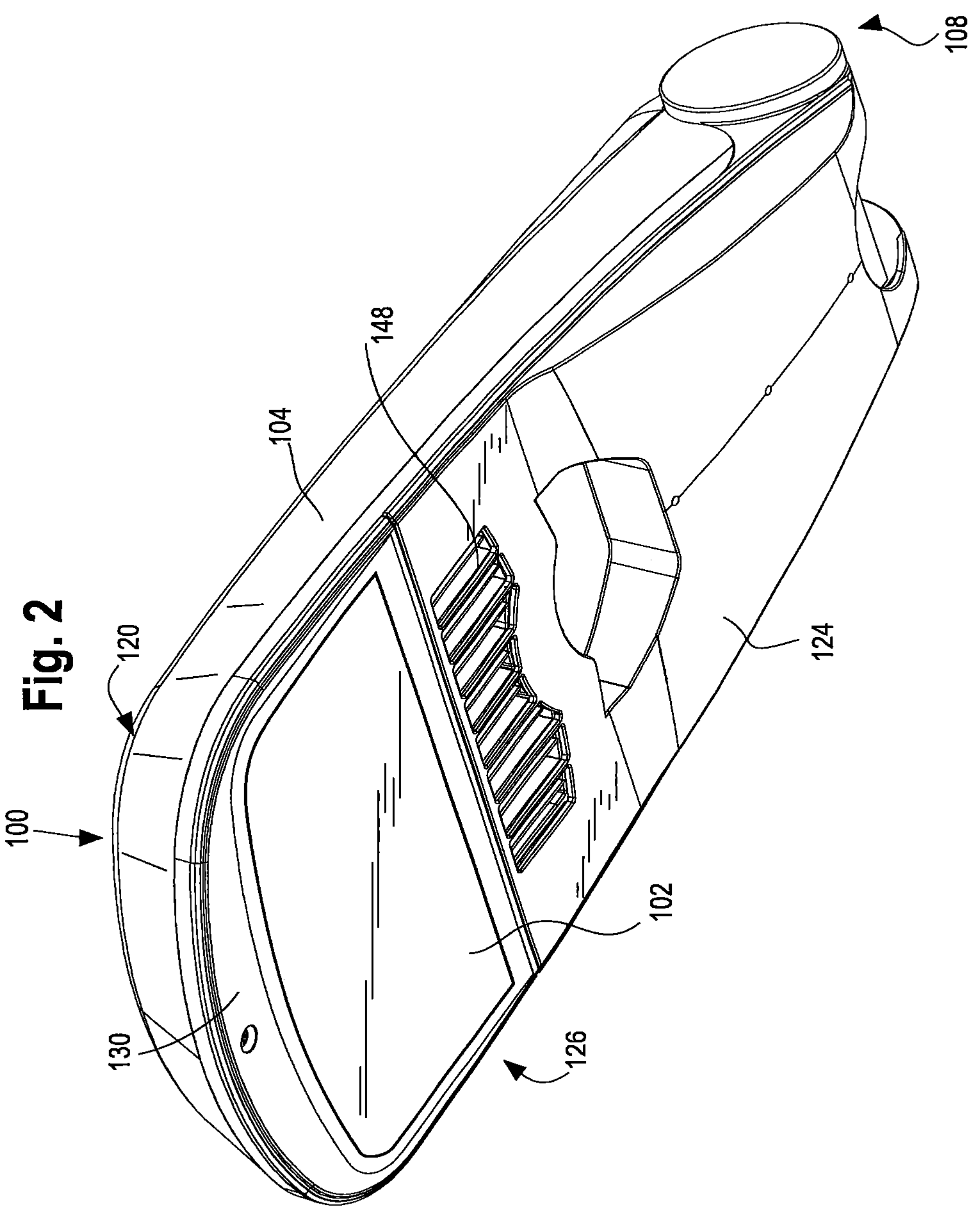
FIG. 2 is an isometric view from below of the luminaire of FIG. 1.
Figure 3:
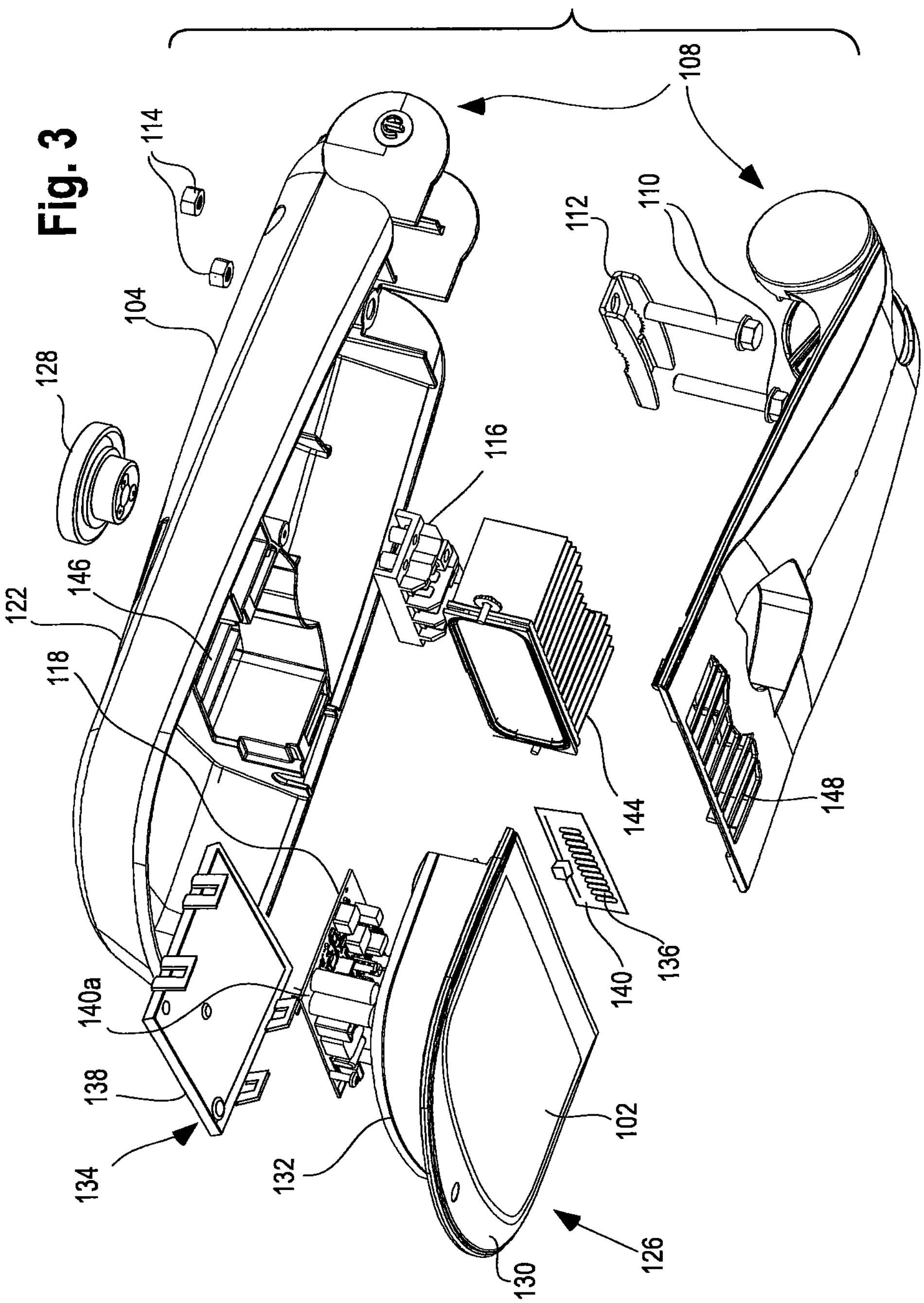
FIG. 3 is an exploded isometric view of the luminaire of FIG. 1.
Figure 4:
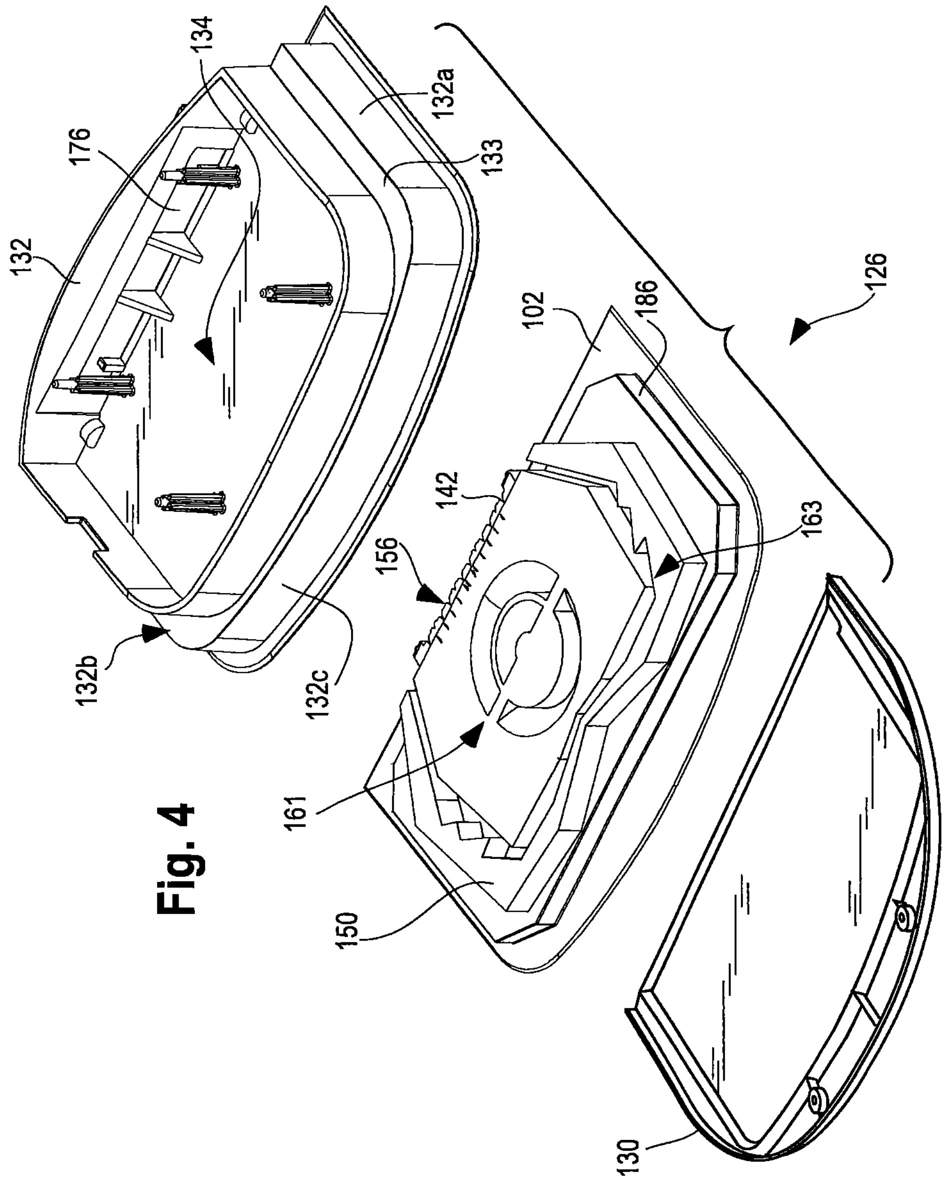
FIG. 4 is a partial exploded fragmentary isometric view from above of an optical assembly portion of FIG. 1.
Figure 5:
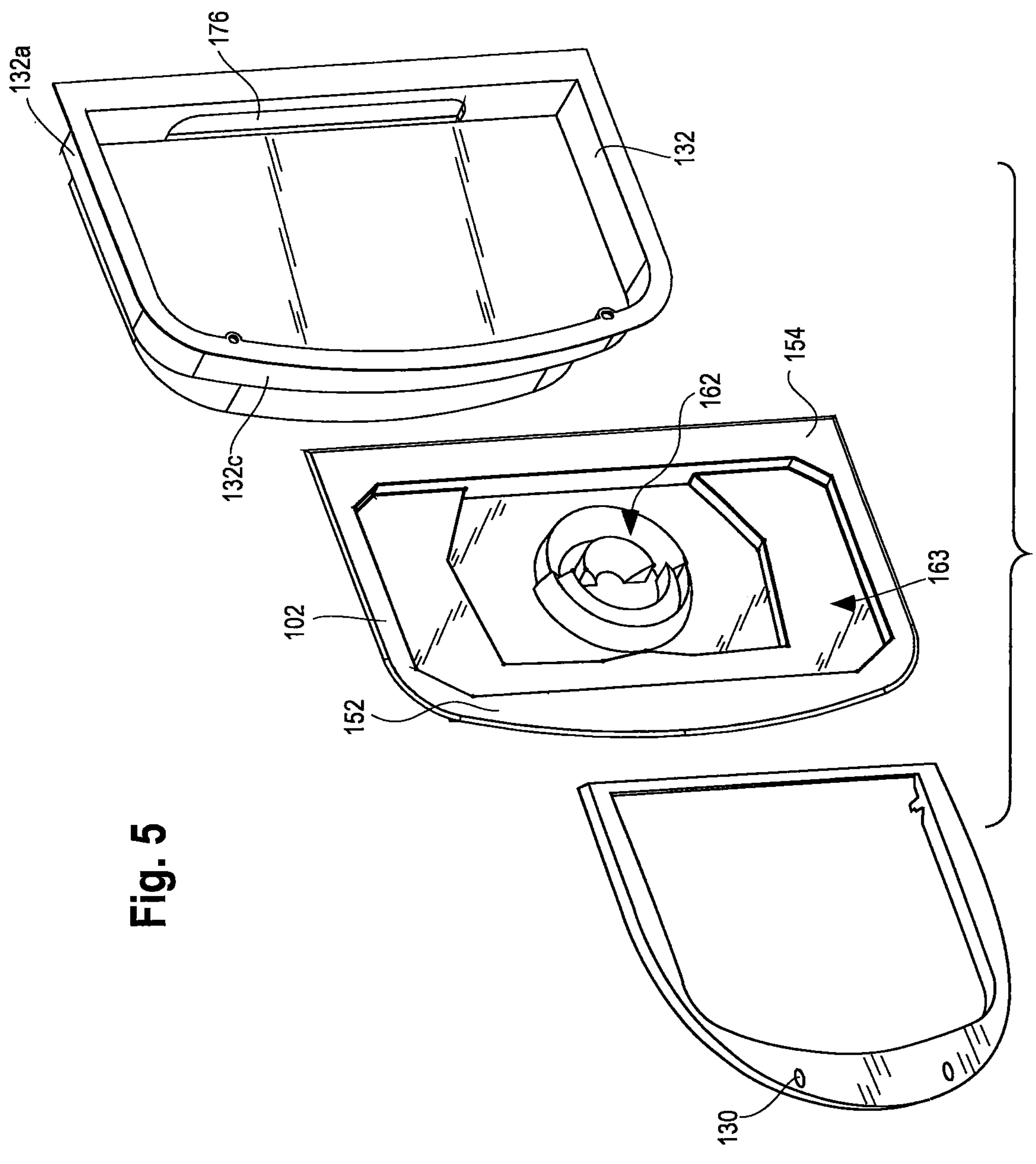
FIG. 5 is a partial exploded fragmentary isometric view from below of the optical assembly portion of FIG. 1.

The luminaire 100 includes a housing 104 adapted to be mounted on a stanchion or post 106. With reference to FIG. 3, the housing 104 includes a mounting portion 108 that is sized to accept an end of any of a number of conventional stanchions. Fasteners 110, such as threaded bolts, extend through apertures in side portions of fastening brackets 112 (only one of which is visible in FIG. 3) and are engaged by threaded nuts 114 disposed in blind bores in an upper portion of the housing 104. The stanchion 106 may be captured between the fastening brackets 112 and a lower surface of the upper portion of the housing to secure the luminaire 100 in a fixed position on the end of the stanchion 106. The housing 104 may alternatively be secured to the stanchion 106 by any other suitable means.

Referring to FIG. 3, electrical connections (i.e., line, ground, and neutral) are effectuated via a terminal block 116 disposed within the mounting portion 108. Wires (not shown) connect the terminal block 116 to an LED driver circuit 118 in the housing 104 to provide power thereto as noted in greater detail hereinafter.

Referring still to FIGS. 1-5, the luminaire 100 includes a head portion 120 comprising an upper cover member 122, a lower door 124 secured in any suitable fashion to the upper cover member 122, respectively, and an optic assembly 126 retained in the upper cover member 122. A sensor 128 may be disposed atop the mounting portion 108 for sensing ambient light conditions or other parameters and a signal representative thereof may be provided to the LED driver circuit 118 in the housing 104.

Figure 6:
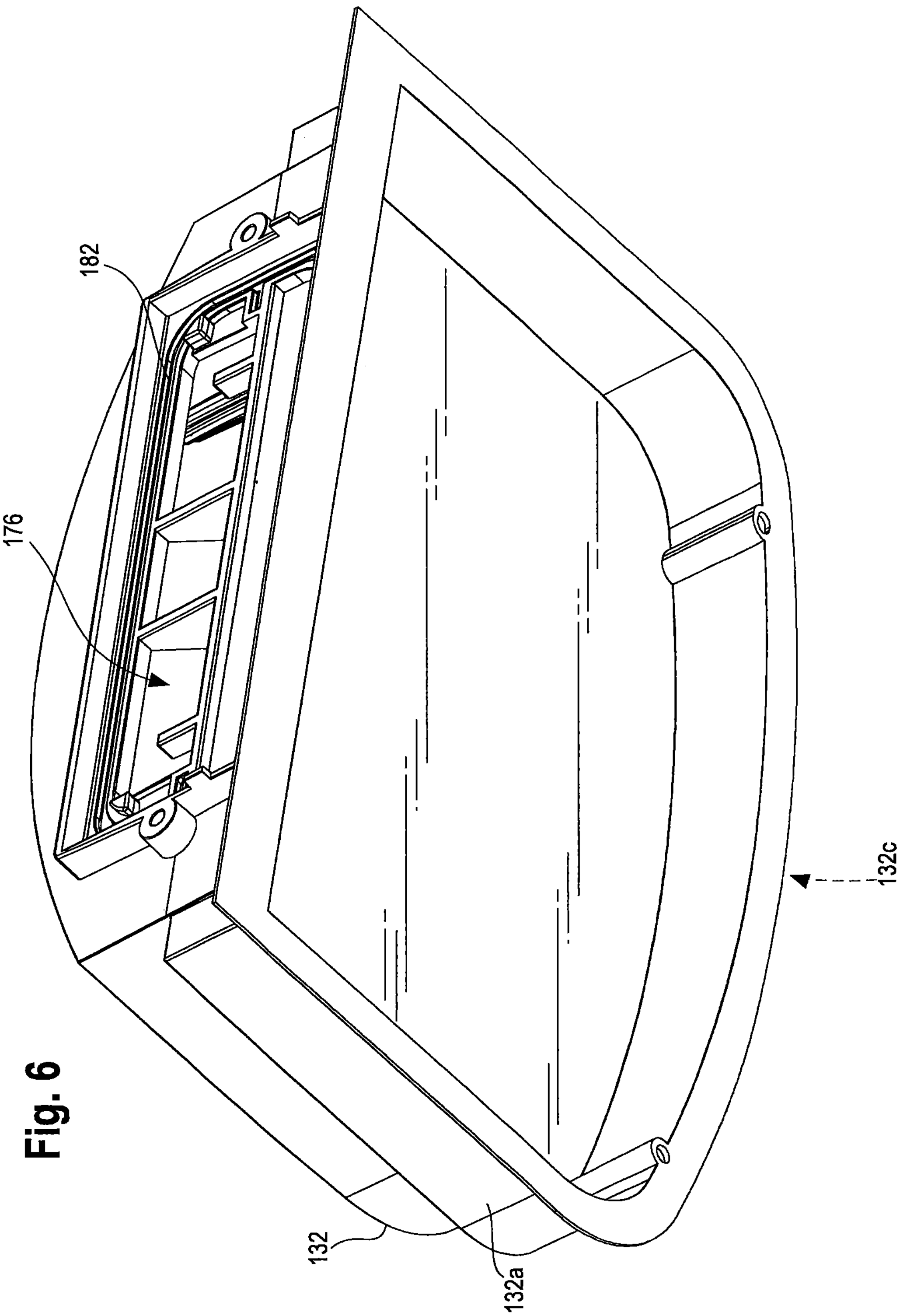
FIG. 6 is an isometric view from below of an embodiment of an optical enclosure.
Figure 7:
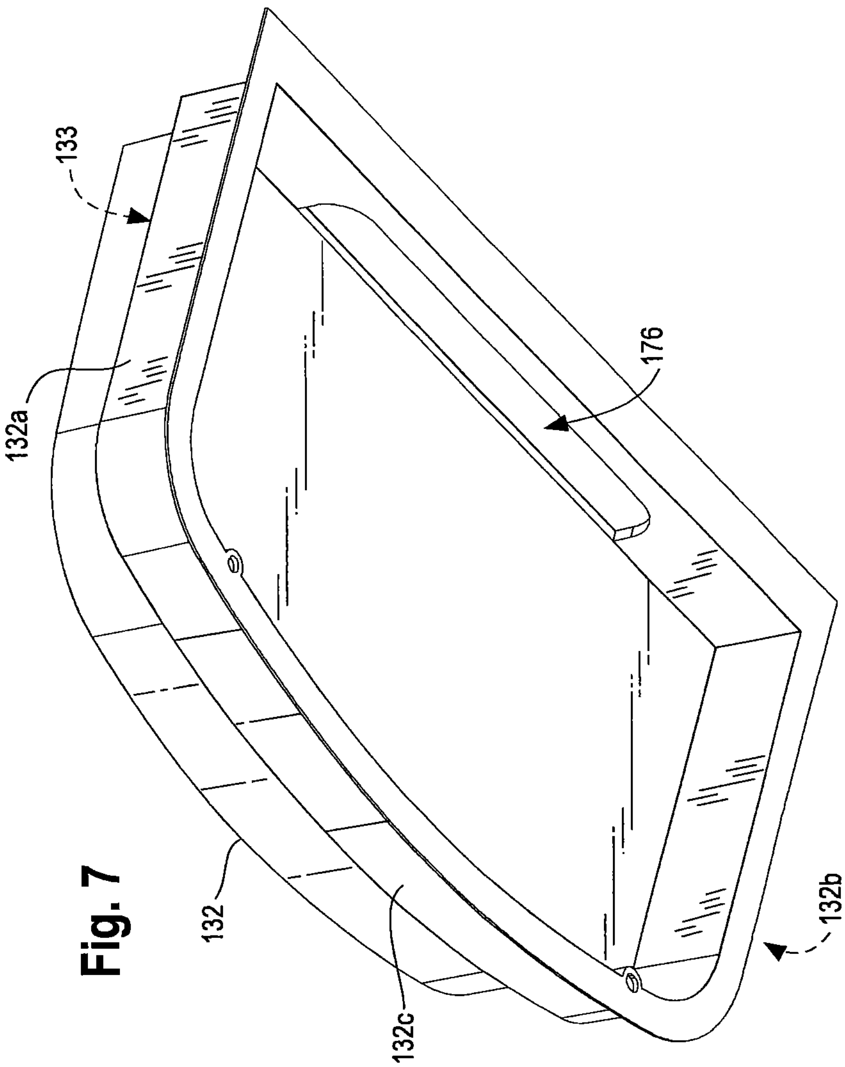
FIG. 7 is an isometric view from below of the optical enclosure of FIG. 6.
Figure 8:
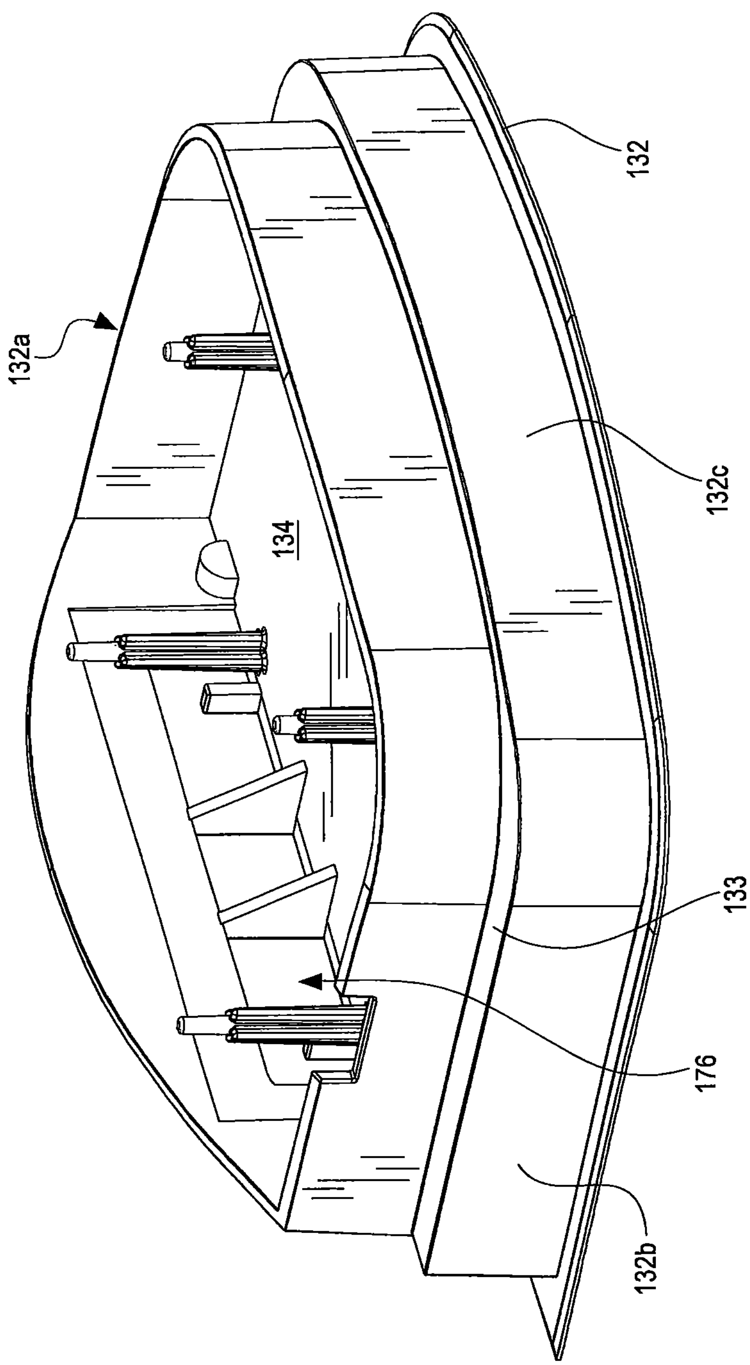
FIG. 8 is an isometric view from above of the optical enclosure of FIG. 6.

Referring next to FIGS. 3-5 and 8-10, the optic assembly 126 comprises an optical waveguide body 102 made of the materials specified hereinbelow or any other suitable materials, a surround member 130, and a reflective enclosure member 132. The interior of the reflective enclosure member 132 is flat, as shown in further views of the reflective enclosure member 132 in FIGS. 6-8. Referring once again to FIGS. 3-5 and 8-10, a circuit housing or compartment 134 with a cover is disposed atop the reflective enclosure member 132, and the driver circuit 118 is disposed in the circuit compartment 134. LED elements 136 are disposed on one or more printed circuit boards (PCBs) 140 and extend into coupling cavities or features 142 (FIGS. 15, 24, and 25) of the waveguide body 102, as noted in greater detail hereinafter. A heat exchanger 144 is disposed behind the one or more PCB(s) 140 to dissipate heat through vents that extend through the luminaire 100 and terminate at upper and lower openings 146, 148. In addition, the terminal block 116 is mounted adjacent the heat exchanger 144 and permits electrical interconnection between the driver circuit 118 and electrical supply conductors (not shown).

The LED elements 136 receive suitable power from the driver circuit 118, which may comprise a SEPIC-type power converter and/or other power conversion circuits mounted on a further printed circuit board 140*a*. The printed circuit board 140*a* may be mounted by suitable fasteners and location pins within the compartment 134 above the reflective enclosure member 132. The driver circuit 118 receives power over wires that extend from the terminal block 116.

Referring next to FIGS. 11-15, an embodiment of the optical waveguide body 102 includes a top surface 150, a bottom surface 152 forming a part of a substrate 154, and a light coupling portion 156 comprising at least one, and, more preferably, a plurality of light input surfaces 164 defining coupling cavities or features 142 extending into the waveguide body 126 from a coupling end surface 158. A total internal reflection section or interior transmission portion 206 is preferably disposed between the light input surface(s) 164 and a light extraction portion 163 and preferably at least partially surrounds the light extraction portion 163. Specifically, surface elements comprising a number of light reflection and redirection elements 161 (described below) are disposed atop the substrate 154 and define the top surface 150. Further surface elements comprising first and second depressed planar surfaces 160*a*, 160*b*, are arranged such that the second surface 160*b* partially surrounds the first surface 160*a*, and a plurality of curved light refraction and extraction features 162 (FIGS. 9, 10, 13 and 14) may be disposed on the bottom surface 152. Alternatively, the bottom surface 152 may be textured or smooth and/or polished, or some combination thereof. LED elements (see FIG. 15) 136 comprising individual LED light sources are disposed in or adjacent each of the plurality of light coupling cavities 142 as described in greater detail below.

The substrate 154 may be integral with the surface elements disposed on either the top surface 150 or bottom surface 152, or one or more of the surface elements may be separately formed and placed on or otherwise disposed and retained relative to the substrate 154, as desired. The substrate 154 and some or all of the surface elements may be made of the same or different materials. Further, some or all portions of some or all of the embodiments of the waveguide body 102 is/are made of suitable optical materials, such as one or more of acrylic, air, polycarbonate, molded silicone, glass, cyclic olefin copolymers, and a liquid (including water and/or mineral oils), and/or combinations thereof, possibly in a layered arrangement, to achieve a desired effect and/or appearance.

The light developed by the LEDs 136 travels through the waveguide body 102 and is redirected down and out of the waveguide body 102 at varying angles by the redirection and reflection features 161 disposed on the top surface 150 to be described in detail below, and is emitted out the bottom or emission surface 152 of the waveguide body 102.

Figure 11:
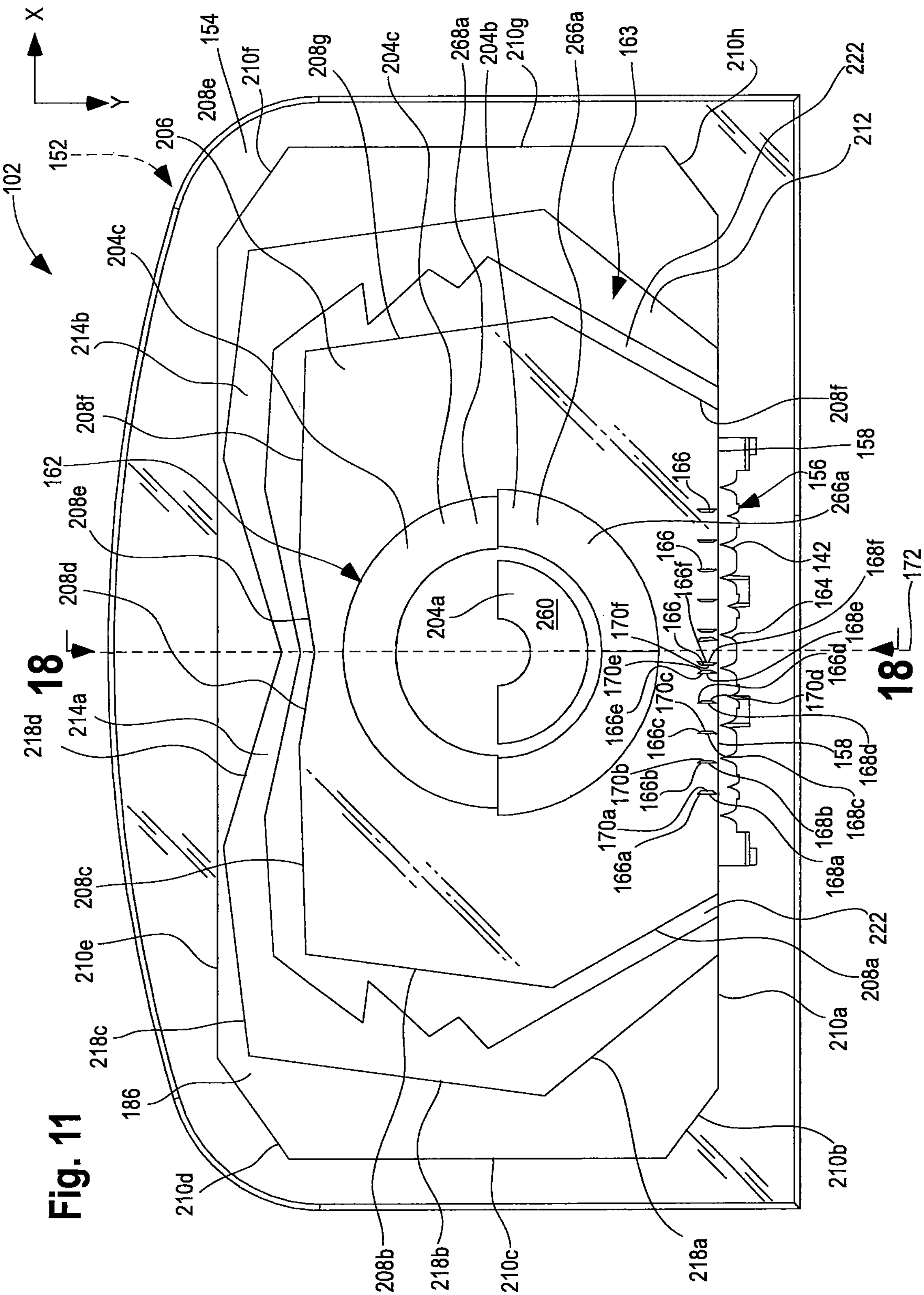
FIG. 11 is a plan view of a waveguide body.
Figure 13:
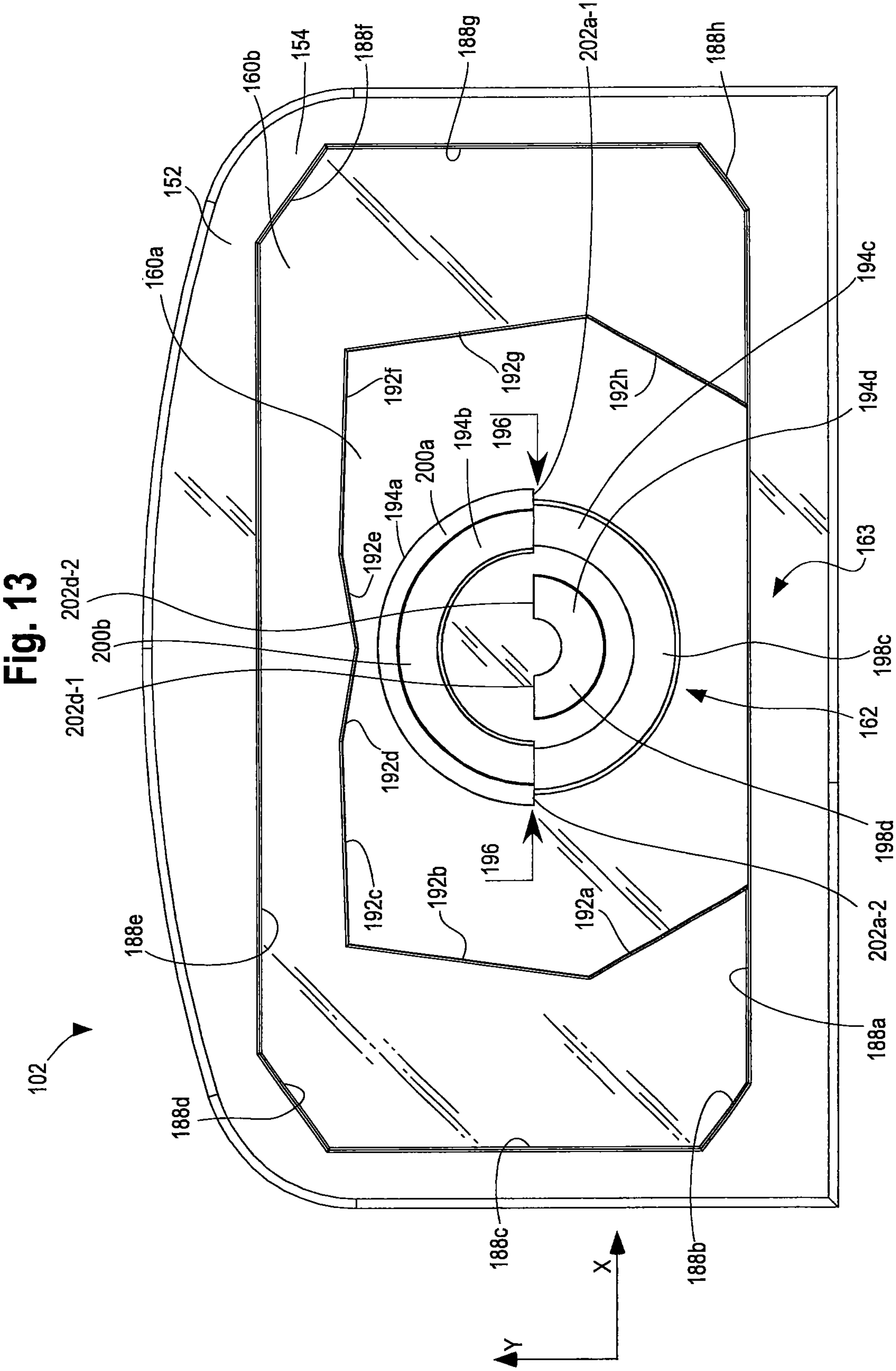
FIG. 13 is a bottom elevational view of the waveguide body of FIG. 11.

The curved light refraction and extraction features 162 on the bottom surface 152, which may comprise two pairs of curved concentric or eccentric ridges, each ridge terminating at a plane parallel to the width (i.e., the x-dimension as indicated in FIGS. 11 and 13) of the waveguide body 102, further facilitate light extraction and assist in extracting light at desirable angles relative the emission surface 152. It should be noted that there could be a different number (including zero) of bottom surface light refraction and extraction features 162, as desired. In any event, the Lambertian or other distributions of light developed by the LED elements 136 are converted into a distribution resulting in an illumination pattern having an extent in the x-dimension and a reach in the y-dimension perpendicular to the x-dimension.

Figure 16A:
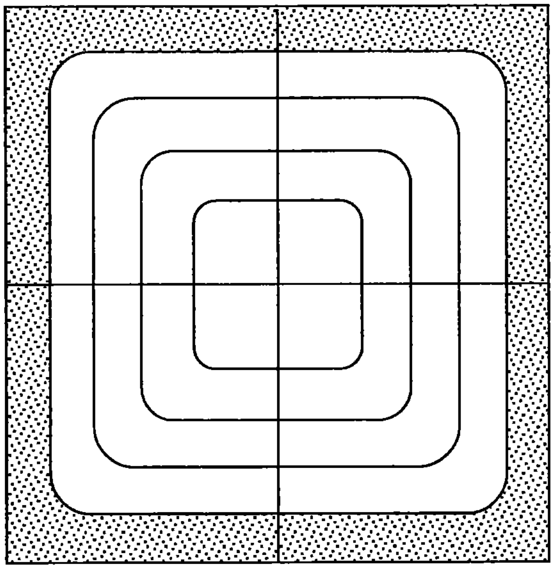
FIG. 16A is a diagram depicting an example Type 5 light distribution.
Figure 16B:
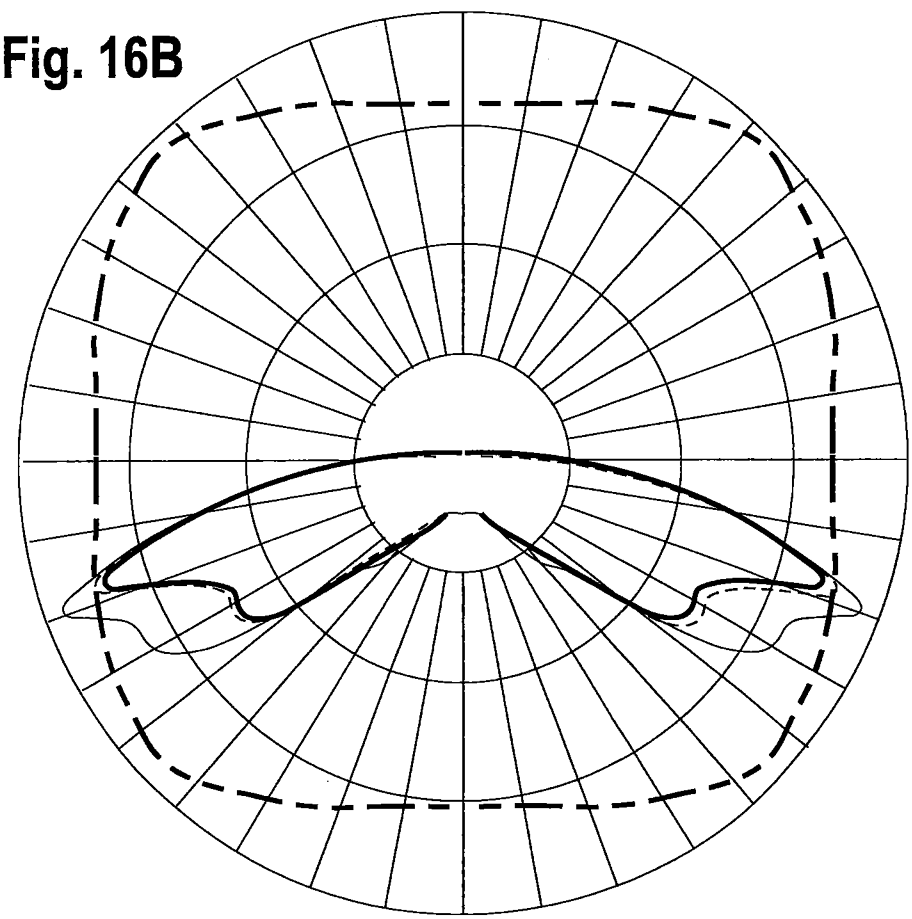
FIG. 16B is a light distribution intensity graph.

The waveguide body 102 directs light developed by the LED element(s) 136 toward a desired illumination target surface, such as a roadway. The illumination pattern may or may not be offset in the y-dimension with respect to a center of the waveguide body 102, depending upon the design of the various elements of the waveguide body 102. The extent of the illumination pattern on the target surface in the x-dimension may be greater than the width of the waveguide body 102, although this need not necessarily be the case. Preferably, the extent of the illumination pattern on the target surface in the y-dimension and the x-dimension is substantially equal, thereby creating a uniform illumination pattern such as that shown in the light pattern diagram of FIG. 16A. FIG. 16B further depicts a light intensity chart showing that light is distributed according to a substantially even pattern with respect to the front and the back of the waveguide body 102 (i.e., along the y-axis). Further, FIG. 16C is a chart depicting luminous flux of the light distribution of FIG. 16B. Any of the embodiments of the luminaire 100 and/or post top luminaire 300, 300*a*, 300*b* described herein may be used with any of the embodiments of the waveguide body 102 described hereinbelow to develop what is known in the art as a Type 5 or Type 5 Square lighting distribution. The Type 5 or Type 5 Square distribution may be preferable for general parking and/or area lighting applications. The Type 5 distribution typically has a relatively uniform illumination distribution that is generally symmetrical and circular. Alternatively, the Type 5 Square distribution has a relatively uniform square illumination distribution to provide a more defined edge for the distributed light, if suitable for a particular application. Alternatively, the embodiments may develop an asymmetric and/or offset light distribution, depending on the intended application.

As an example, the illumination pattern may be modified through appropriate modification of the light refraction and extraction features 162 on the bottom surface 152 and the light redirection or reflecting elements on the top surface 150. The waveguide bodies shown in the illustrated embodiments cause the illumination pattern on a target surface to be generally equal in extent in the y-dimension and the x-dimension, although this need not be the case. Thus, for example, the light distribution may be greater in the y-dimension than the distribution in the x-dimension, or vice versa. The overall brightness may be increased or decreased by adding or omitting, respectively, LED elements 136 and/or varying the power developed by the driver circuit 118 and delivered to the LED elements.

As should be apparent from the foregoing, the reflective enclosure member 132 is disposed above the waveguide body 102 opposite the substrate 154. The reflective enclosure member 132 includes a lower, interior surface that is coated or otherwise formed with a white or specular material. In example embodiments, the interior of the reflective enclosure member 132 is coated with Miro® brand reflector material, as marketed by ALANOD® GmbH & Co. KG of Ennepetal, Germany, or enhanced specular reflector (ESR). Further, one or more of the surfaces of the waveguide body

102 may be coated/covered with a white or specular material, e.g., outer surfaces of the light redirection or reflection features 161. Light that escapes (or which would otherwise escape) the upper surface 150 of the waveguide body 102 may be thus reflected back into the waveguide body 102 so that light is efficiently extracted out of the substrate 154. The lower surface of the reflective enclosure 132 may have other than a planar shape, such as a curved surface. In all of the illustrated embodiments, the light emitted out of the waveguide body 102 is preferably mixed such that point sources of light in the LED elements 136 are not visible to a significant extent and the emitted light is controlled and collimated to a high degree. Further, it is preferable that the emitted light be sufficiently mixed to promote even color distribution from different color LED elements 136 and/or uniformity of illumination distribution whether different color LEDs or monochromatic LEDs are used. Light mixing may be facilitated further by using curved surfaces that define one or more of the features 161, 162 as opposed to frustconical or other surfaces that are not curved in the thickness dimension.

Figure 15:
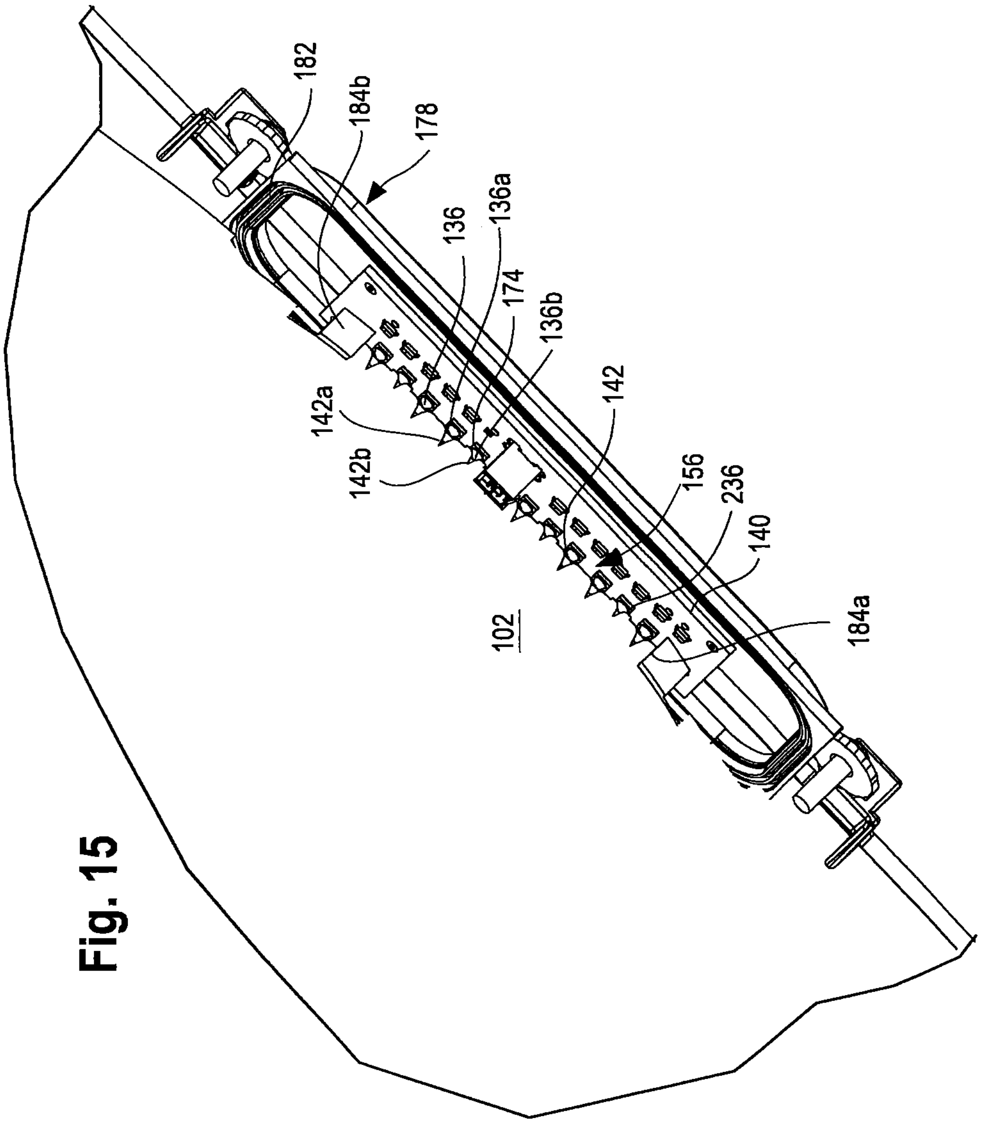
FIG. 15 is an isometric view from above of LED elements coupled to a waveguide body.
Figure 24:
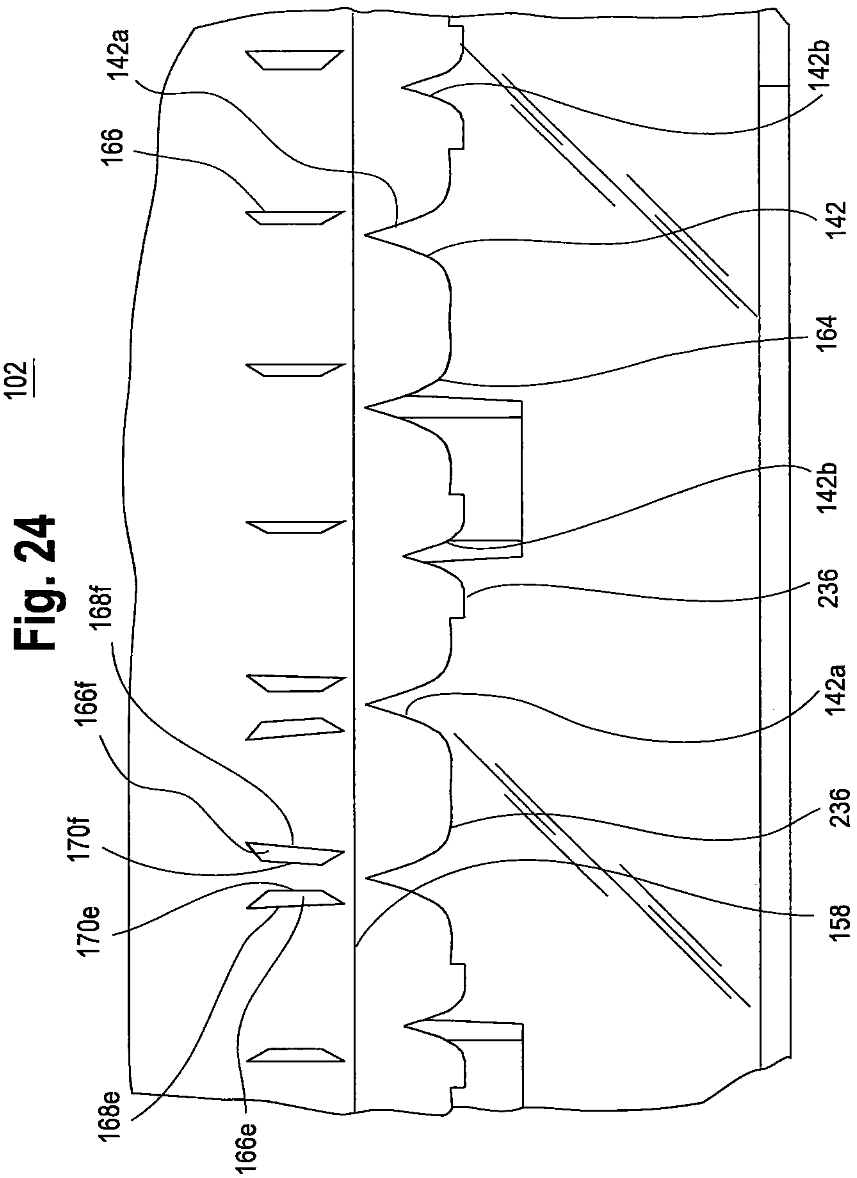
FIG. 24 is an enlarged fragmentary plan view of a parabolic coupling cavity entrance geometry.
Figure 25:
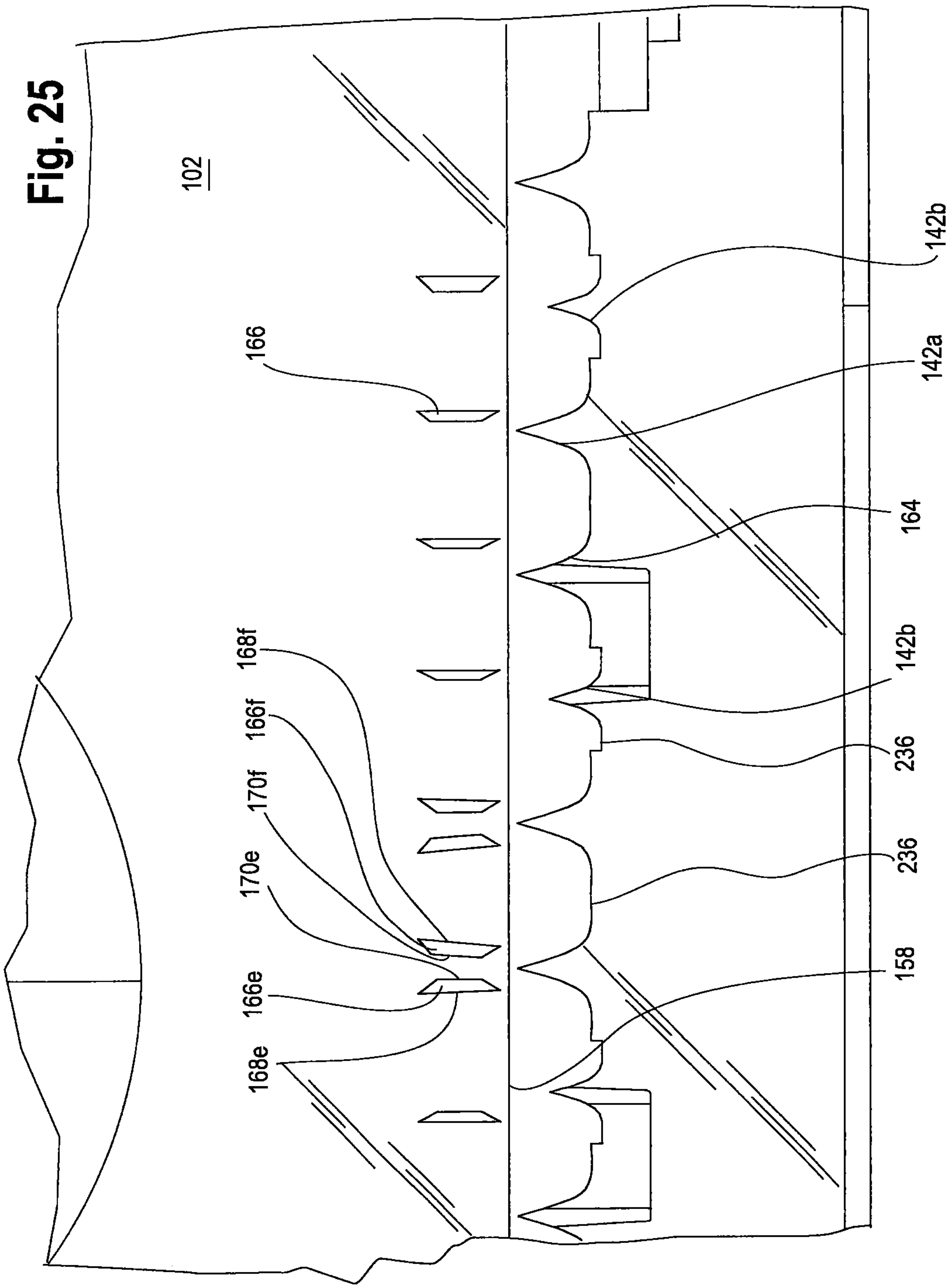
FIG. 25 is an enlarged fragmentary plan view of a wedge-shaped coupling cavity entrance geometry.

As seen in FIGS. 15, 24, and 25, each of the plurality of light coupling cavities 142 has an indentation-type shape, although variations in shape may be used to better manage the convergence or divergence of light inside the waveguide and/or to improve light extraction. Each light coupling cavity 142 is defined by the surface 164 that is substantially or generally parabolic or wedge-shaped in cross-section (as seen in a plan view transverse to the coupling end surface 158 and parallel to the top surface 150), as shown in such FIGS.

Figure 23:
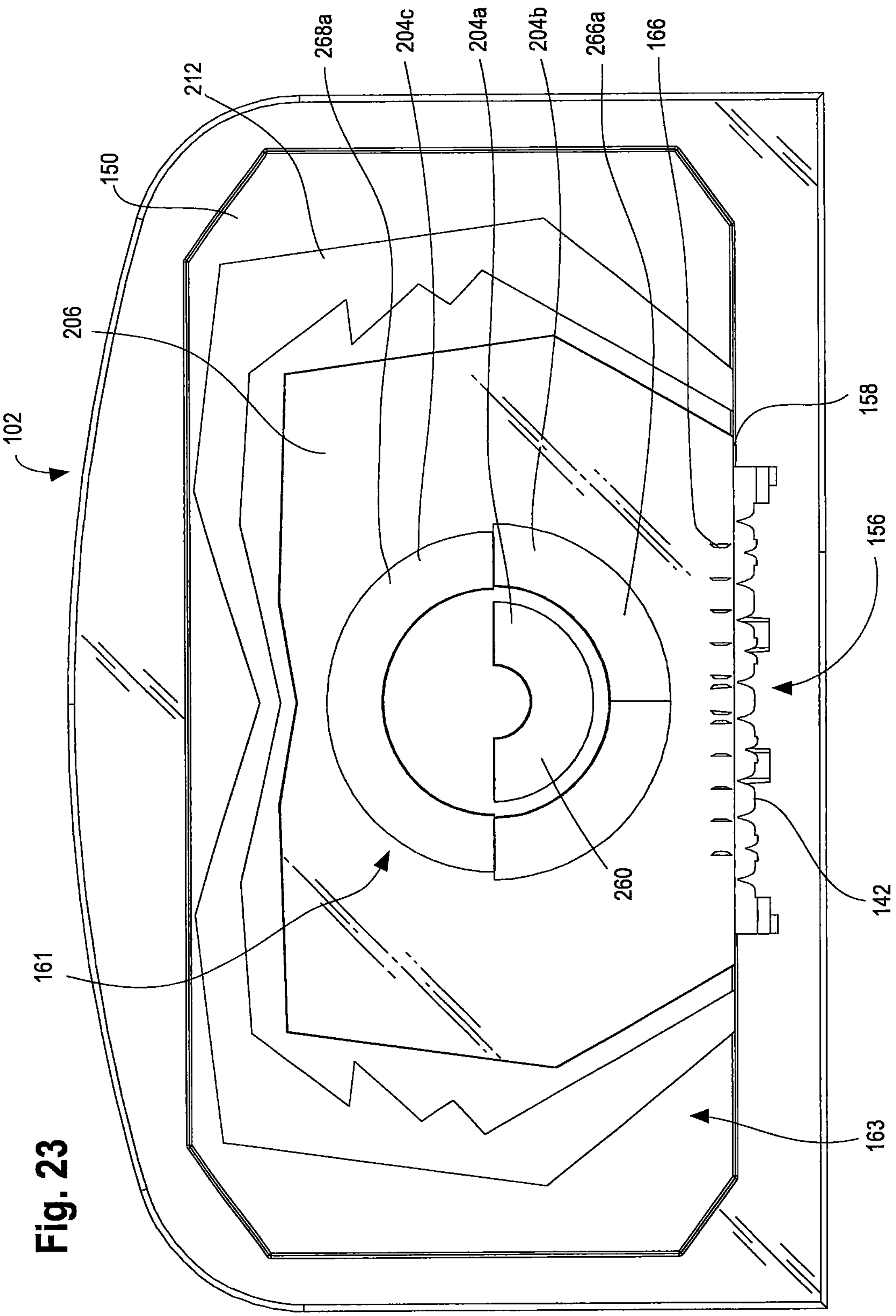
FIG. 23 is a plan view from above of an alternate embodiment of the waveguide body of FIG. 11.

FIG. 11 depicts an embodiment of the waveguide body 102 comprising coupling cavities 142 having a wedge-shaped entrance geometry. Coupling cavities 142 having a wedge-shaped entrance geometry are shown in enlarged detail in FIG. 25. Alternatively, FIG. 23 depicts an embodiment of the waveguide body 102 comprising coupling cavities 142 having a parabolic-shaped entrance geometry. Coupling cavities 142 having a parabolic-shaped entrance geometry are shown in enlarged detail in FIG. 24. The parabolic and wedge-shaped entrance geometries differ in shape at the terminal point of each coupling cavity 142. The wedge-shaped geometry of FIG. 25 has coupling cavities with wedge-shaped, sharp terminal points while the parabolic geometry of FIG. 24 has coupling cavities with curved terminal points that approximate a parabolic curve in combination with the remaining surfaces 164 of each coupling cavity 142.

Each surface 164 defining each light coupling cavity 142 may be smooth, textured, curved, or otherwise shaped to affect light mixing and/or redirection. For example, each coupling surface 164 may include spaced bumps or other features that protrude at points along a top-to-bottom extent (i.e., along a z-dimension normal to an x-y plane) of each cavity 142 in such a way as to delineate discrete coupling cavities each provided for and associated with an individual LED element 136 to promote coupling of light into the waveguide body 102 and light mixing. Such an arrangement may take any of the forms disclosed in International Application No. PCT/US14/30017, filed Mar. 15, 2014, entitled "Optical Waveguide Body," incorporated by reference herein. Furthermore, each coupling cavity 142 may have a cylindrical prism or lens coupling surface 164 with a spline-like or flexible curve shape in cross-section along a z-dimension. The spline or flexible curve of the coupling cavity surface 164 may be designed so that light rays are separated in two primary directions while being collimated.

As seen in FIG. 15, LED elements 136 are disposed within or adjacent the plurality of coupling cavities 142 of the waveguide body 102. In FIG. 15, details of the redirection and reflection feature(s) 161 are omitted from the top surface 150. Each LED element 136 may be a single white or other color LED, or each may comprise multiple LEDs either mounted separately or together on a single substrate or package to form a module including, for example, at least one phosphor-coated or phosphor-converted LED, such as a blue-shifted yellow (BSY) LED, either alone or in combination with at least one color LED, such as a green LED, a yellow LED, a red LED, etc. The LED elements 136 may further include phosphor-converted yellow, red, or green LEDs. One possible combination of LED elements 136 includes at least one blue-shifted-yellow/green LED with at least one blue-shifted-red LED, wherein the LED chip is blue or green and surrounded by phosphor. Any combination of phosphor-converted white LED elements 136, and/or different color phosphor-converted LED elements 136, and/or different color LED elements 136 may be used. Alternatively, all the LED elements 136 may be the same. The number and configuration of LEDs 136 may vary depending on the shape(s) of the coupling cavities 142. Different color temperatures and appearances could be produced using particular LED combinations, as is known in the art. In one embodiment, each light source comprises any LED, for example, an MT-G LED incorporating TrueWhite® LED technology or as disclosed in U.S. patent application Ser. No. 13/649,067, filed Oct. 10, 2012, now U.S. Pat. No. 9,818,919, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In embodiments, each light source comprises any LED such as the LEDs disclosed in U.S. Pat. No. 8,998,444, and/or U.S. Provisional Patent Application No. 62/262,414, filed Dec. 3, 2015, entitled "Solid State Light Fixtures Suitable for High Temperature Operation Having Separate Blue-Shifted-Yellow/Green and Blue-Shifted-Red Emitters" by Bergmann et al., the disclosures of which are hereby incorporated by reference herein. In another embodiment, a plurality of LEDs may include at least two LEDs having different spectral emission characteristics. If desirable, one or more side emitting LEDs disclosed in U.S. Pat. No. 8,541,795, the disclosure of which is incorporated by reference herein, may be utilized inside or at the edge of the waveguide body 102. In any of the embodiments disclosed herein the LED elements 136 preferably have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source(s).

The sizes and/or shapes of the coupling cavities 142 may differ or may all be the same. Each coupling cavity 142 extends into the waveguide body. However, an end surface 236 defining an open end of each coupling cavity 142 may not be coincident and may be offset with respect to a corresponding end surface of one or both adjacent coupling cavities. Thus, each of a first plurality of coupling cavities **142*b* has an opening at the end surface 236 thereof that is disposed farther from a center of the waveguide body 102 than corresponding openings of each of a second plurality of coupling cavities 142*a*. Furthermore, in the embodiment illustrated in FIGS. 15, 24, and 25, each of the first plurality of coupling cavities 142*a* has a depth that extends farther into the waveguide body 102 than each of the second plurality of coupling cavities 142***b*. The cavities 142*a* are therefore relatively larger than the cavities 142*b*. As seen in FIGS. 24 and 25, the relative sizes and openings of coupling cavities 142*a* and 142*b* may be retained for the parabolic and the wedge-shaped entrance geometries alike.

In the illustrated embodiment, relatively larger BSY LED elements 136*a* (FIG. 15) are aligned with the coupling cavities 142*a*, while relatively smaller red LED elements 136*b* are aligned with the coupling cavities 142*b*. The arrangement of coupling cavity shapes promotes color mixing in the event that, as discussed above, different color LED elements 136 are used and/or promotes illuminance uniformity by the waveguide body 106 regardless of whether multi-color or monochromatic LEDs are used. In any of the embodiments disclosed herein, other light mixing features may be included in or on the waveguide body 102. Thus, for example, one or more bodies of differing index or indices of refraction than remaining portions of the waveguide body 102 may extend into the waveguide body and/or be located fully within the waveguide body 102.

In particular embodiments, an example of a type of light mixing feature comprises the light mixing facets 166 shown in FIG. 11. The waveguide body 102 of FIG. 11 includes twelve facets 166 with six facets 166 on each side of a center line 172 extending along the y-dimension (at line 18-18) of the waveguide body 102. The facets 166 on each side of the center line 172 are arranged to form a mirror image of one another, therefore the facets on only one side of the waveguide body 102 will be described. The facets 166 are trapezoidal in shape such that each facet 166 has a base surface 168 and a second surface 170 parallel to the base surface 168.

Referring still to FIG. 11 and also to FIGS. 24 and 25, the embodiment therein includes five facets 166*a*, 166*b*, 166*c*, 166*d*, 166*e* having respective base surfaces 168*a*, 168*b*, 168*c*, 168*d*, 168*e* oriented away from the center line 172 while one facet 166*f* has the opposite orientation with the base surface 168*f* thereof oriented toward the center line 172. Likewise, second surfaces 170*a*-170*f* are opposite the base surfaces 166*a*-166*f* of the associated facet 166*a*-166*f*. The five facets 166*a*-166*e* are equally spaced away from the coupling end surface 158. The facet 166*f* having a contrary orientation is disposed in close proximity with facet 166*e* such that facets 166*e* and 166*f* form a pair of mirror-image facets that are disposed such that the second surfaces 170*e*, 170*f* of the paired facets 166*e*, 166*f* face one another. The base surfaces 168*a*-168*e* of the facets 166*a*-168*e* are preferably substantially parallel to one another. However, the base surface 168*f* of the facet 166*f* is angled slightly away from the parallel base surfaces 168*a*-168*e* of the other facets 166*a*-166*e*. Therefore, the base surfaces 168*e*, 168*f* and the second surfaces 170*e*, 170*f* of the paired facets 166*e*, 166*f* are angled slightly away from one another.

Referring again to FIG. 15, the LED elements 136 are preferably disposed in the illustrated arrangement relative to one another and relative to the plurality of light coupling cavities 142. The LED elements 136 may be mounted on one or more separate support structure(s) 174. In the illustrated embodiment of FIG. 15, the LED elements 136 are disposed on and carried by the metal-coated printed circuit board (PCB) 140. The PCB 140 is held in place relative to an associated opening 176 (see FIGS. 6, 7, 9, and 10) of the reflective enclosure member 132 by a holder assembly 178. The holder assembly 178 comprises a main holding member 180 and a gasket 182. The PCB 140 and the holder assembly 178 may be held in place relative to the waveguide body 102 by screws, rivets, etc. inserted through the PCB 140 and/or holder assembly 178 and passing into threaded protrusions 184*a*, 184*b* that extend out from the waveguide body 102 (see FIGS. 11 and 12). Further, screws or fasteners compress the main holding member 180 against the reflective enclosure member 132 with the gasket 182 disposed therebetween and the PCB 140 aligned with the associated opening 176. Thereby the LED elements 136 are held in place relative to the waveguide body 102 by both the compressive force of the holder assembly 178 and the screws, rivets, etc. inserted through the PCB 140 and passing into threaded protrusions 184*a*, 184*b*.

Referring again to FIGS. 3, 4, 5, 10, and 15, the waveguide body 102 is disposed and maintained within the reflective enclosure member 132 such that the plurality of coupling cavities 142 is disposed in a fixed relationship adjacent the opening 176 in the reflective enclosure 132 and such that the LED elements 136 are aligned with the coupling cavities 142 of the waveguide body 102. Each LED receives power from the LED driver circuit 118 or power supply of suitable type, such as a SEPIC-type power converter as noted above and/or other power conversion circuits carried by a circuit board 140*a* that may be mounted by fasteners and/or locating pins atop the reflective enclosure member 132.

Figure 9:
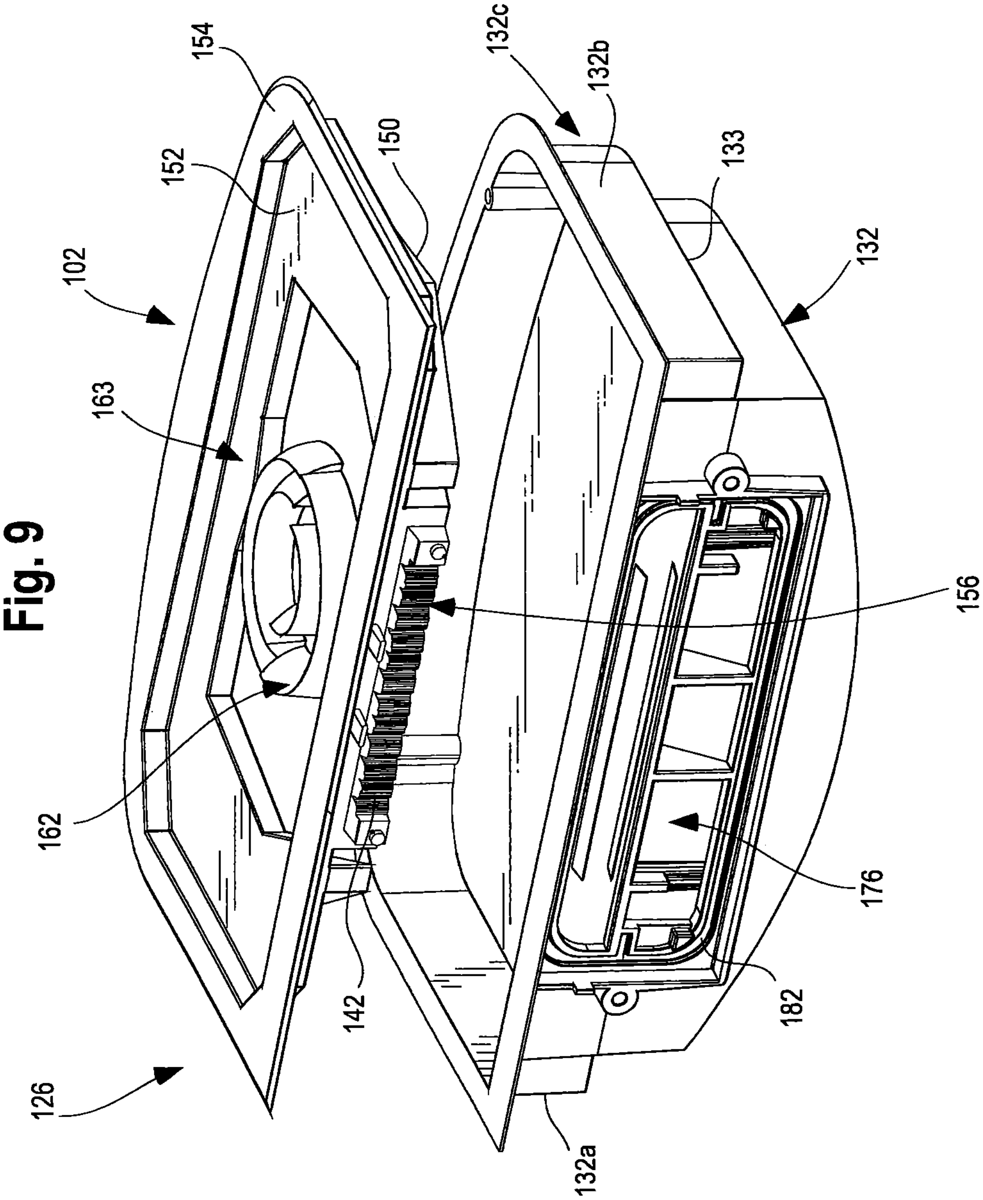
FIG. 9 is an exploded fragmentary isometric view from below of an optical assembly.
Figure 10:
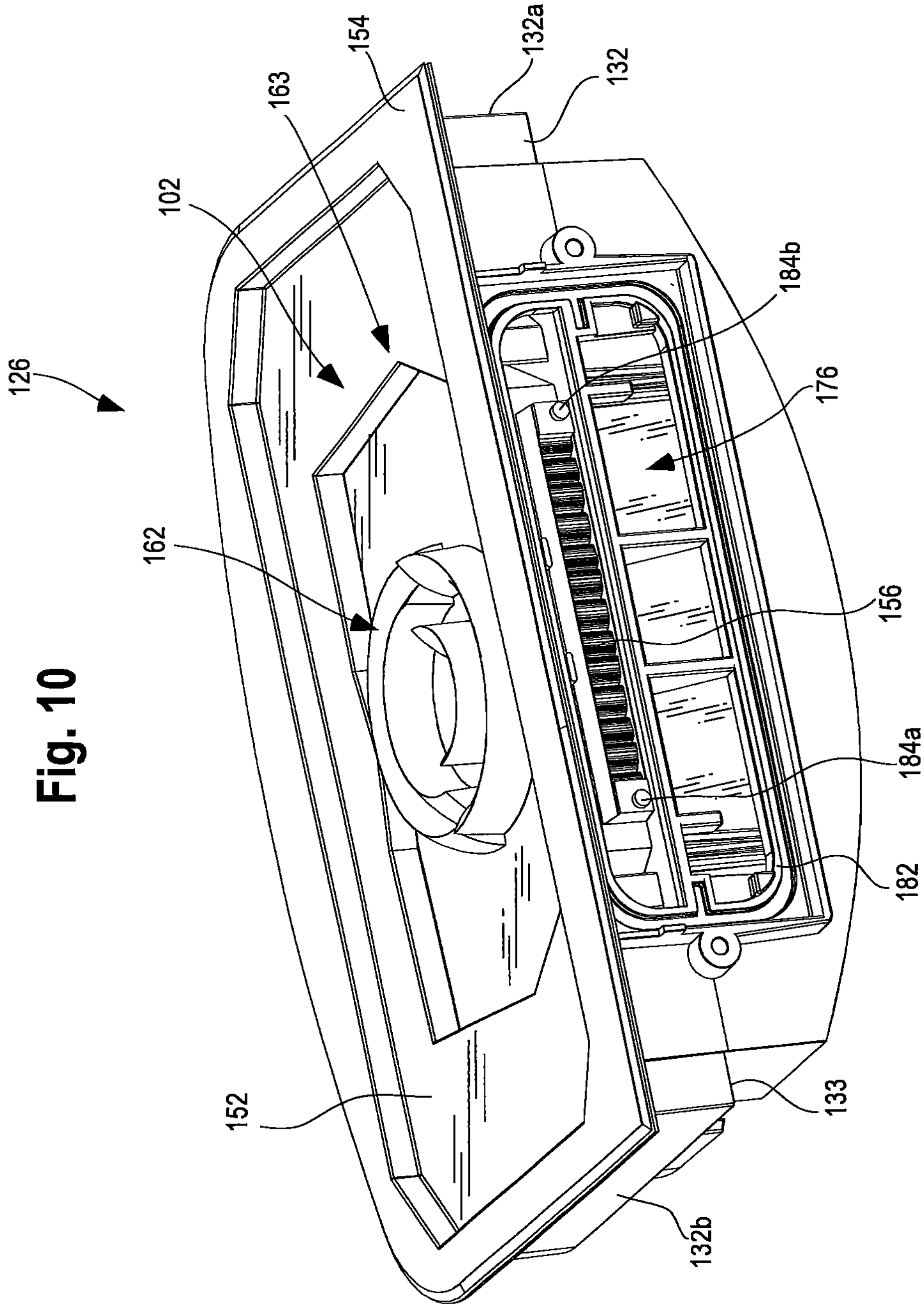
FIG. 10 is an isometric view from below of the optical assembly of FIG. 9.

FIGS. 4-10 illustrate the optic assembly 126 in greater detail. FIGS. 9 and 10 are inverted relative to the orientation of the optic assembly 126 within the luminaire 100. A process for fabricating the assembly 126 includes the steps of forming the waveguide body 102 using, for example, any suitable molding process such as described hereinafter, placing the reflective enclosure member 132 onto the waveguide body 102, and overmolding the surround member 130 onto the waveguide body 102 and/or the reflective enclosure member 132 to maintain the reflective enclosure member 132, the waveguide body 102, and the surround member 130 together in a unitary or integral fashion. The optic assembly 126 further includes an upper cover 138 (FIGS. 6-10) having a straight or linear surface 133 (FIGS. 4 and 8), left and right side surfaces 132*a* and 123*b*, respectively, (FIGS. 4-10) to interfit with the housing 104 shown in FIG. 8. However, a forward surface 132*c* may itself be curved and create a curved or filleted abutment where it meets each of the left and right side surfaces 132*a* and 132*b*. In an alternate embodiment of the luminaire 100, the reflective enclosure member 132 has a size and shape, such as including tapered or curved side surfaces, to receive closely the respective waveguide body 102 in a nesting fashion. The fitting of the optic assembly 126 and the gasket 182 with the enclosure member 132 provides a seal around the waveguide body 102. Such a seal may be watertight or otherwise provide suitable protection from environmental factors.

Any of the waveguide bodies disclosed herein may be used in the luminaire embodiments of FIGS. 1-5 and/or the post top embodiment of FIGS. 44-51, including the waveguide bodies of FIGS. 11-14 and 21-34. For example, embodiments of the luminaire 100 and/or post top 300 may incorporate the waveguide body 102 of a particular embodiment to achieve appropriate illumination distributions for desired output light illumination levels and/or other light distribution characteristics. The waveguide bodies of FIGS. 11-14 and 21-34 may be fabricated by a molding process, such as multilayer molding, that utilizes a tooling recess common to production of all three waveguide bodies, and using a particular bottom insert in the tooling cavity unique to each of the three waveguide bodies. The insert allows for a interior section of each waveguide body 102 to have different extraction members and/or redirection elements while a bottom surface 152 and an outboard portion 186 of an upper surface 150 are common to the waveguides 102. A similar molding process may be utilized for the fabrication of the waveguide bodies 102 shown in FIGS. 13, 14, 30, and 34 as the waveguides shown herein also have identically shaped bottom surface 152 and outboard portion 186.

The different interior sections of the waveguides allow for the illumination distribution pattern produced by the waveguide body 102 to be varied. The varied illumination distribution patterns may be compliant with the American Institute of Architects lighting standards that are commonly known in the art. The boundaries of each illumination pattern on the illuminated surface are defined by the threshold of minimum acceptable lighting conditions, which depend on the illumination requirements, such as for a highway luminaire or parking lot luminaire. For example, an embodiment of the waveguide body 102 may provide an illumination pattern on a target surface having a relatively even, circular, or square with rounded corners light distribution having a diameter (in the case of a circular distribution) or a side-to-side extent (for a square distribution) of about one to about seven times the mounting height of the luminaire 100. In a typical parking lot configuration the luminaire 100 is mounted 20-30 feet high. However, for high lumen applications, such as a luminaire replacing an incandescent bulb of approximately 750-10000 watts, the mounting height may instead be 30-40 feet, with an concomitant increase in power delivered to the LED elements to archive the desired intensity. In an example embodiment, at the luminaire 100 is mounted at with a height of 20 feet and the spacing ratio between luminaries is 7:1. Therefore, the width of the light distribution should cover at least 140 ft. Alternatively, for a mounting height of 40 feet and a spacing ratio of 7:1 between luminaries, the illumination width needed for desired light distribution may be 280 feet. The light distribution width may further be modified according to the spacing criteria for separating luminaries. Typical spacing ratios may be 4:1, 5:1, 6:1, and 7:1 to cover most area applications.

In an example embodiment, the luminaire 100 may have a maximum length ranging from about 400 mm to about 800 mm, most preferably from about 500 mm to about 550 mm, a maximum width ranging from about 200 mm to about 500 mm, most preferably from about 225 mm to about 275 mm, and a maximum height ranging from about 100 mm to about 200 mm, most preferably from about 125 mm to about 150 mm. Moreover, the waveguide bodies 102 incorporated into the luminaire 100 and/or post top luminaire 300*b* may have a length along the y-direction ranging from about 75 mm to about 250 mm, preferably from about 125 mm to about 175 mm, a width along the x-direction ranging from about 150 mm to about 300 mm, preferably from about 200 mm to about 250 mm, and a height (i.e., thickness) ranging from about 5 mm to about 50 mm, preferably from about 15 mm to about 35 mm. The waveguide bodies 102 depicted in FIGS. 11-14 and 21-34 may be used in a luminaire having a lumen output ranging from about 3,000 lumens to about 32,000 lumens and, preferably, in luminaires having a lumen output between about 3,000 lumens and about 8,000 lumens. In a further example embodiment, the post top luminaries 300, 300*a*, 300*b* may have housings measuring approximately 375 mm.times.375 mm.times.450 mm up to about 450 mm.times.450 mm.times.525 mm with lumen outputs preferably ranging from about 3,000 lumens to about 32,000 lumens. Moreover, the waveguide bodies 102*a*-102*d* incorporated into the post top luminaries 300*a*, 300*b* may have a length along the y-direction ranging from about 75 mm to about 250 mm, preferably from about 125 mm to about 150 mm, a width along the x-direction ranging from about 150 mm to about 300 mm, preferably from about 125 mm to about 175 mm, and a height (i.e., thickness) ranging from about 5 mm to about 50 mm, preferably from about 15 mm to about 35 mm.

Figure 14:
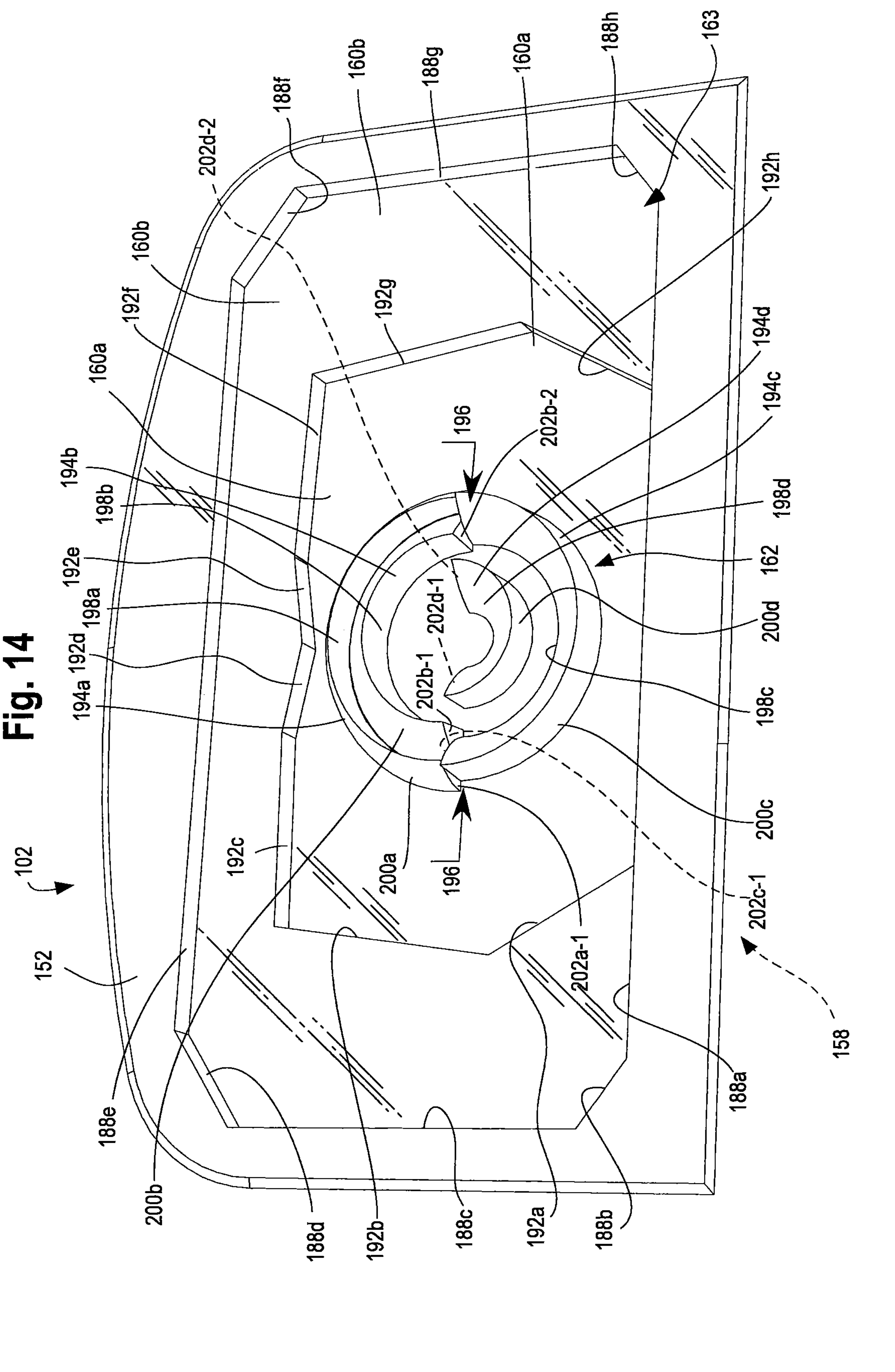
FIG. 14 is an isometric view from below of the waveguide body of FIG. 11.

The waveguide bodies 102 of FIGS. 11-14 and 21-34 include the bottom surface 152 and the outboard portion 186 of the top surface 150 as common to all such embodiments. The bottom surface 152 illustrated in FIGS. 13 and 14 is tray-shaped, and includes the first and second depressed planar surfaces 160*a*, 160*b*. Second, outer depressed planar surface 160*b* has planar side surfaces 188*a*-188*h* disposed thereabout. An outer planar surface extends outwardly from and transverse to the side surfaces 188*a*-188*h*. The first depressed planar surface 160*a* is disposed within the second depressed planar surface 160*b* and is defined by planar side surfaces 192*a*-192*h*, 188*a* disposed thereabout. Planar side surface 188*a* comprises a side surface adjacent both the first and second depressed planar surfaces 160*a*, 160*b*.

Disposed within the first, inner depressed planar surface 160*a* are two sets of curved, partially or fully semi-circular, concentric or eccentric ridges 194*a*-194*d*, wherein each ridge terminates at a ridge meeting plane 196 that extends along lines 196-196 in FIGS. 13 and 14, parallel to the width (i.e., the x-dimension, as indicated in FIGS. 11 and 13) of the waveguide body 102. The ridge meeting plane 196 discussed below in describing the orientation of various waveguide body 102 features may instead be a particular line dividing the waveguide body 102, such line being substantially centered or offset from the center of the body 102 by a selected amount. The ridge meeting plane 196 is parallel to the coupling end surface 158. Alternatively, the ridges 194 may, not terminate at a ridge meeting plane, but instead may terminate at ends that are spaced from one another.

The ridges 194*a*, 194*b* are disposed forward of the ridge meeting plane 196 while ridges 194*c*, 194*d* are disposed on a side of the ridge meeting plane 196 nearer the coupling end surface 158. Each ridge 194*a*-194*d* comprises an inner side surface 198*a*-198*d*, respectively, and an outer side surface 200*a*-200*d*, respectively. The ridge 194*a* is disposed outside and around the ridge 194*b*. More particularly, the outer ridge 194*a* is defined by the outer side surface 200*a*, which rises from the first depressed planar surface 160*a*. The ridge outer side surface 200*a* meets the ridge inner side surface 198*a* to form a wedge shape. The ridge inner side surface 198*a* is disposed adjacent the outer side surface 200*b* of the inner forward ridge 194*b*. Alternatively, the ridge inner side surface 198*a* may be adjacent the inner depressed planar surface 160*a* instead of abutting the outer side surface 200*b* of the inner forward ridge 194*b*. In such an embodiment, the inner forward ridge 194*b* has a diameter smaller than that shown in FIG. 14, and considerably smaller than outer forward ridge 194*a*. The outer side surface 200*b* meets the inner side surface 198*b* of the inner forward ridge 194*b* again to form a wedge shape. The inner side surface 198*b* of the inner forward ridge 194*b* then abuts the inner depressed planar surface 160*a*, as shown in FIG. 14.

The ridge 194*c* is disposed outside and around the ridge 194*d* nearer the coupling end surface 158 and in back of the ridge meeting plane 196. The back ridge 194*c* is defined by the outer side surface 200*c*, which rises from the first depressed planar surface 160*a*. The ridge outer side surface 200*c* meets the ridge inner side surface 198*c* to form a wedge shape. The ridge inner side surface 198*c* abuts the first depressed planar surface 160*a*. A portion of the first depressed planar surface 160*a* extends between the outer back ridge 194*c* and the inner back ridge 194*d*. The inner back ridge 194*d* is defined by the outer side surface 200*d*, which rises from the portion of the first depressed planar surface 160*a* extending between the outer and inner back ridges 194*c*, 194*d*. The outer side surface 200*d* meets the inner side surface 198*d* of the inner back ridge 194*d* to form a wedge shape. In the embodiment of FIGS. 13 and 14, the inner back ridge 194*d* has a diameter considerably smaller than that of the outer back ridge 194*c*, although the relative diameters thereof may be modified to achieve varying desired light distribution patterns.

Each of the ridges 194*a*-194*d* is curved in the width and length dimensions of the body 102 to form an arcuate ridge comprising a semi-circle about a central point on the first depressed planar surface 160*a*. In the embodiment of FIGS. 13 and 14 the semi-circular curved ridges 194*a*-194*d* form partial concentric circles. In alternate embodiments, the central point of one or more of the semi-circular curved ridges 194*a*-194*d* may be offset from the central point of one or more of the other semi-circular ridges 194*a*-194*d*. Thus the curved ridges 194*a*-194*d* may be arranged in an eccentric pattern. In further alternate embodiments of the waveguide body 102, the curved ridges 194*a*-194*d* may be semi-elliptical, semi-parabolic, or another suitable arcuate or linear shape or combination of arcuate and/or linear shapes instead of semi-circular in shape.

As shown in FIG. 14, each of the curved ridges 194*a*-194*d* has two end surfaces 202*a*-1, 202*a*-2, 202*b*-1, 202*b*-2, 202*c*-1, 202*c*-2, 202*d*-1, 202*d*-2. Outer forward curved ridge 194*a*, inner forward curved ridge 194*b*, and outer back curved ridge 194*c* have end surfaces that are adjacent one another or, alternatively, meet such as to eliminate any interface therebetween. The end surface alignment is mirrored on left and right sides of the waveguide body, and hence, only one side will be described herein. The end surface 202*a*-1 of the outer forward ridge 194*a* is parallel with and adjacent the end surface 202*b*-1 of the inner forward ridge 194*b*. The end surface 202*c*-1 of the outer back ridge 194*c* faces and partially abuts the end surfaces 202*a*-1, 202*b*-1. The end surface 202*d*-1 of the inner back ridge 194*d* does not abut or conjoin with another end surface.

In any of the embodiments described herein, any sharp corner may be rounded and have a radius of curvature of less than 0.6 mm. The geometry of the redirection features and reflection features may be altered to manipulate the illumination pattern produced by the waveguide body 102. Additionally, the redirection features may have the same or similar shapes as the reflection features, but may differ in size.

Figure 12A:
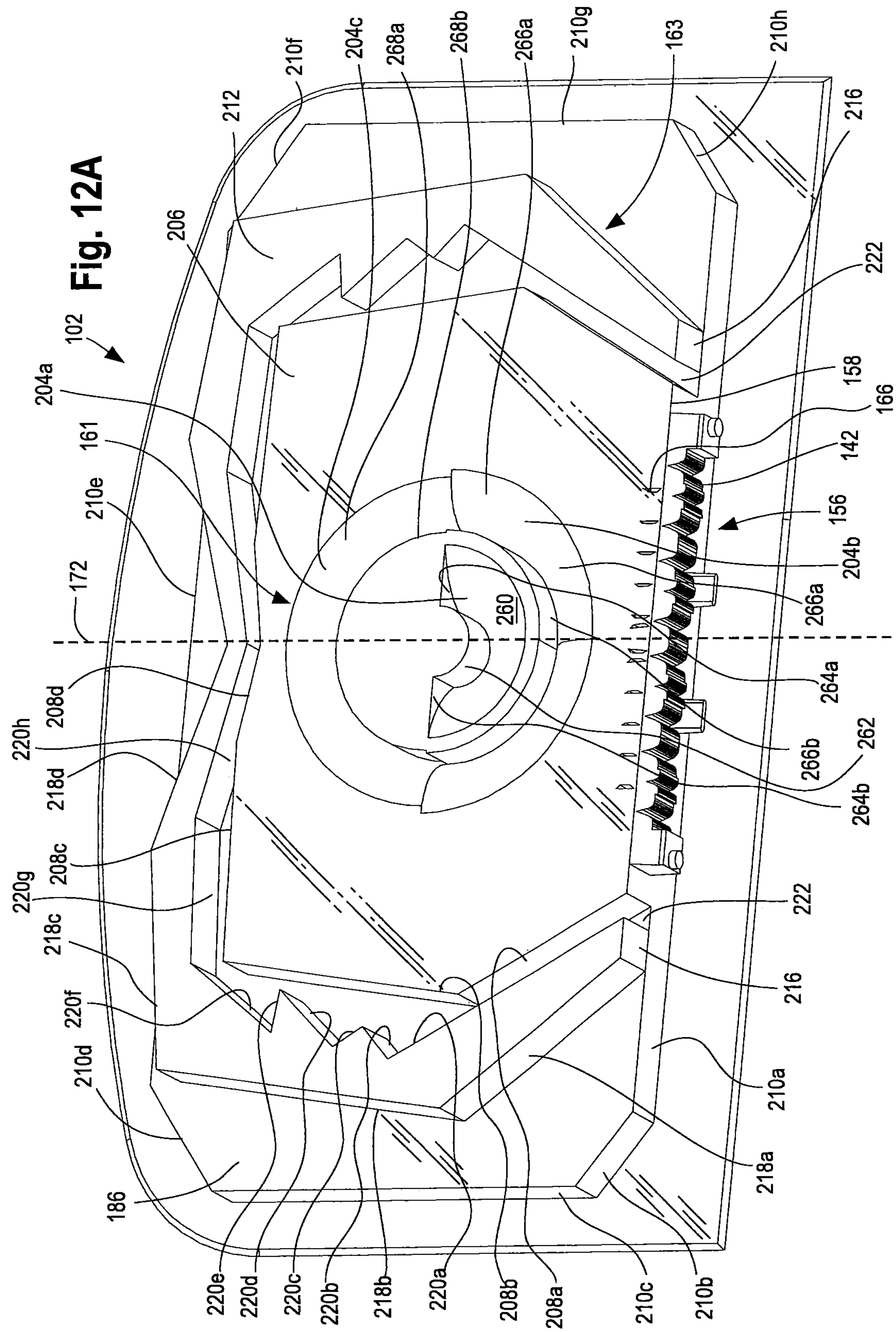
FIG. 12A is an isometric view from above-back of the waveguide body of FIG. 11.
Figure 12B:
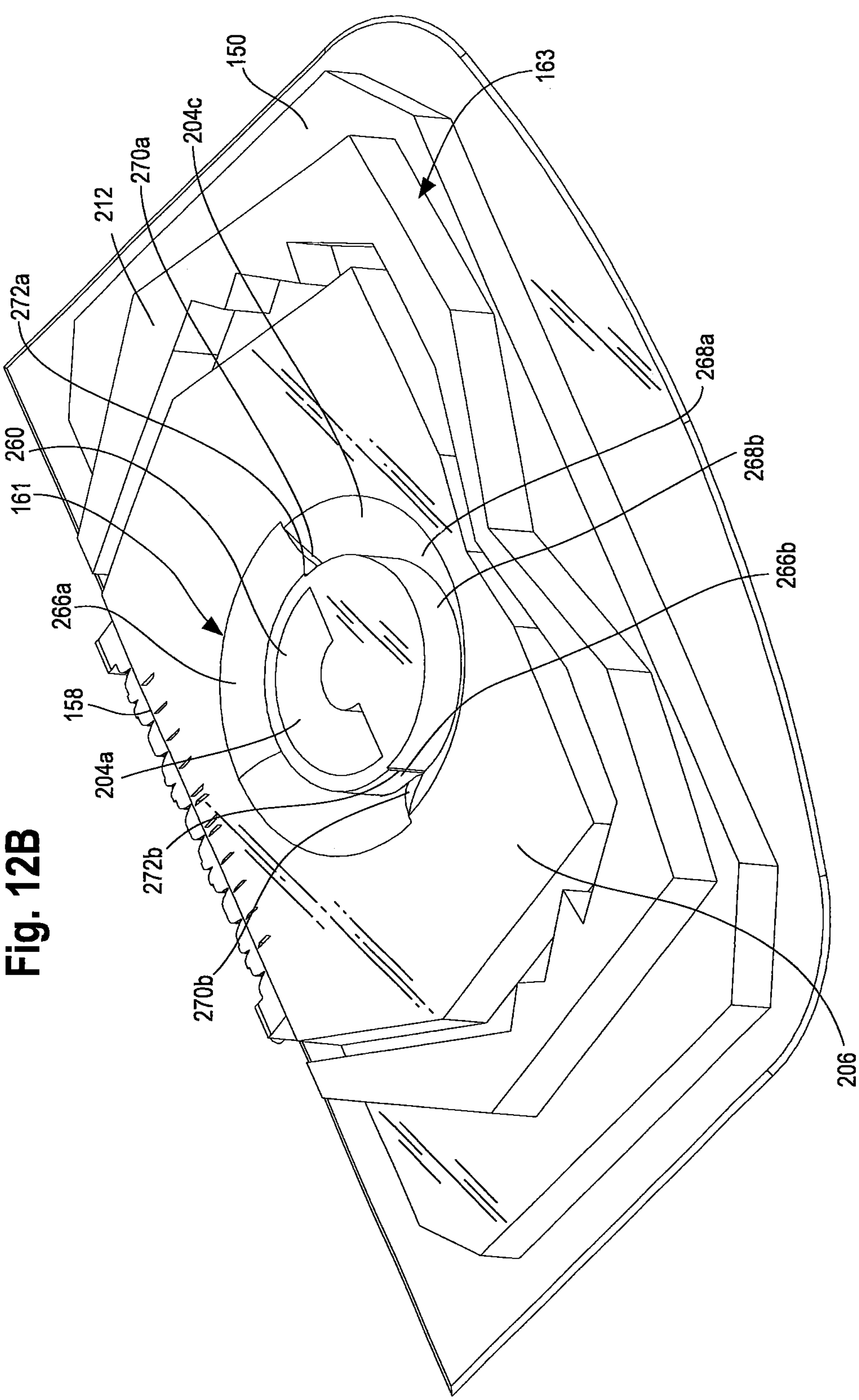
FIG. 12B is an isometric view from above-front of the waveguide body of FIG. 11.

Referring to FIGS. 11, 12A, and 12B, the outboard portion 186 of the upper surface 150 comprises first, second, and third arcuate redirection features 204*a*, 204*b* disposed within a raised interior transmission portion 206 itself having eight sidewalls 208*a*-208*h*. The eight sidewalls 208*a*-208*h* define the perimeter of the raised interior transmission portion 206 in conjunction with the coupling end surface 158. The interior transmission portion 206 is preferably (although not necessarily) symmetric about the center line 172. The interior transmission section 206 is disposed on the outboard portion 186 of the upper surface 150 such that the coupling end surface 158 of the interior transmission portion 206 is conjoined with side wall 210*a* defining a part of the outboard portion 186. Sidewall 210*a* along with sidewalls 210*b*-210*h* define the perimeter of the outboard portion 186.

As depicted in FIGS. 11, 12A, and 12B, further disposed on the outboard portion 186 is a recycling feature 212. The recycling feature 212 has two branches 214*a*, 214*b* arranged symmetrically about the interior transmission portion 206. The branches 214*a*, 214*b* are mirror images of one another on left and right sides of the center line 172, and hence, only the branch 214*a* will be described in detail herein. The branch 214*a* is defined by end surface 216. The end surface 216 is parallel and in the same plane as the sidewall 210*a* of the outboard portion 186. The recycling feature branch 214*a* has four outer sidewalls 218*a*-218*d* sequentially arranged at obtuse angles between each outer sidewall and the next. The outer sidewall 218*d* abuts the mirror image outer sidewall of the recycling feature branch 214*b* on a right side of the interior transmission portion 206. The outer sidewall 218*d* and the mirror image counterpart thereof meet proximal the center line 172 to form a v-shaped, indented light re-directing feature.

Still referring to FIGS. 11, 12A, and 12B, the branch 214*a* has eight inner side walls 220*a*-220*h* that are sequentially arranged in abutment one to the next from the end surface 216. The inner sidewalls 220*b* and 220*c* abut one another at an obtuse angle to create a wedge-shaped light re-directing feature. Further, the inner sidewalls 220*d* and 220*e* abut at an acute angle to former a relatively sharper wedge-shaped light re-directing feature. Further, the inner sidewall 220*e* abuts the inner sidewall 220*f* at an acute angle to form a v-shaped, indented light re-directing feature. The inner surface 220*h* meets a mirror image counterpart thereof proximal the centerline 172 of the waveguide body 102 to form a further wedge-shaped light re-directing feature having a relatively less sharp angle. In other embodiments, features and sidewalls may be identical, similar, and/or different from other sections and sidewalls, and the angles therebetween may be customized to suit a particular application and/or achieve desired illumination patterns.

The recycling feature 212 at least partially surrounds the interior transmission portion 206 but the sidewalls thereof do not abut the interior portion 206. Thus an interior planar portion 222 of the outboard portion 186 is defined by the inner sidewalls 220*a*-220*h* as well as the sidewalls 208*a*-208*h* of the interior transmission portion 206. This interior planar portion 222 of the outboard portion 186 also at least partially surrounds the interior transmission portion 206. Light that enters the waveguide body 102 through the plurality of coupling cavities 142 along the coupling end surface 158 may be totally internally reflected by the sidewalls 208*a*-208*h* of the interior transmission portion 206 before approaching the arcuate redirection features 204*a*, 204*b*, 204*c*. However, as a matter of course, some light is not totally internally reflected and instead escapes laterally from the interior transmission portion 206. This escaped light may be totally internally reflected by one or more of the inner and outer sidewalls 220*a*-220*h*, 218*a*-218*d* of the recycling feature 212. The escaped light is redirected by total internal reflection off of these surfaces back towards the interior transmission portion 206 for eventual extraction by the features thereof.

Referring to FIGS. 11, 12A, 12B, 17, 18, 22A, and 22B, the first redirection feature 204*a* is defined by four sidewalls 260, 262, 264*a*, 264*b*. The first sidewall 260 partially defines the extent of the first redirection feature 204*a*. The sidewall 260 comprises an arcuate surface curved in the length, width, and thickness dimensions (see FIGS. 18, 22A, and 22B). Further the sidewall 262 is straight in the thickness dimension but curved in the width and length dimensions to form a semi-circle as described above such that the central point thereof is coincident with the central point of the outer perimeter of the first sidewall 260. The first and second sidewalls 260, 262 may be concentric, or may be offset from one another. The sidewalls 264*a*, 264*b* define end surfaces of the overall indentation into the top surface 150 formed by the first redirection feature 204*a*. These sidewalls 264*a*, 264*b* may be straight in the length and width dimensions while being curved in the thickness dimension as shown in FIGS. 12A and 12B or instead may be curved in more than one dimension.

Referring still to FIGS. 11, 12A, 12B, 18, 22A, and 22B, the second redirection feature 204*b* is defined by two sidewalls 266*a*, 266*b*. The first sidewall 266*a* comprises an arcuate surface curved in the length, width, and thickness dimensions (see FIGS. 18, 22A, and 22B) and partially defines the extent of the second redirection feature 204*b*. a. Further sidewall 266*b* is straight in the thickness dimension but curved in the width and length dimensions as noted above to form a semi-circle such that the central point thereof is the same as the central point of the outer perimeter of the first sidewall 266*a* of the second redirection feature 204*b*. Like the first redirection feature 204*a*, the sidewalls 266*a*, 266*b* define generally an indentation into the top surface 150 of the waveguide body 102 and may be curved in one or more dimensions.

Still with reference to FIGS. FIGS. 11, 12A, 12B, 18, 22A, and 22B, the third redirection feature 204*c* has an orientation opposite the first and second redirection features 204*a*, 204*b*. The third redirection feature 204*c* is defined by six sidewalls 268*a*, 268*b*, 270*a*, 270*b*, 272*a*, 272*b*. Similar to the arrangement of sidewalls 260, 266*a* of the previous two described redirection features, first sidewall 268*a* of the third redirection feature 204*c* is curved the length, width, and thickness dimensions (see FIGS. 18, 22A, and 22B). Further sidewall 268*b* is vertically straight in the thickness dimension but curved in the width and length dimensions to form a semi-circle as described above such that the central point thereof is coincident with the central point of the outer the first sidewall 268*a* of the third redirection feature 204*c*.

Referring now specifically to FIG. 12B, the reflection and redirection features 161 formed by the second and third extraction features 204*b*, 204*c* abut one another and form a continuous circular indentation in the top surface 150 of the waveguide body 102. However, the sidewalls 270*a*, 270*b*, 272*a*, 272*b* define a difference in depth (i.e., along the thickness dimension) between the second and third redirection features 204*b*, 204*c*. The outer sidewalls 270*a*, 270*b* face the coupling end surface 158. The sidewalls 266*b*, 268*b* have slightly different radii of curvature, with the surface 266*b* having a slightly greater radius of curvature than the surface 268*b*, resulting in the inner sidewalls 272*a*, 272*b* in the embodiment shown in FIGS. 12A and 12B being relatively small in side-to-side extent. However, the sidewalls 270*a*, 270*b*, 272*a*, 272*b*, may extend to a lesser or greater extent into the volume of the indentations formed by the second and third redirection features 204*b*, 204*c* to provide more or less definition between the two features so as to achieve desired illumination patterns.

Figure 17:
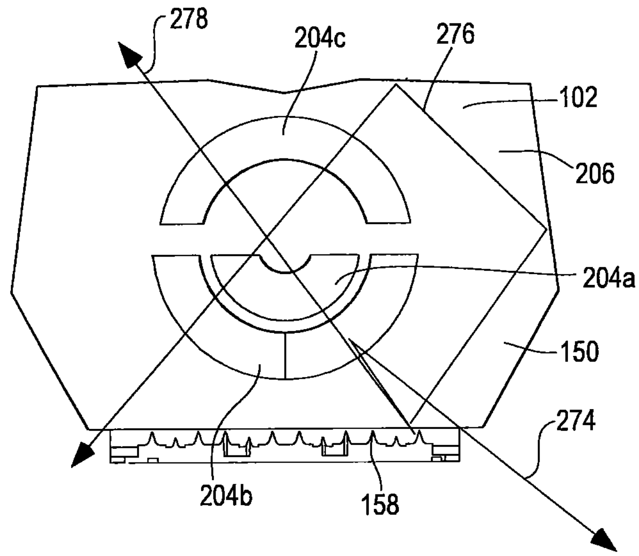
FIG. 17 is a plan view diagram depicting light rays traveling through a portion of a waveguide body.

Referring now to FIGS. 17, 18, 19, 20, and 21, ray trace diagrams depict how light may travel through the waveguide body 102 from the light coupling cavities 142. In FIG. 17, light that enters through the coupling cavities 142 is transmitted through the interior transmission section 206 by total internal reflection off of the sidewalls 208*a*-208*h*. Through this total internal reflection of light through the interior transmission portion 206, a portion of light rays 274 are supplied with a directional component opposite that of the light rays entering the waveguide body 102 at the coupling cavities 142. This allows some light to impinge on the redirection feature 204*c* from an angle that approaches an extracting surface of the sidewall 268*b*. However, another portion of light rays 274 is not transmitted about the interior transmission portion 206, but instead directly impinges incident on redirection sidewalls 260, 266*a* of the first and second redirection features 204*a*, 204*b*. The extraction portion 163 extracts light rays by changing directions of light rays through the combination of top and bottom features 161, 162. This aspect assists in light/color mixing of different color light from BSY and RDO (Red-Orange) LED elements 136*a*, 136*b* by dispersing light rays in individually different directions, relative the entrance trajectory of light through the coupling cavities 142, by total internal reflection off of pairs of curved surfaces in the redirection and reflection features 161 and the extraction and refraction features 162.

From the foregoing, and as is evident by an inspection of the FIGS., the redirection and reflection features 161 are disposed in a first (i.e., upper) thickness portion of the body 102 whereas the extraction and refraction features 162 are disposed in a second (i.e., lower) thickness portion of the body 102. The first and second thickness portion may be distinct (as illustrated) or not distinct.

Figure 18:
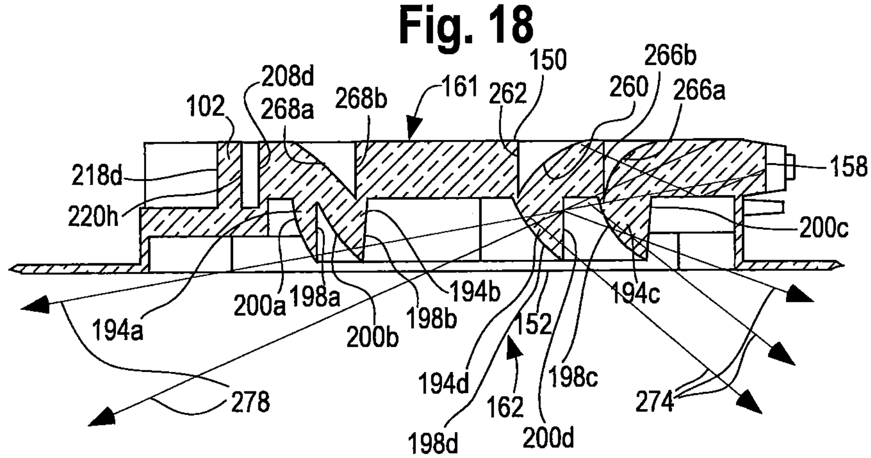
FIG. 18 is a cross-sectional view taken generally along the lines 18-18 indicated in FIG. 11.

FIG. 18 depicts the interaction between the surfaces of the bottom refraction and extraction features 162 and the reflection surfaces of the arcuate redirection and reflection features 161 on the top surface 150. As an example, light rays 274 entering through the coupling cavities 142 totally internally reflect off of the reflection sidewalls 260, 266*a*, of the redirection features 204*a*, 204*b*. Further in the illustrated example, the reflected light is incident on the curved reflection sidewalls 198*c*, 198*d*. The reflected light exits the waveguide body 102 through the bottom, emission surface 152 at an angle back towards the coupling end surface 158 with a directional component opposite the general direction of light entering the waveguide body 102.

Figure 19:
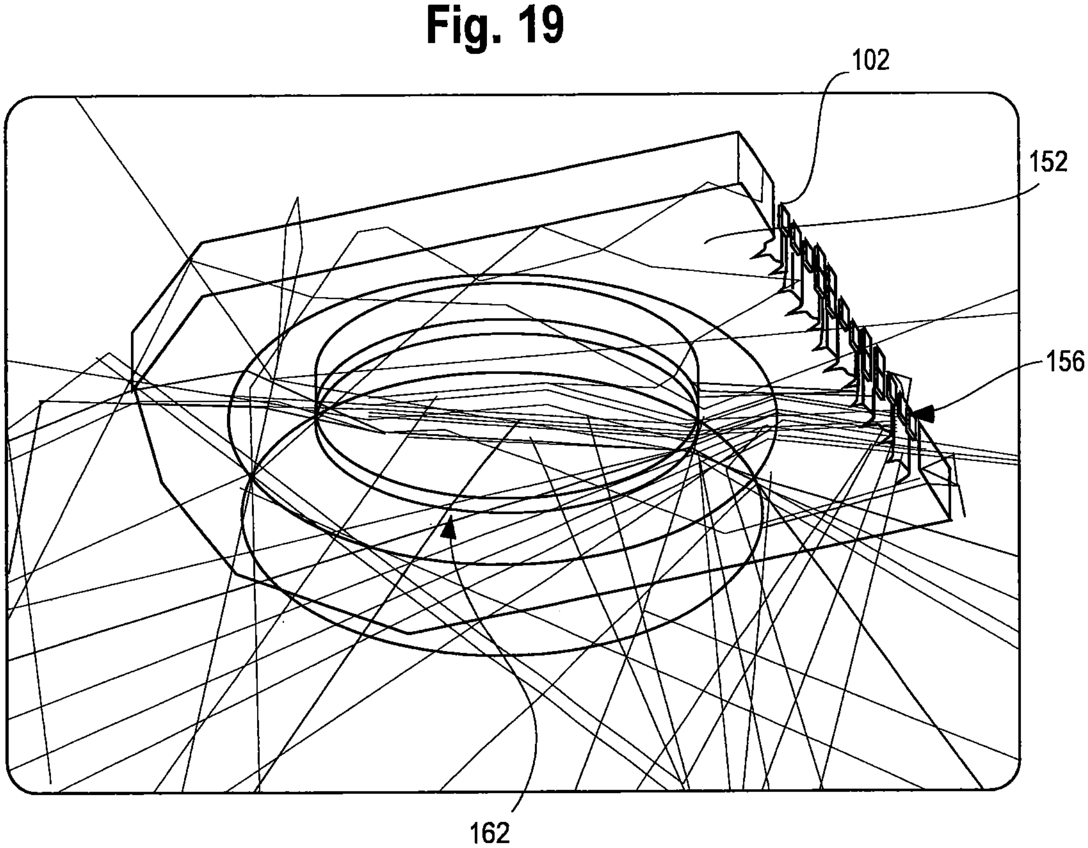
FIG. 19 is an isometric view from above of a ray trace diagram of a portion of a waveguide body.
Figure 20:
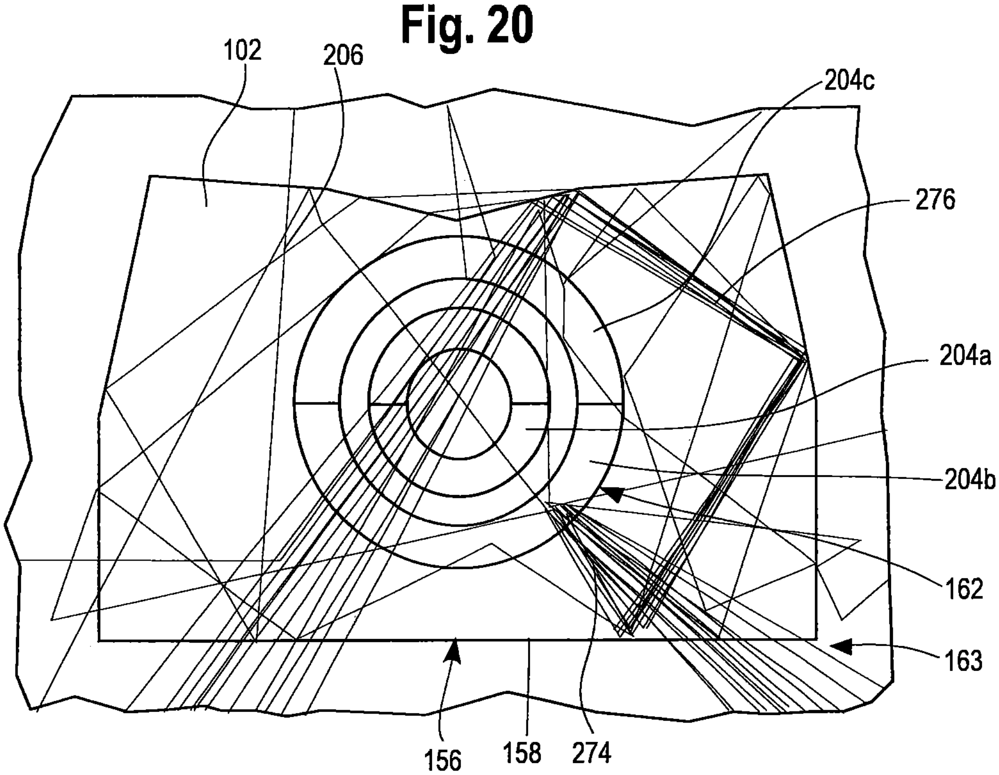
FIG. 20 is a plan view from above of a ray trace diagram of a portion of a waveguide body.
Figure 21:
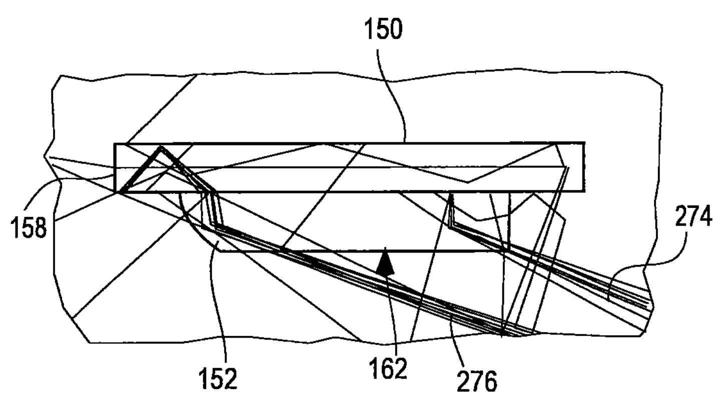
FIG. 21 is a side elevational view of the ray trace diagram of FIG. 20.

With further reference to FIG. 19, some light rays are not totally internally reflected by the top surface redirection features 204*a*, 204*b*. Instead, another portion of light rays 278 are transmitted through the interior transmission portion 206 until directly impinging on the sidewalls 198*c*, 198*d*, 200*c*, 200*d* of the curved ridges 194*c*, 194*d*. For this portion of light rays 278, the sidewalls 198*c*, 198*d*, 200*c*, 200*d* extract the light by refracting the light out of the bottom, emission surface 152. The light rays 278 refracted out by the refraction and extraction features 162 of the bottom surface 152 are emitted at an angle forward and away from the coupling end surface 158 with a directional component along the general direction of light entering the waveguide body 102. In this capacity the refraction and extraction features 162 comprising curved ridges 194*a*, 194*d* perform extraction and refraction of light rays. Likewise, some light rays are transmitted through the interior transmission portion 206, perhaps reflecting on the sidewalls 208*a*-208*h* thereof or the sidewalls 220*a*-220*h*, 218*a*-218*d* of the recycling feature before impinging on the sidewalls 198*a*, 198*b*, 200*a*, 200*b* of the curved ridges 194*a*, 194*b*. For this portion of light rays, the sidewalls 198*a*, 198*b*, 200*a*, 200*b* extract the light by refracting the light out of the bottom, emission surface 152 at an emission angle forward and away from the coupling end surface 158 with a directional component along the general direction of light entering the waveguide body 102. Light rays my simply exit the waveguide body 102 or may exit and reenter the waveguide one or more times before finally exiting the body 102.

The various portions of light are extracted to produce an overall or cumulative desired illumination pattern. The configuration of the light refraction and extraction features 162, the light redirection features 204*a*, 204*b*, 204*c*, and the light redirecting sidewalls directs substantially all of the light out of the bottom surface 152 of the waveguide body 102. In alternative embodiments, additional subsets of LEDs elements 136 may be coupled into additional portions of the waveguide body 102 to be redirected, reflected, and extracted, or redirected to be extracted in a different portion of the waveguide body 102, or directly refracted without reflection and extracted to produce a composite or cumulative desired illumination pattern.

Figure 22A:
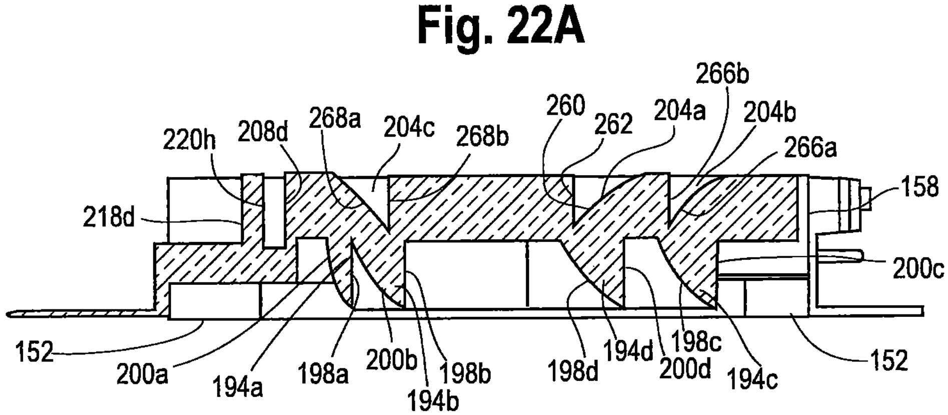
FIGS. 22A and 22B are cross-sectional views of embodiments of a waveguide body taken along lines corresponding to lines 18-18 of FIG. 11.
Figure 22B:
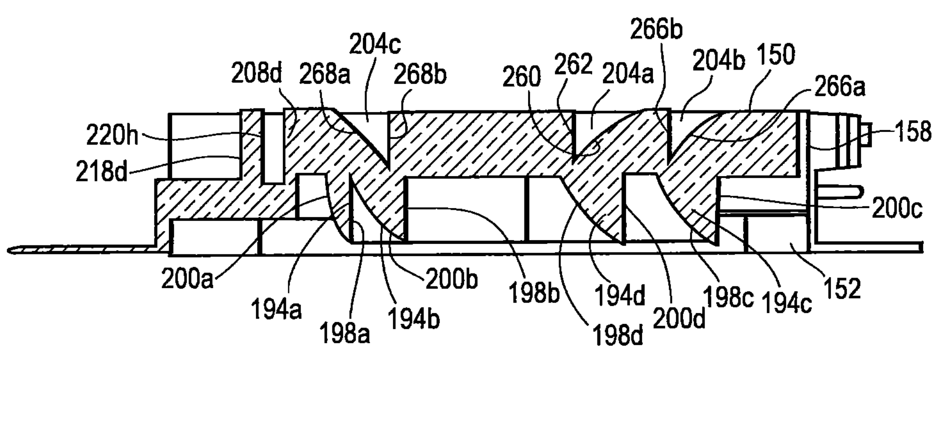

FIGS. 22A and 22B depict a cross-sectional view of the waveguide body shown in FIG. 11 taken from the center of the waveguide body 102 along the y-dimension at the line 18-18. FIG. 22A depicts a cross-sectional view taken along the same plane as FIG. 22B, but illustrates an embodiment having less optical material of the waveguide body 102 separating the surfaces of redirection features disposed on the top surface 150 and the curved bottom light refraction and extraction features 162. The thickness of material separating the top and bottom features may modify the angles at which light rays are refracted and/or reflected from the waveguide body 102 and emitted from the bottom surface 152.

Referring now to FIG. 23, an embodiment of the waveguide body 102 similar to that depicted in FIGS. 11-14 is shown. The embodiment of FIG. 23 has the top and bottom surfaces 150, 152 comprising identical or similar extraction, reflection, recycling, and other features and dimensions to the embodiment of the waveguide body 102 shown in FIGS. 11-14. However, the various features common to the waveguide body 102 shown in FIGS. 11-14 may instead be formed with the plurality of coupling cavities 142 having the parabolic entrance geometry as discussed herein. FIG. 24 shows a detailed view of a portion of the plurality of coupling cavities 142 having the parabolic entrance geometry. In contrast, FIG. 25 depicts an embodiment of the plurality of coupling cavities 142 wherein the coupling cavities 142 comprise the wedge-shaped geometry shown in the waveguide body 102 embodiment of FIGS. 11 and 12. Furthermore, the embodiments of the waveguide body 102 depicted in FIGS. 23-25 include the facets 166*a*-166*e*.

Figure 26A:
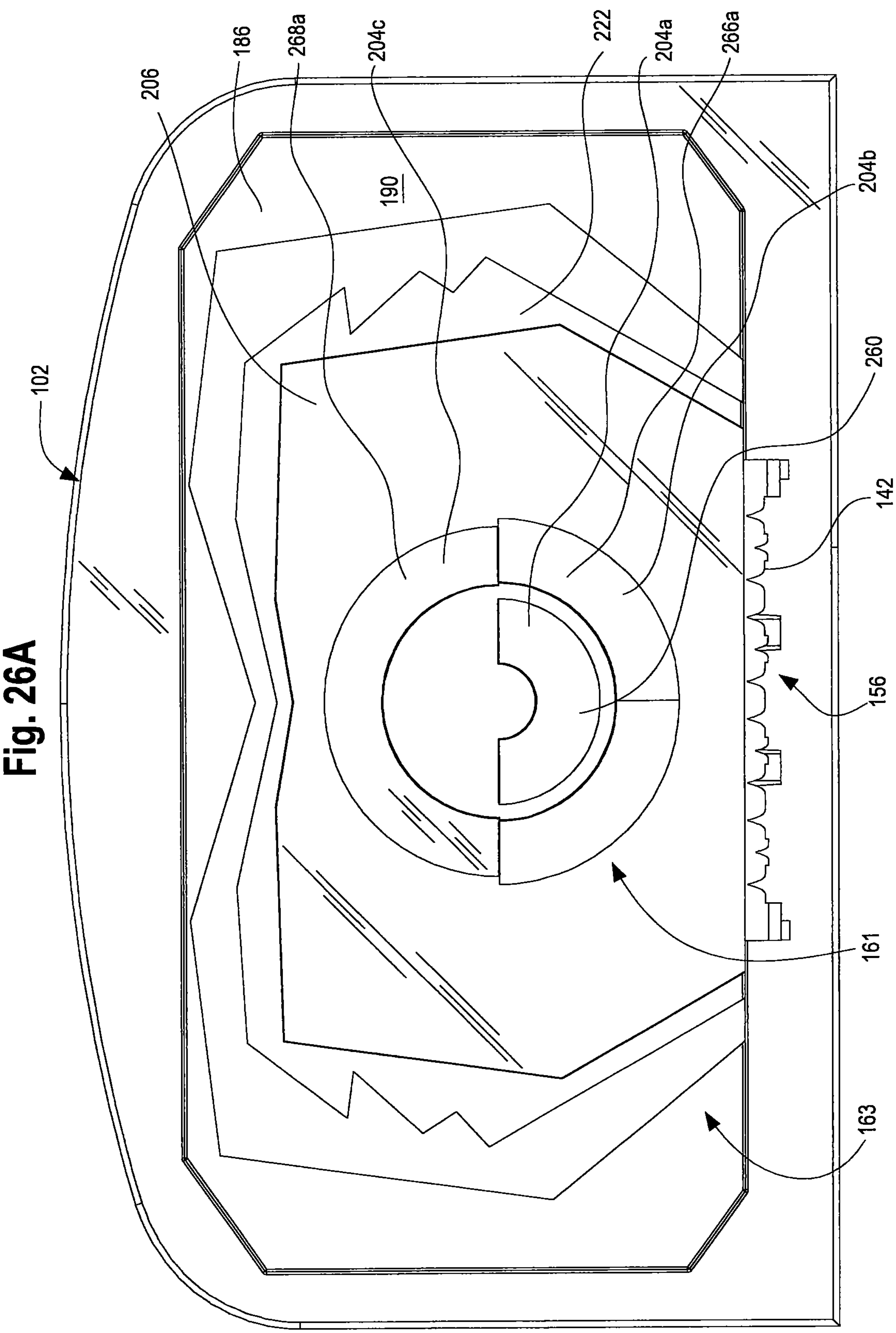
FIG. 26A is a plan view of an alternate embodiment of the waveguide body of FIG. 11.
Figure 26B:
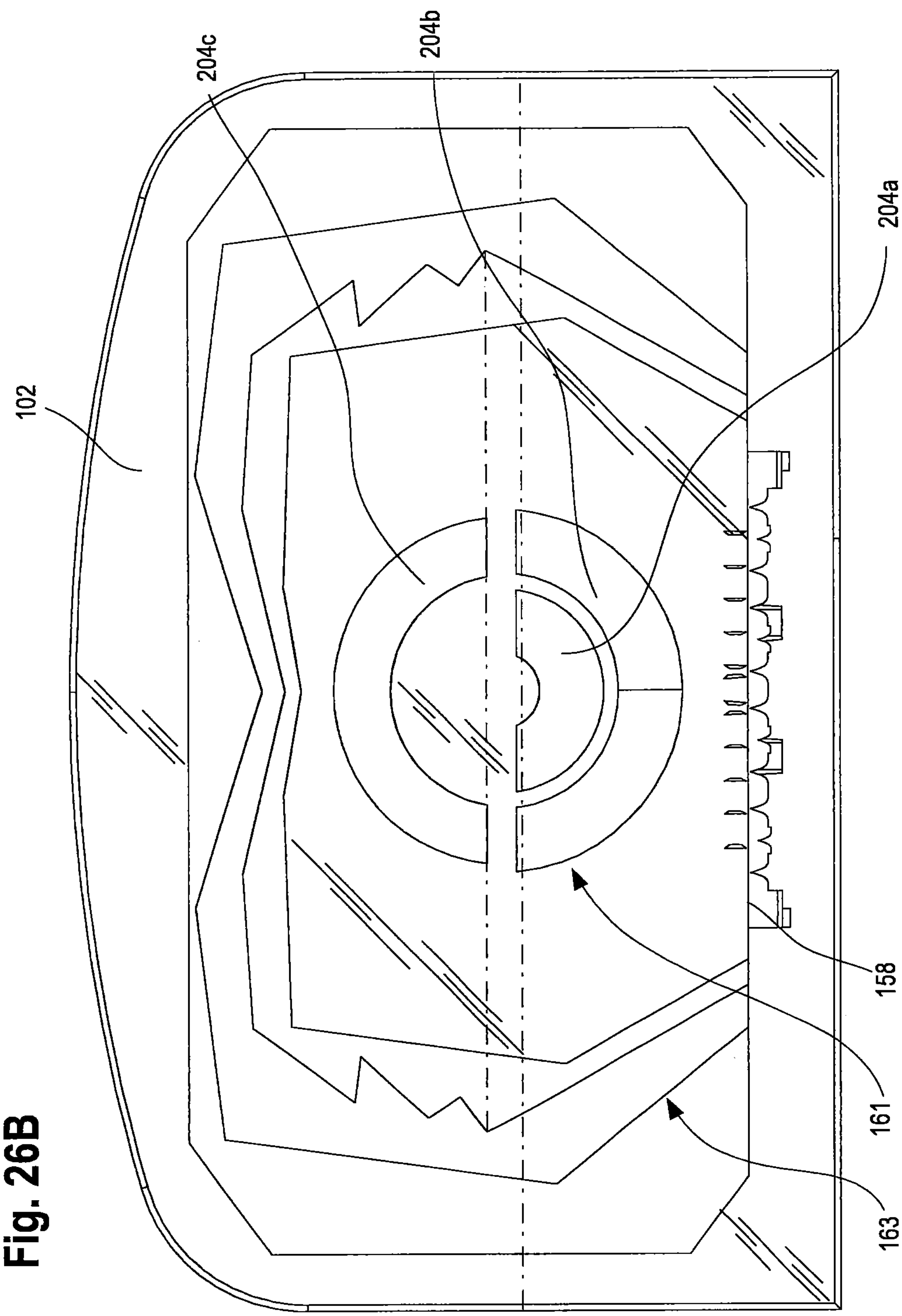
FIG. 26B is a plan view of an alternate embodiment of the waveguide body of FIG. 11.

Referring now to FIG. 26A, an alternate embodiment of the waveguide body 102 is shown. In this embodiment, the facets 166 of the embodiments depicted in FIGS. 11-14 and 23-25 are omitted. This embodiment relies on the geometry of the coupling cavities 142 and the internal operation of the light extraction, redirection, refraction, and reflection surfaces to achieve suitable light/color mixing. Further alternate embodiment shown in FIG. 26B includes a gap between the back redirection features 204*a*, 204*b* and the front redirection feature 204*c*.

Figure 27A:
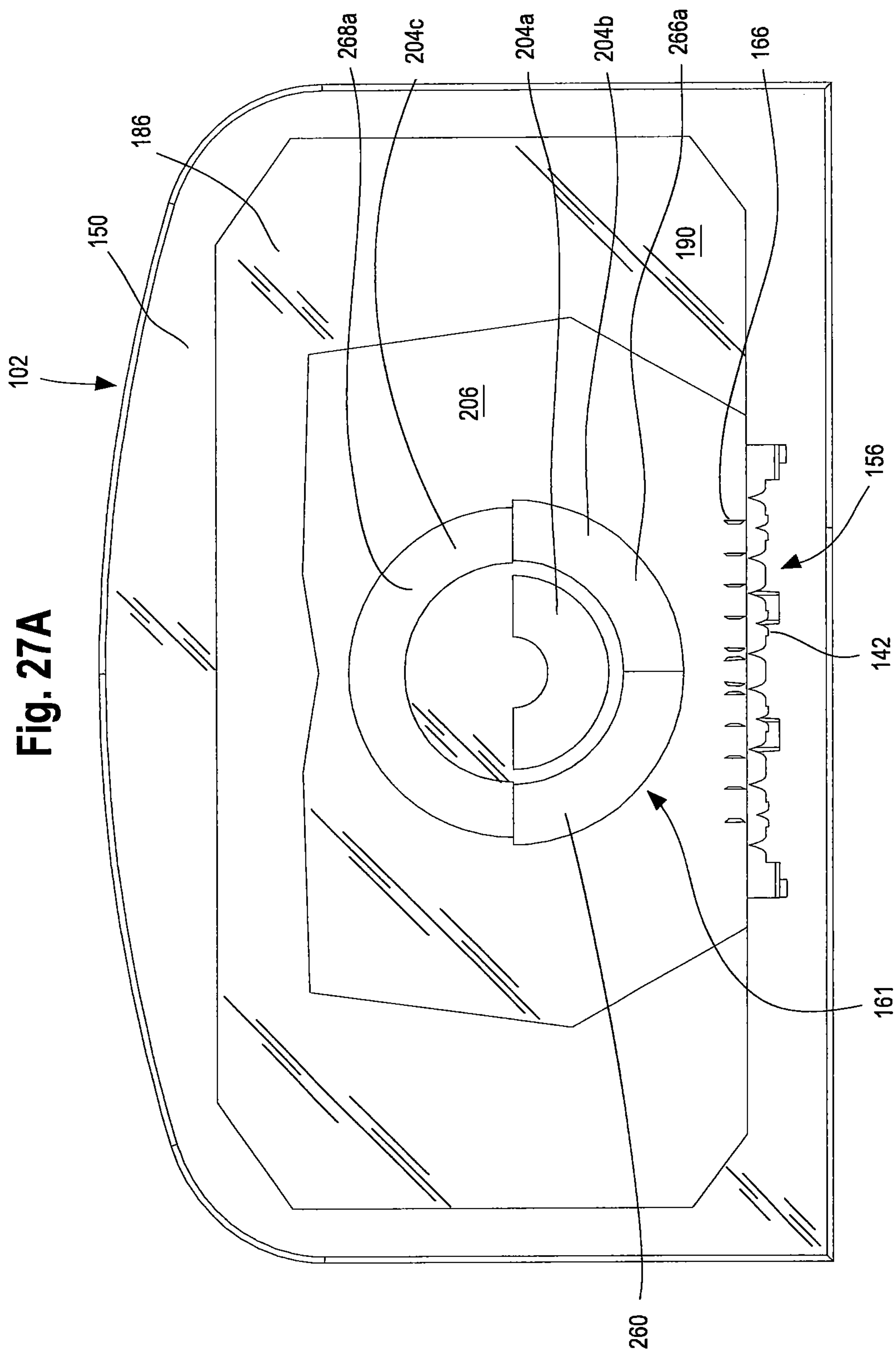
FIG. 27A is a plan view of an alternate embodiment of the waveguide body of FIG. 11.
Figure 27B:
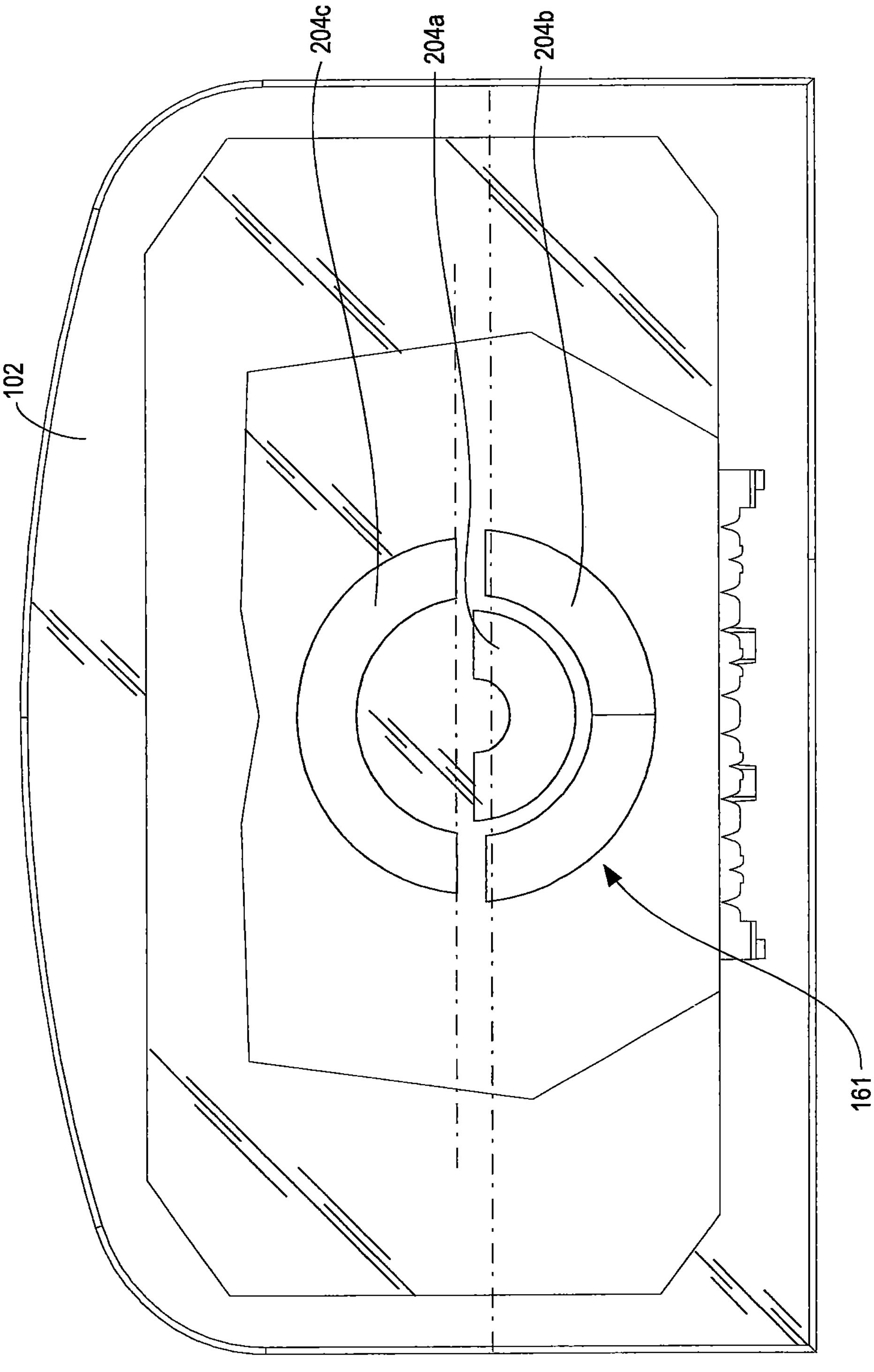
FIG. 27B is a plan view of an alternate embodiment of the waveguide body of FIG. 11.
Figure 28:
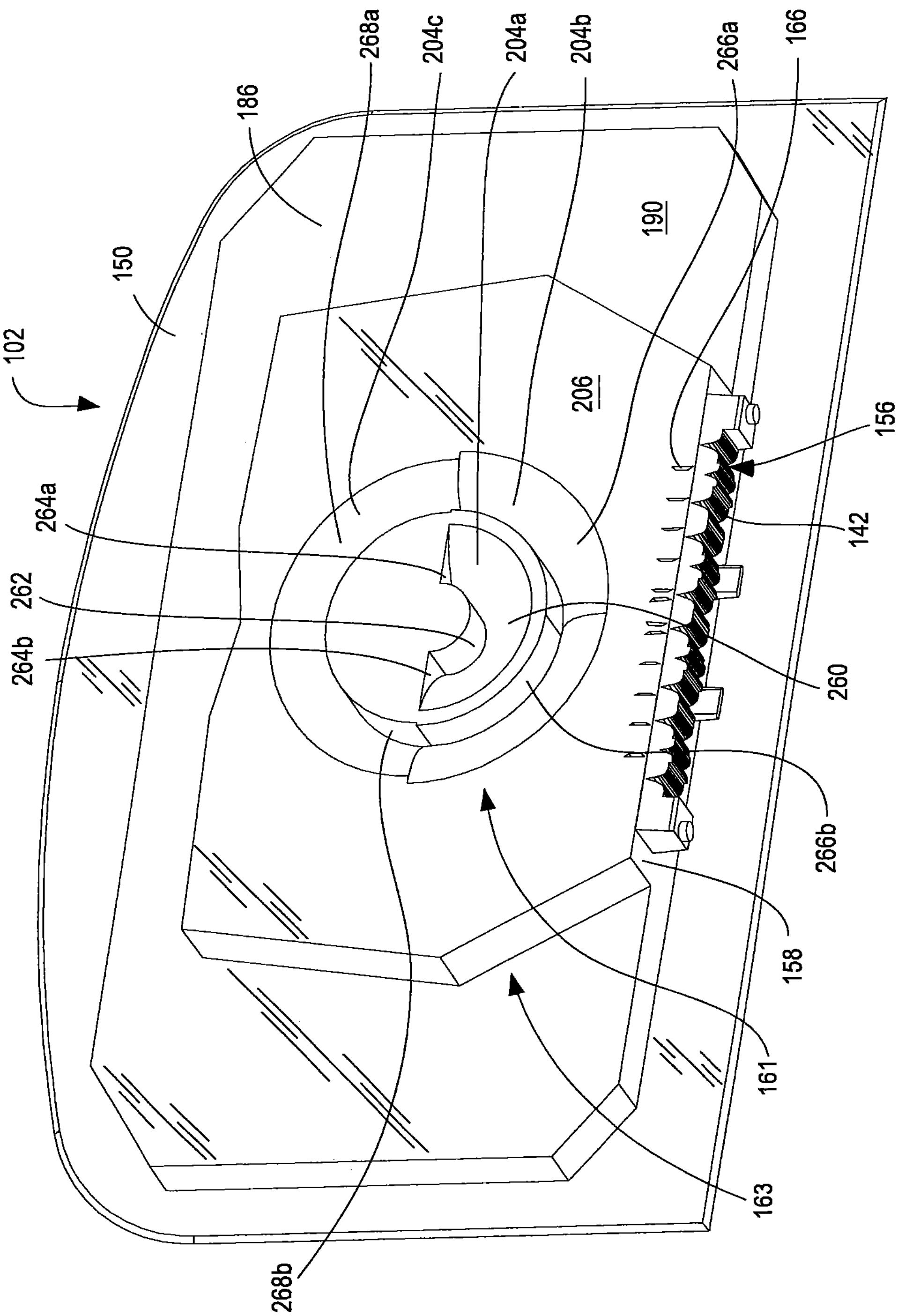
FIG. 28 is an isometric view from above of the waveguide body of FIG. 27A.
Figure 29:
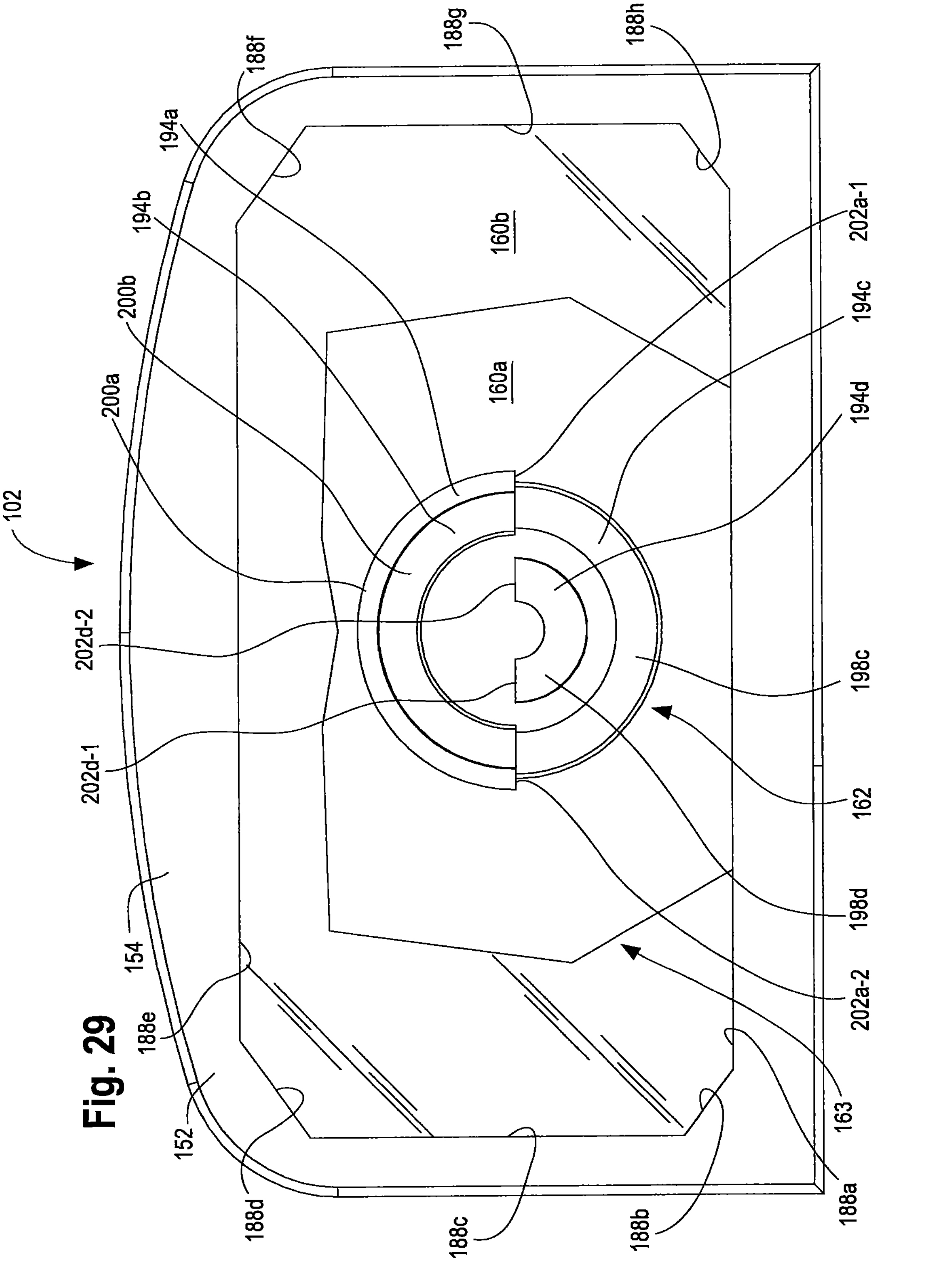
FIG. 29 is a bottom elevational view of the waveguide body of FIG. 27A.
Figure 30:
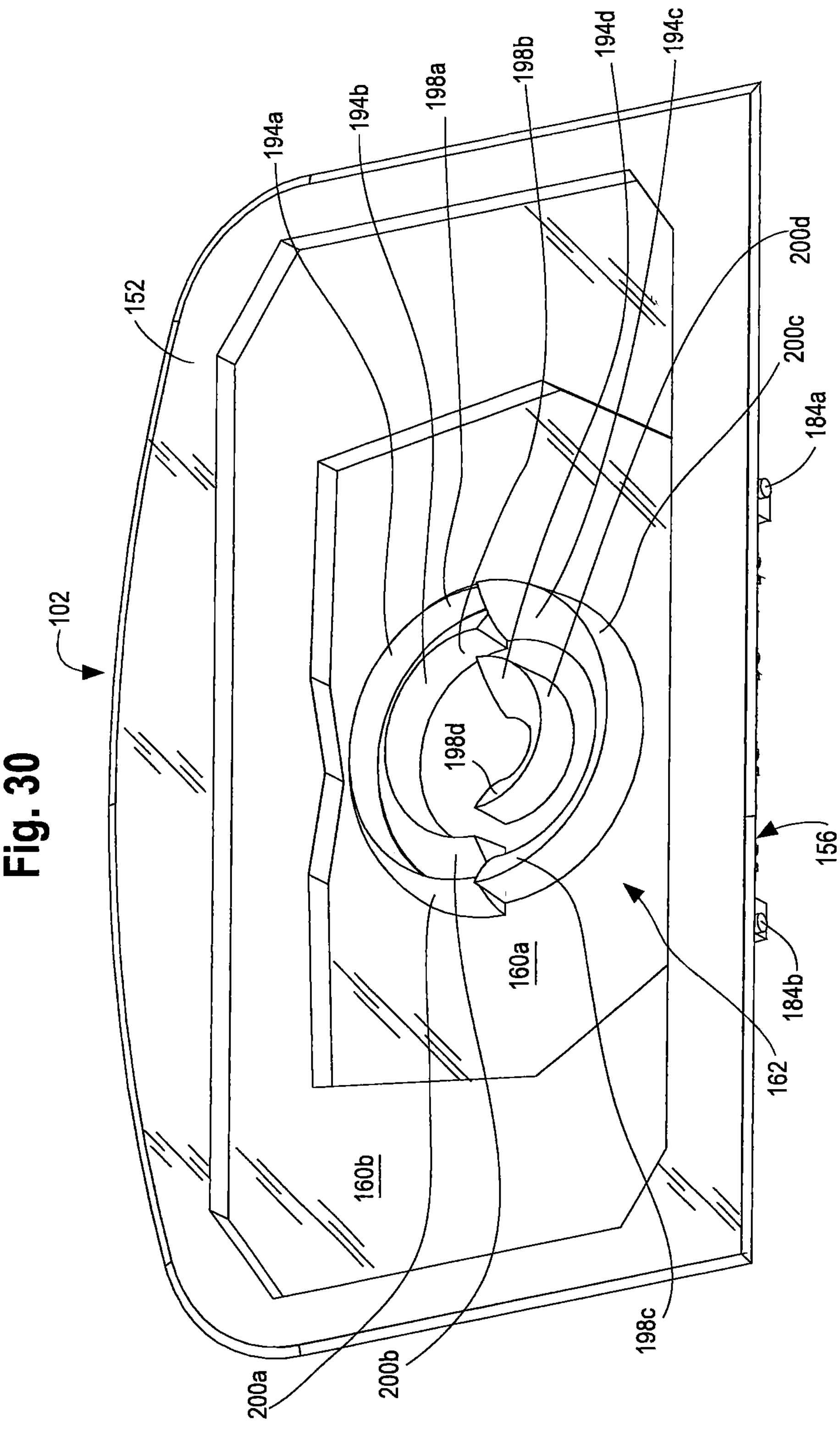
FIG. 30 is an isometric view from below of the waveguide body of FIG. 27A.

Referring next to FIGS. 27A-30, a further alternate embodiment of the waveguide body 102 is shown. In this embodiment, the facets 166 are included near the plurality of coupling cavities 142 and proximal the coupling end surface 158 for the purpose of light/color mixing within the waveguide body 102. However, the recycling feature 212 is omitted. As seen in FIGS. 27A and 28, the interior planar portion 222 of the outboard portion 186 is not delineated by the inner sidewalls 220*a*-220*h* of each recycling feature branch 214*a*, 214*b*. Instead, a planar surface 190 of the outboard portion 186 is defined by the sidewalls 210*a*-210*h* of the outboard portion 186 and further by the sidewalls 208*a*-208*h* of the interior transmission portion 206. Alternate embodiments of the waveguide body 102 with the recycling feature 212 omitted therefrom may include the facets 166 as depicted in FIGS. 27A and 28, or may instead also have the facets 166 omitted. Regardless of whether the recycling feature 212 and/or the facets 166 are omitted, the features of the bottom surface 152 seen in FIGS. 29 and 30 are similar or identical to the features of the bottom surface 152 described with reference to FIGS. 13 and 14 hereinabove. The alternate embodiment shown in FIG. 27B includes a gap between the back redirection features 204*a*, 204*b* and the front redirection features 204*c*. Further in this embodiment, the redirection feature 204*a* is offset with respect to the other redirection features 204*b*, 204*c*.

FIGS. 31-34 depict another alternate embodiment of the waveguide body 102 having modified features on the top surface 150. In this embodiment, additional material is added in and around the interior transmission portion 206 and the recycling feature 212. The branches 214*a*, 214*b* of the recycling feature 212 are merged with the interior transmission portion 206. This configuration is provided by shortening or omitting a portion of the interior planar portion 222 of the outboard portion 186 such that the coupling end surface 158 is conjoined with the end surface 216 of the recycling feature 212. This modification provides an additional sidewall 224 that defines the interior planar portion 212 nearer the coupling end surface 158. While the interior planar portion 222 does not fully separate the recycling feature 212 from the interior transmission portion 206, the interior planar portion 222 is now separated into identical left and right interior planar portions 222*a*, 222*b*. A connecting section 226 proximal the center line 172 of the waveguide body 102 is disposed between the interior planar portions 222*a*, 222*b*. The connecting section 226 provides an additional sidewall 228 to further define the interior planar portion 222*a*. The additional sidewalls 224 and 228 that further define the interior planar portion 222*a* have substantially identical mirror image counterparts on the opposite side of the center line 172 defining the interior planar portion 222*b*.

Figure 31:
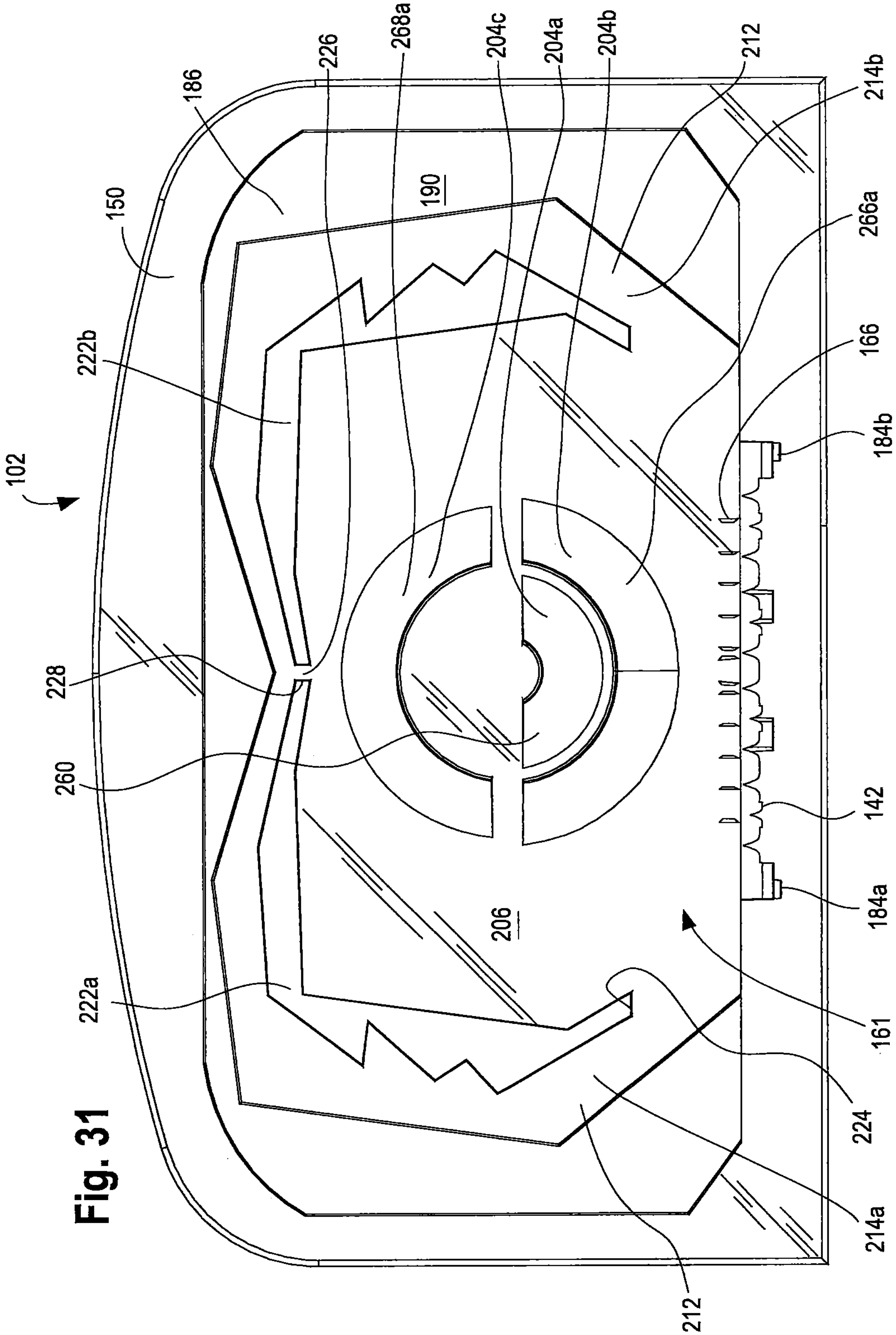
FIG. 31 is a plan view of an alternate embodiment of the waveguide body of FIG. 11.
Figure 32:
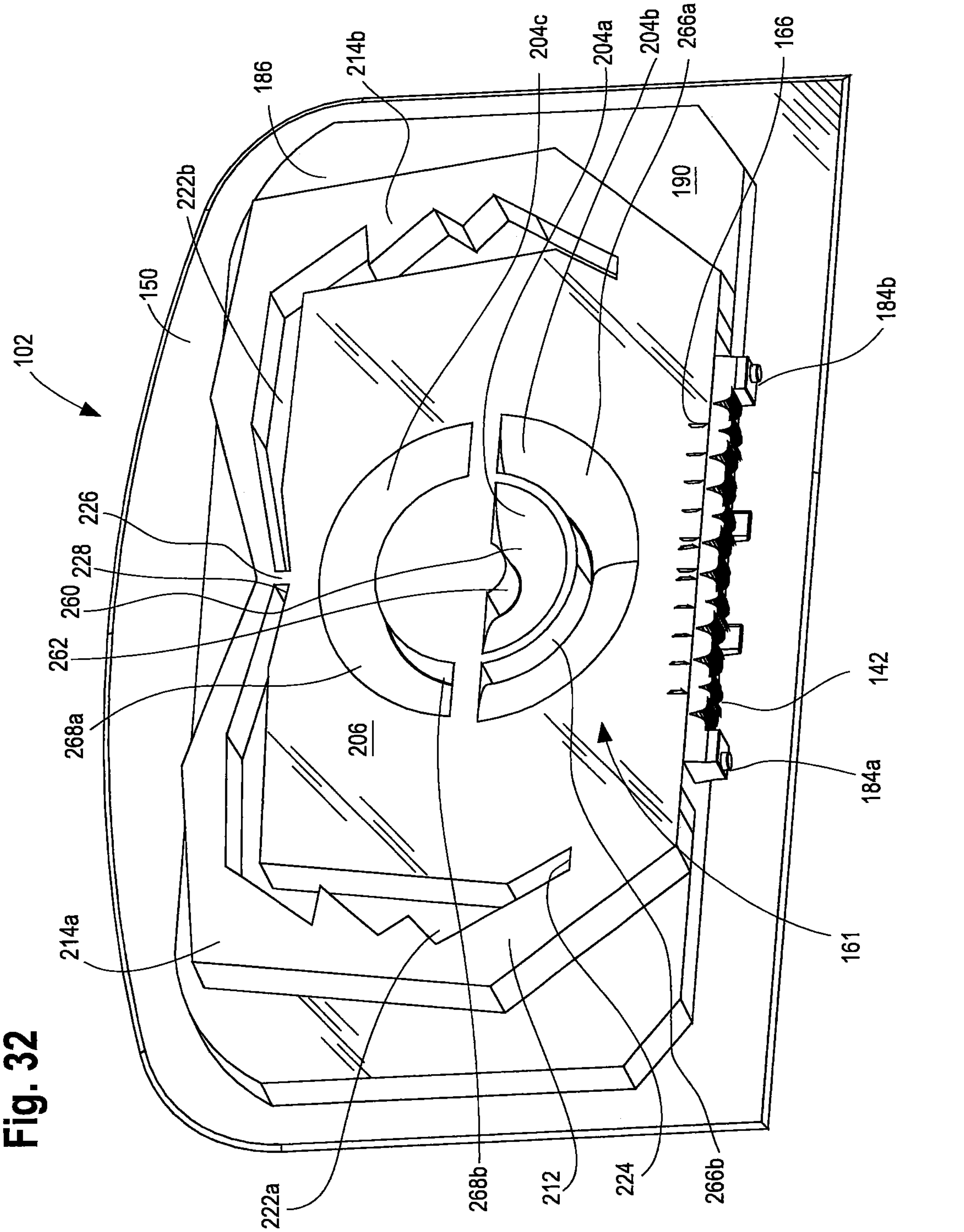
FIG. 32 is an isometric view from above of the waveguide body of FIG. 31.
Figure 33:
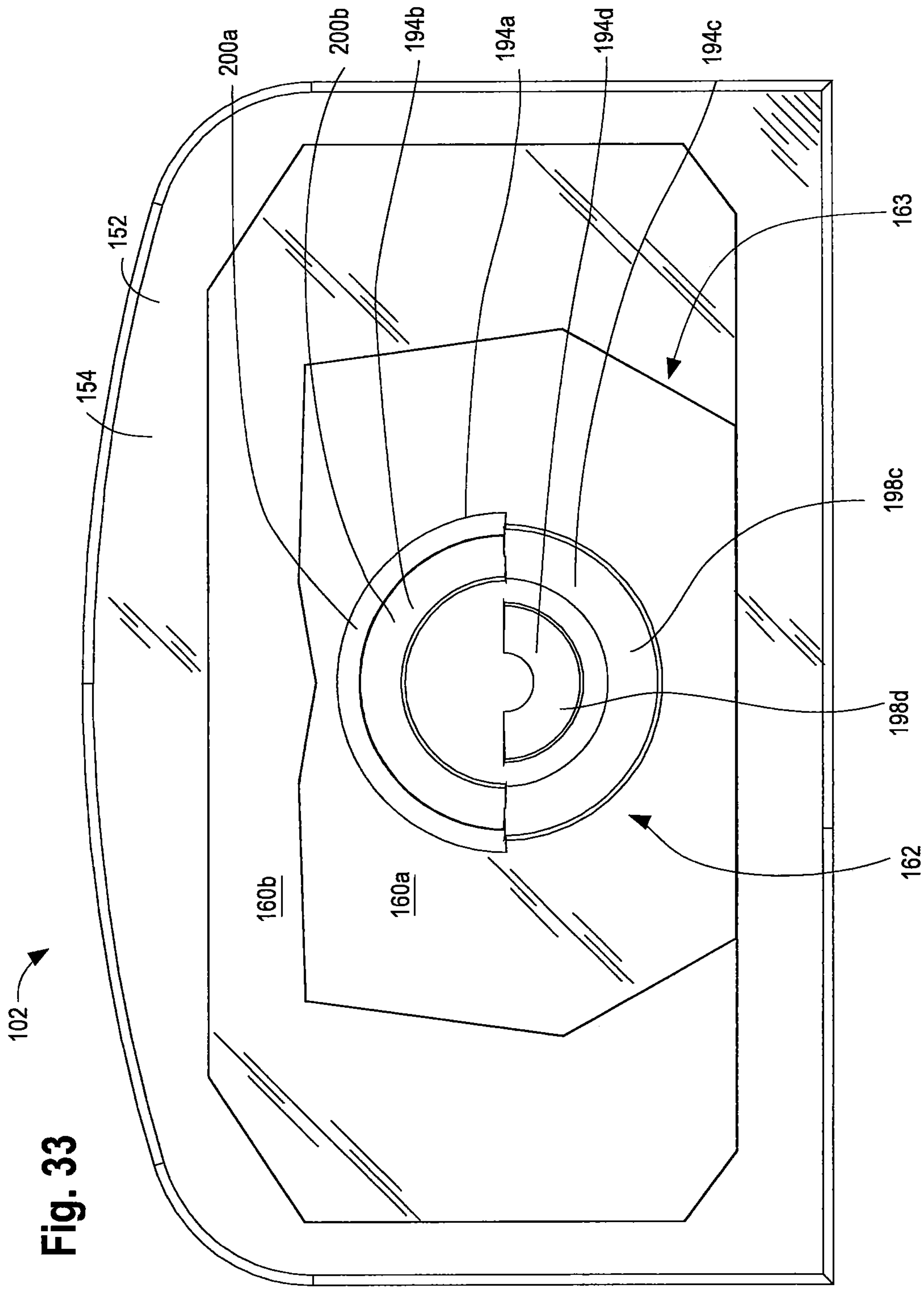
FIG. 33 is a bottom elevational view of the waveguide body of FIG. 32.
Figure 34:
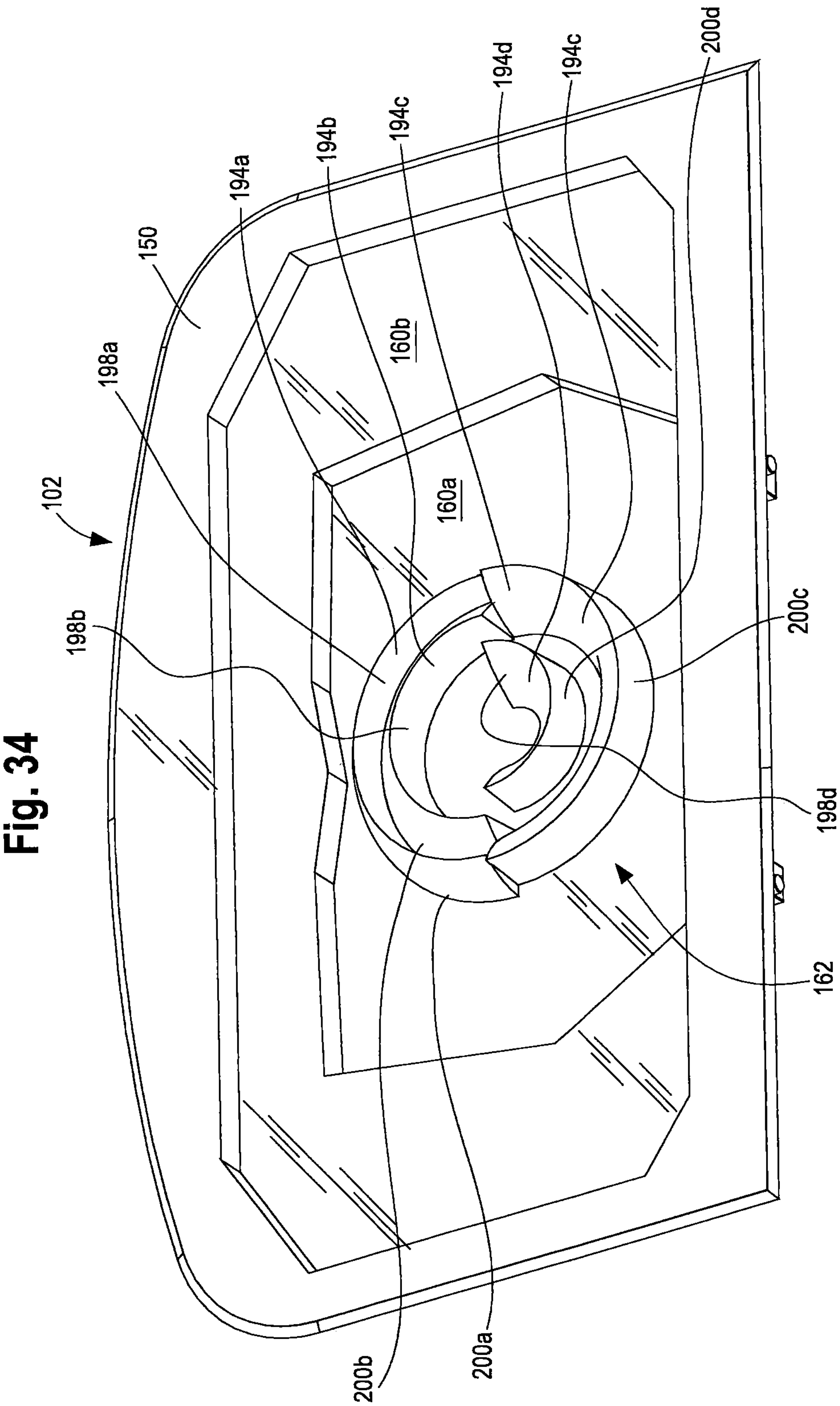
FIG. 34 is an isometric view from above of the waveguide body of FIG. 32.

This alternate embodiment of the waveguide body 102 may have parabolic or wedge-shaped entrance geometries of the coupling cavities 142 arranged along the coupling end surface 158. Further, this alternate embodiment may include the facets 166 near the coupling end surface 158, as seen in FIGS. 31 and 32, for additional color and light mixing, or the same may be omitted. FIGS. 33 and 34 depict the bottom surface 152 of the waveguide body 102 as substantially identical to the bottom surface 152 depicted previously and detailed with reference to FIGS. 13 and 14.

Figure 35:
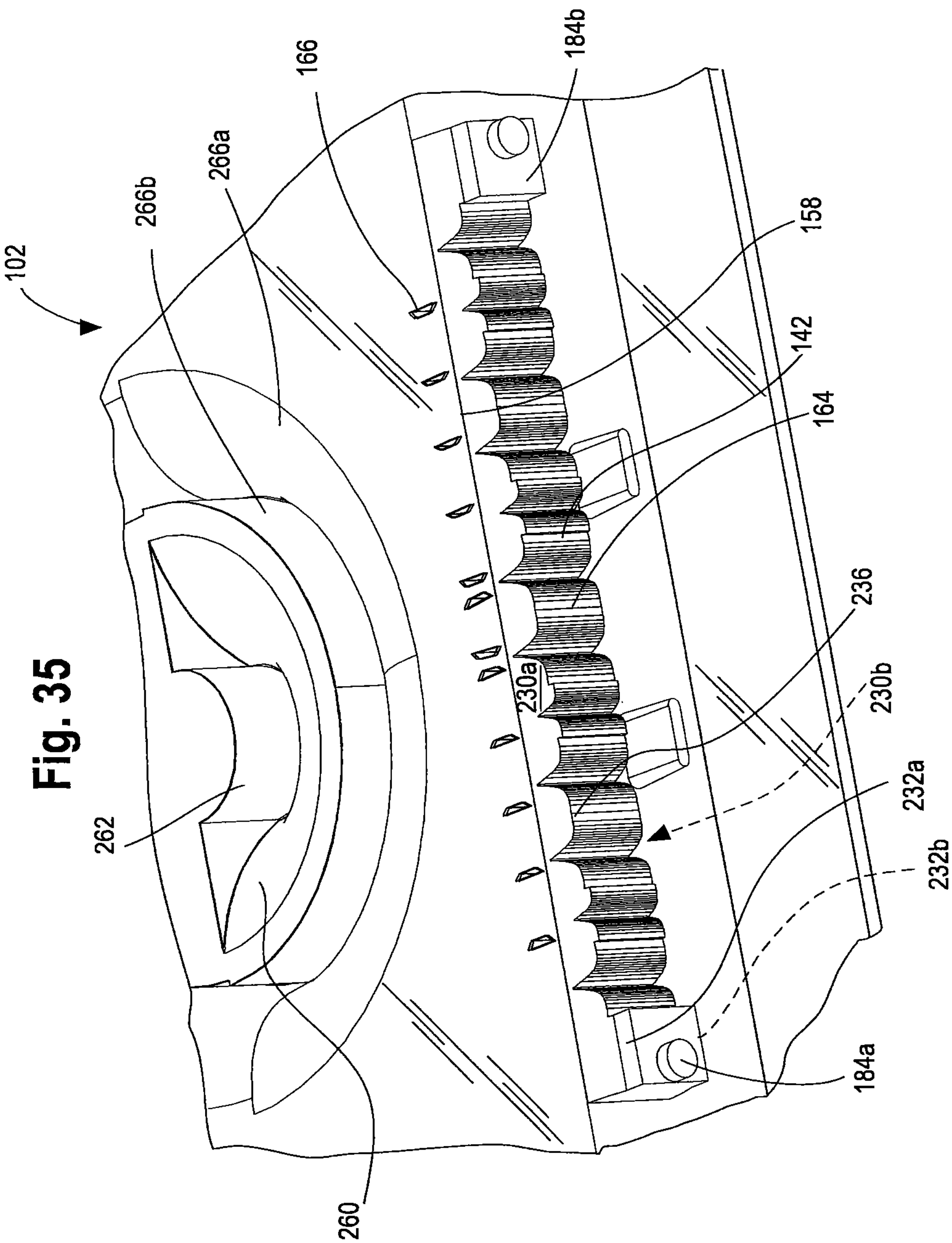
FIG. 35 is an enlarged, fragmentary, isometric view from above of a wedge-shaped coupling cavity entrance geometry of an embodiment of the waveguide body.
Figure 36:
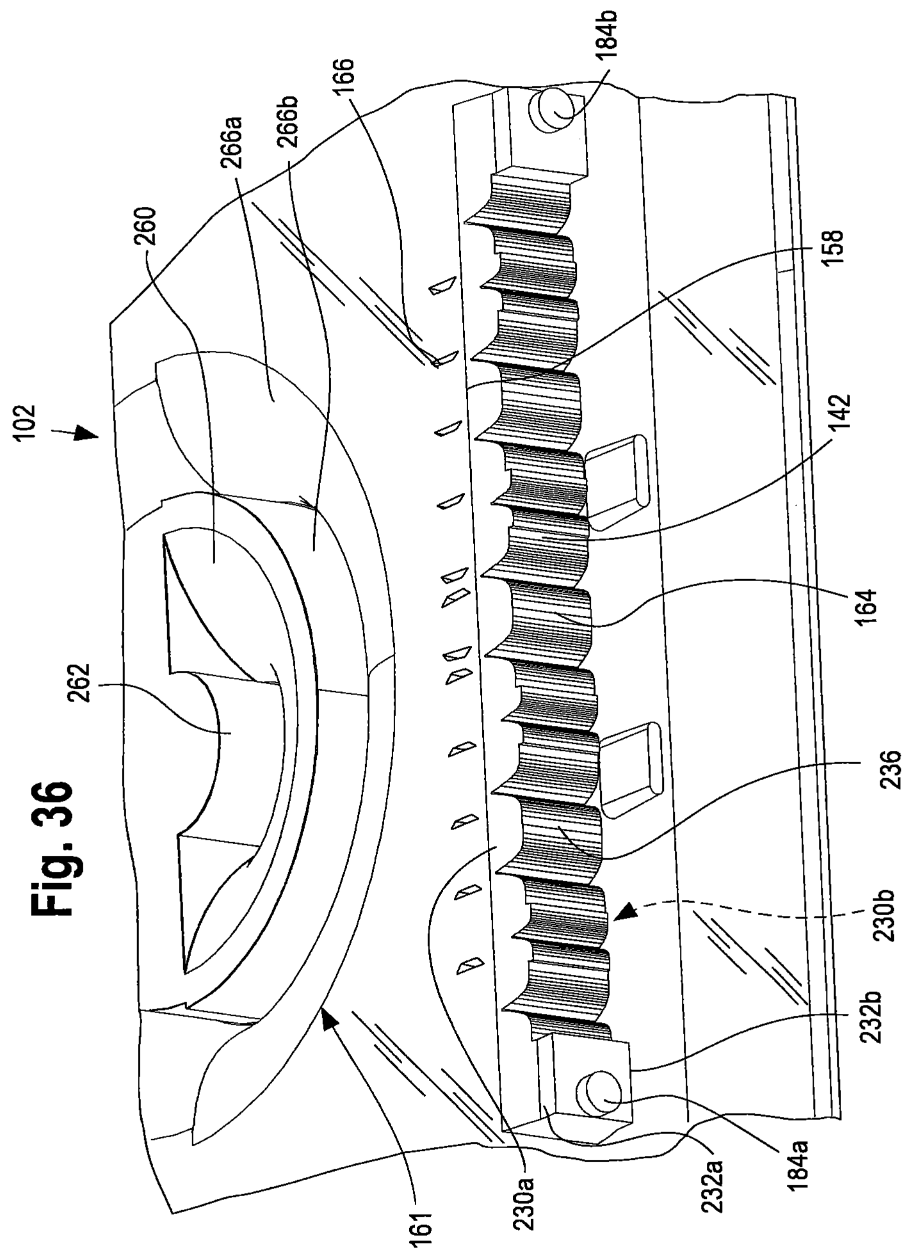
FIG. 36 is an enlarged, fragmentary, isometric view from above of a parabolic coupling cavity entrance geometry of an embodiment of the waveguide body.
Figure 37:
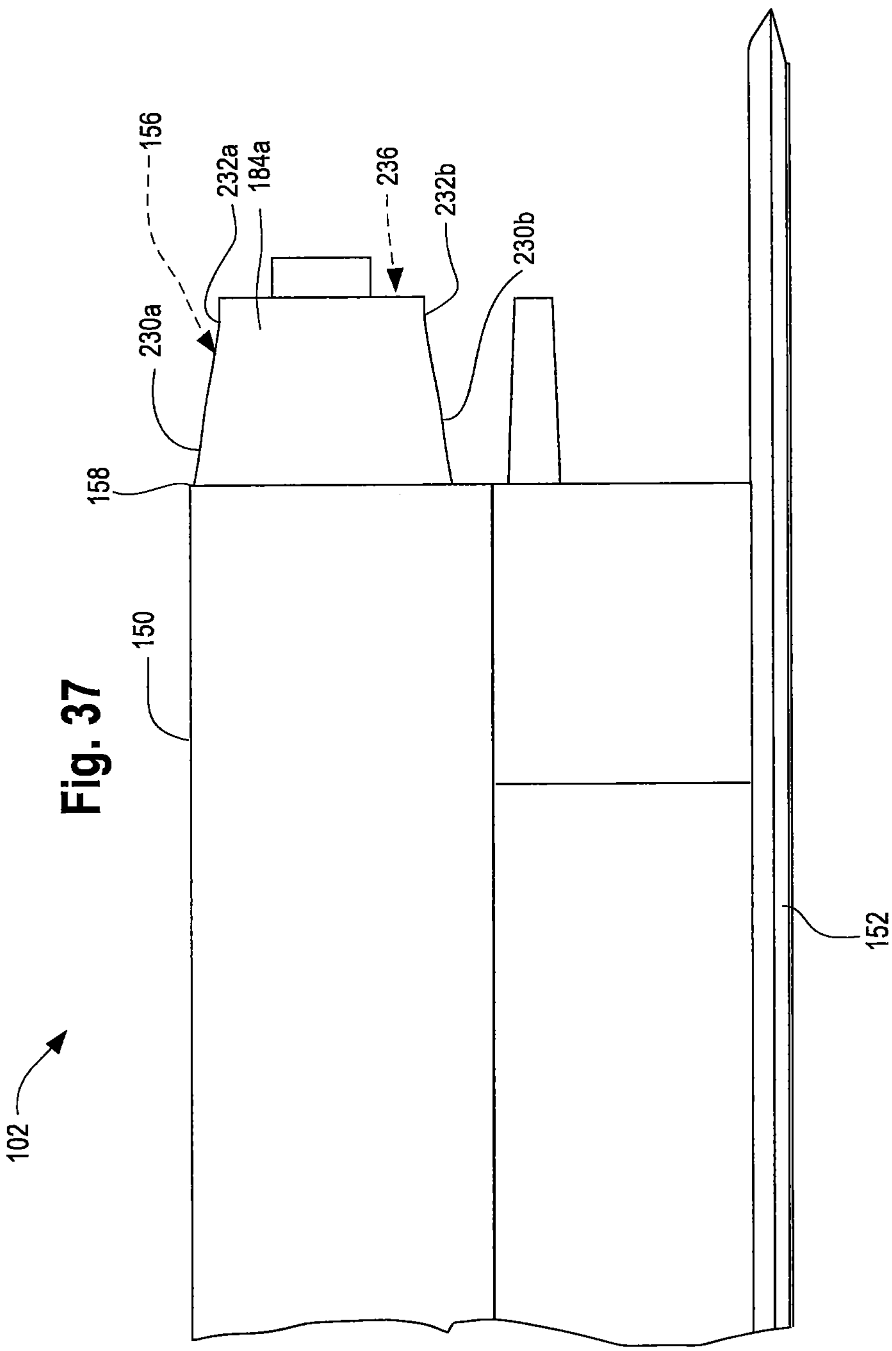
FIG. 37 is a side elevational view of the wedge-shaped coupling cavity entrance geometry of FIG. 35.
Figure 38:
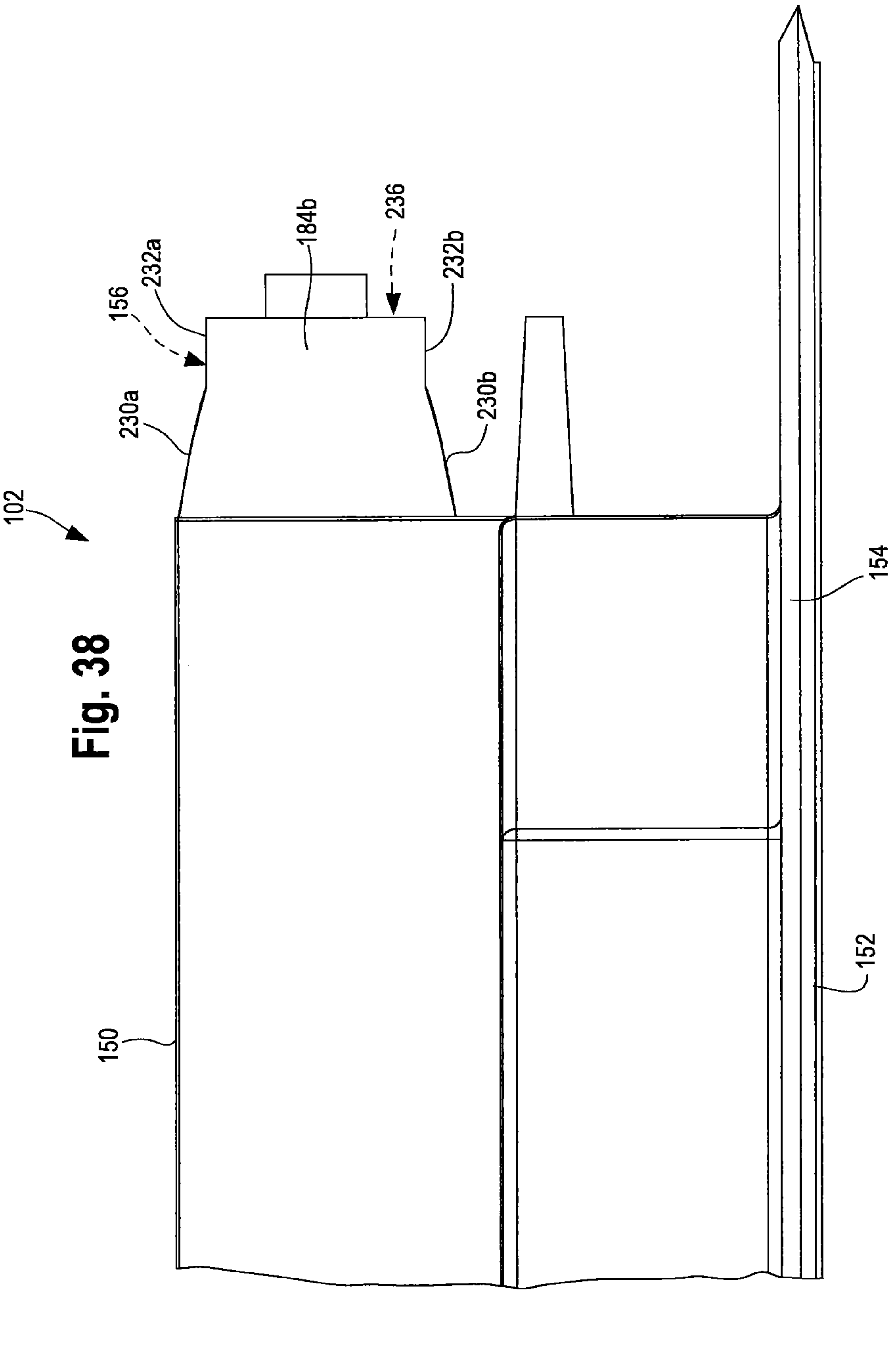
FIG. 38 is a side elevational view of the parabolic coupling cavity entrance geometry of FIG. 36.

Referring now to FIG. 35, an enlarged isometric view of the wedge-shaped coupling cavity entrance geometry of FIG. 25 is shown along with protrusions 184*a*, 184*b* for attaching and aligning the LED elements 136 and main holding member 180 to the waveguide body 102. Likewise, FIG. 36 shows an enlarged isometric view of the parabolic coupling cavity entrance geometry as previously seen in FIG. 24. FIGS. 37 and 38 show the wedge-shaped and parabolic coupling cavity entrance geometries, respectively. In FIGS. 35-38 the upper and lower surfaces 230*a*, 230*b*, 232*a*, 232*b* are shown. In both the wedge-shaped and parabolic coupling cavity entrance geometry embodiments, the upper and lower surfaces 230*a*, 230*b*, are tapered from where said surfaces meet the coupling end surface 158 to an end 236 of the coupling cavities 142 that meets the PCB 140 and LED elements 136. The upper and lower surfaces 230*a*, 230*b* are wider apart at the coupling end surface 158 and are tapered to be closer to one another at distances further therefrom until the upper and lower surfaces 230*a*, 230*b* are a height suitable for coupling to a column of LED elements as shown in FIG. 15.

As seen in FIG. 37 illustrating the wedge-shaped entrance geometry, the upper and lower surfaces 230*a*, 230*b* abut the upper and lower surfaces 232*a*, 232*b* near the end 236 of the coupling cavities 142. Further shown in FIG. 38, which illustrates the parabolic entrance geometry, the upper and lower surfaces 230*a*, 230*b*, also abut the upper and lower surfaces 232*a*, 232*b* near the end 236 of the coupling cavities 142. However, the upper and lower surfaces 232*a*, 232*b* are relatively larger in the parabolic entrance geometry embodiment of FIGS. 36 and 38, as compared with the corresponding upper and lower surfaces 232*a*, 232*b* of the wedge-shaped entrance geometry embodiment in FIGS. 35 and 37.

Figure 39:
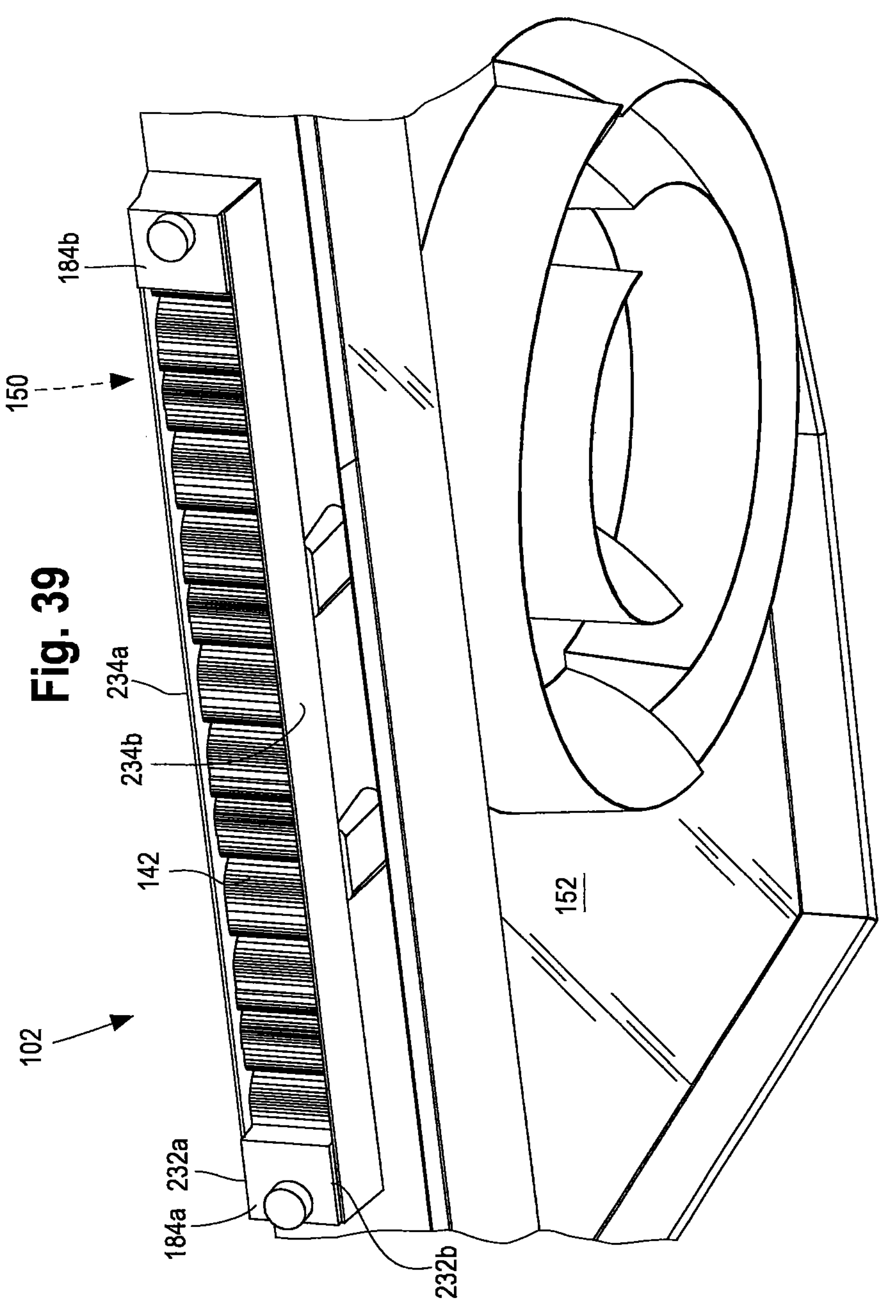
FIG. 39 is an enlarged, fragmentary, isometric view from above of a parabolic coupling cavity entrance geometry with reflective panels thereabout.
Figures 40, 41:
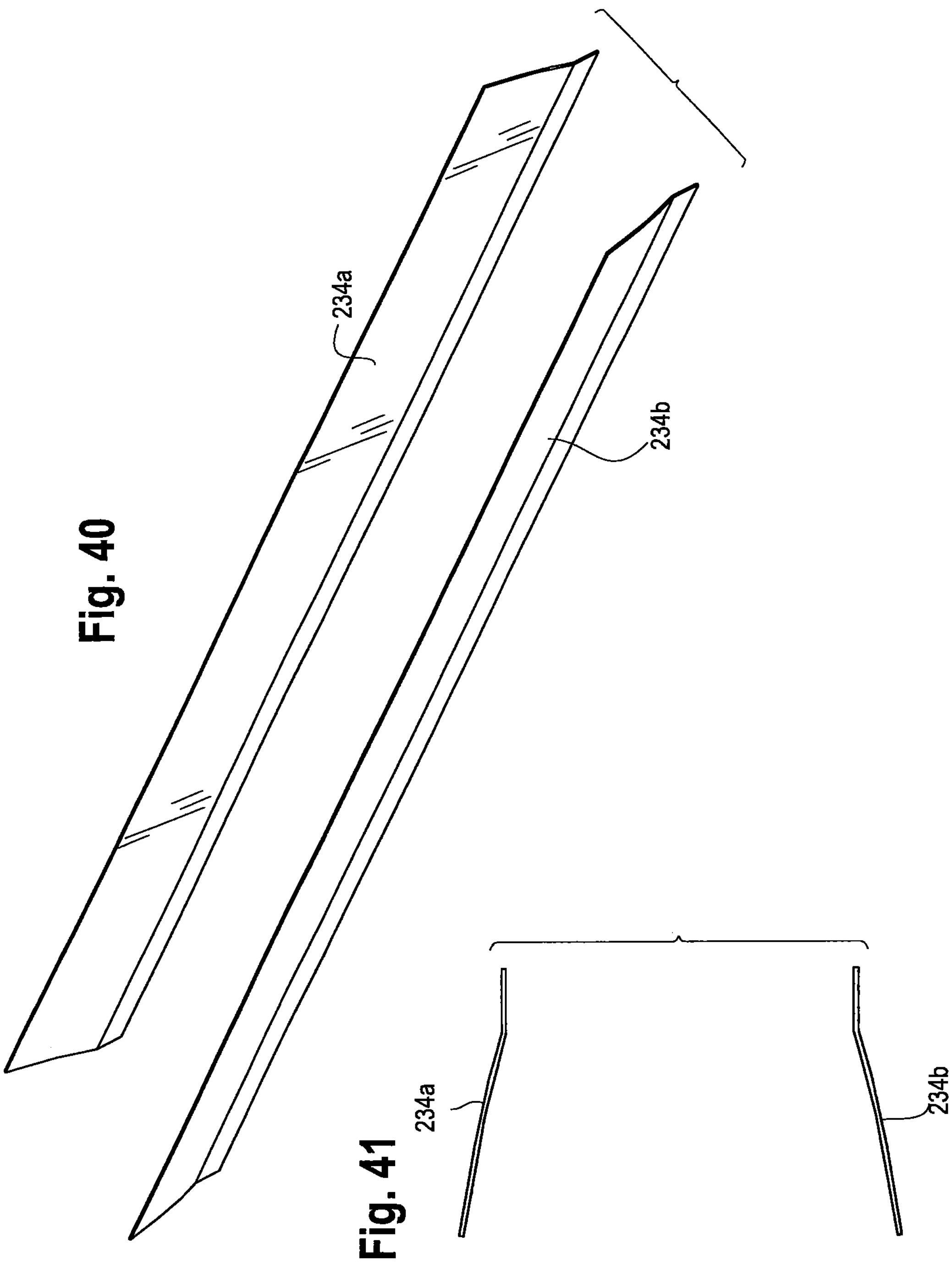
FIG. 40 is an isometric view of the reflective panels of FIG. 39.
FIG. 41 is a side elevational view of the reflective panels of FIG. 39.
Figures 42, 43:
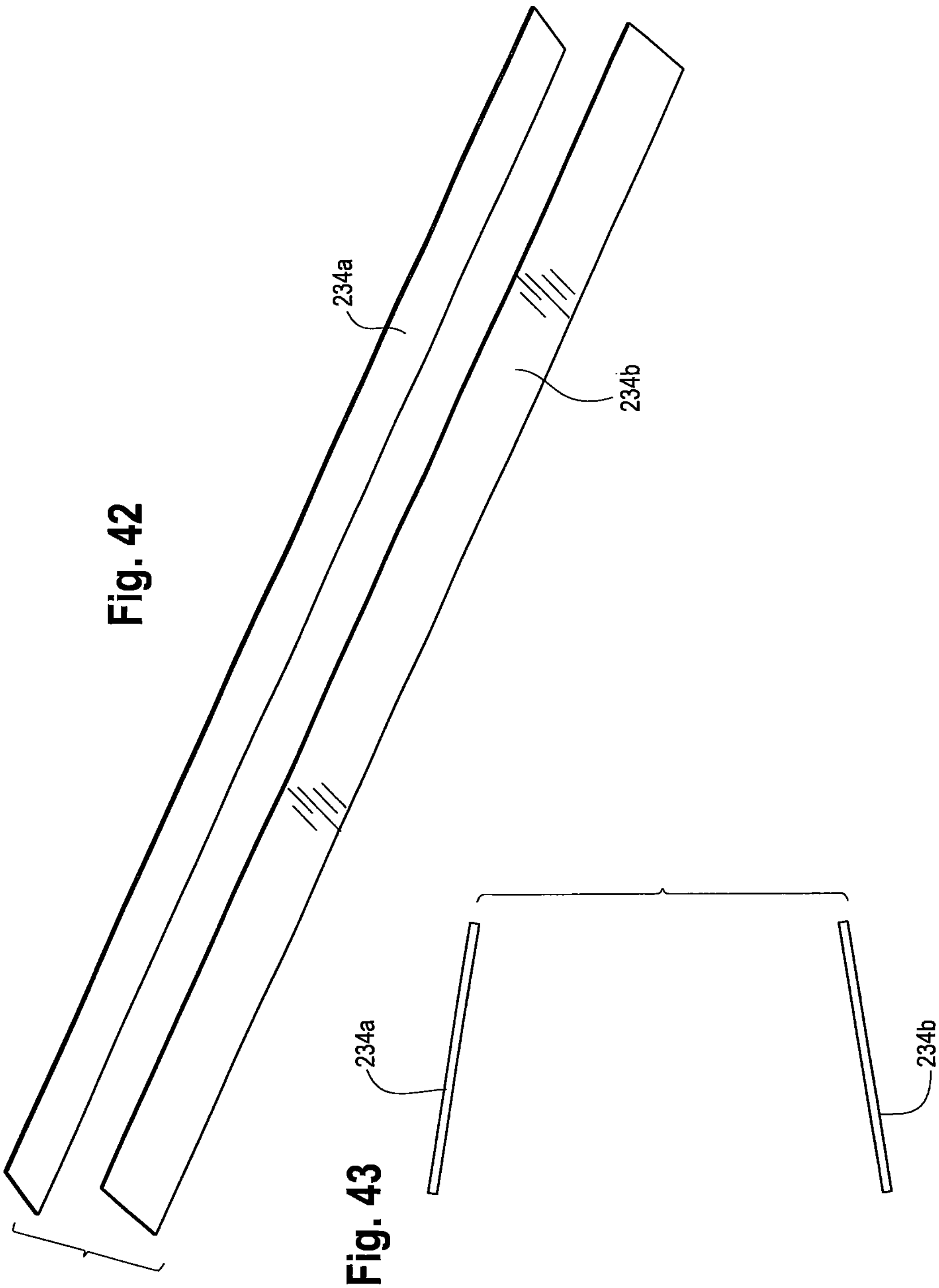
FIG. 42 is an isometric view of reflective panels for use with the wedge-shaped coupling cavity entrance geometry of FIG. 36.
FIG. 43 is a side elevational view of the reflective panels of FIG. 42.

Referring now to FIG. 39, upper and lower reflective panels 234*a*, 234*b* may be arranged above and below the plurality of coupling cavities 142 along the upper and lower entrance geometry surfaces 230*a*, 230*b*. The reflective panels 234*a*, 234*b* assist in directing light from the LED elements 136 into the coupling cavities 142. FIGS. 39, 42, ad 43 show the reflective panels 234*a*, 234*b* utilized with the wedge-shaped entrance geometry. As illustrated, the reflective panels 234*a*, 234*b* for the wedge-shaped entrance geometry are substantially planar and may abut only the upper and lower wedge-shaped entrance geometry surfaces 230*a*, 230*b* without contacting the surfaces 232*a*, 232*b*. FIGS. 40 and 41 depict an embodiment of the reflective panels 234*a*, 234*b* for use with the parabolic entrance geometry. In this embodiment, each of the reflective panels 234*a*, 234*b* is configured such that the reflective panel 234*a*, 234*b* is bent or otherwise shaped to match the contour of the surfaces 230*a*, 230*b* as well as the surfaces 232*a*, 232*b* of the parabolic entrance geometry as seen in FIGS. 36 and 38.

Any number of any of the embodiments of the waveguide body 102 shown and described hereinabove may be utilized in the post top luminaries 300, 300*a*, 300*b* depicted in FIGS. 44-51 to produce an illumination pattern extending 360 degrees about the luminaire 300, 300*a*, 300*b*.

Figure 44:
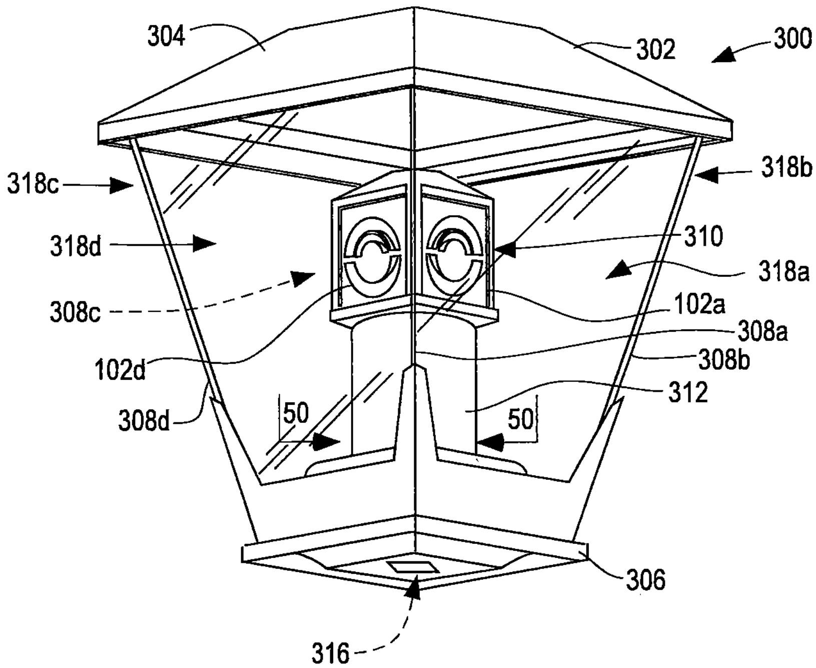
FIG. 44 is a side elevational view of a post top luminaire utilizing a waveguide body.
Figure 45:
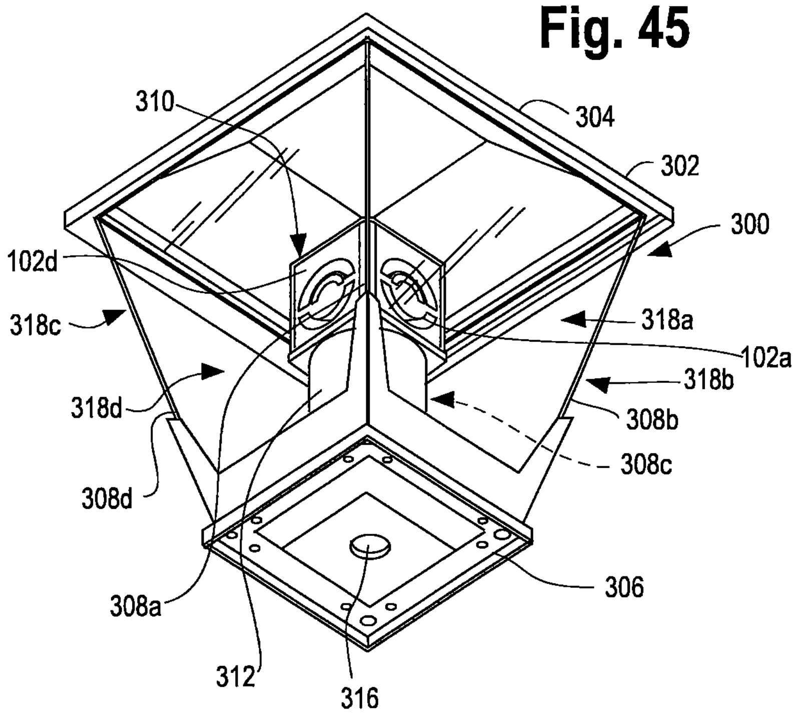
FIG. 45 is an isometric view from below of the post top luminaire of FIG. 44.

As seen in FIGS. 44 and 45, four waveguide bodies 102*a*-102*d* are arranged vertically in a square optical configuration 310 within a post top luminaire housing 302. The post top luminaire housing 302 includes a cover 304, a base 306, and at least four corner struts 308*a*-308*d* arranged therebetween. The struts, 308*a*-308*d*, the cover 304, and the base 306 together define four sides 318*a*-318*d* of the post top luminaire 300. The sides 318*a*-318*b* may have disposed therein a panel made of glass, plastic, or another suitable light transmissive material. The embodiment of the waveguide bodies 102*a*-102*d* utilized in the post top 302 are modified to remove segments of the outboard portion 186 and the interior transmission portion 206 as shown in FIGS. 44 and 45. Furthermore, the waveguide bodies 102*a*-102*d* are arranged vertically, and adjacent one another to form the square optical configuration 310 such that LED elements 136 may be coupled with the coupling cavities 142 thereof from either the top (nearer the cover 304) or bottom (nearer the base 306). In the embodiment of FIGS. 44 and 45 the bottom surface 152 as described hereinabove faces inward toward the center of the square optical configuration 310, while the previously-described top surface 150 of each waveguide body 102*a*-102*d* faces out and away from the square optical configuration 310.

Referring still to FIGS. 44 and 45, the square optical configuration 310 is disposed on a circular cylindrical support post 312. The cylindrical support post 312 may contain operating circuitry 314 (see FIGS. 50 and 51) for powering the LED elements 136 or otherwise controlling the post top luminaire 300. Wiring or other access to a power source may pass through a hole 316 in the base 306 that leads into an interior of the cylindrical support post 312. The support post 312 may have an alternate shape, for example the support post 312 may be square in cross section. As described above, the light distribution provided by the waveguide bodies 102*a*-102*d* is symmetrical about 360 degrees in a Type 5 distribution pattern. Thus the square optical configuration 310 shown in FIGS. 44 and 45 provides a distribution of light in all (or substantially all) directions from each side 318*a*-318*d* of the post top luminaire 300. However, in an alternate embodiment the waveguide bodies 102*a*-102*d* may develop a Type 3 light distribution pattern to provide additional downlight, or the waveguide bodies 102*a*-102*d* may develop a different symmetric or asymmetric light distribution individually or in combination. Utilizing the vertical configuration 310 of the four waveguide bodies 102*a*-102*d*, a Type 5 distribution may be created, on the whole, with a circular or square pattern by appropriately modifying the light redirection and reflection features 161 and/or the light refraction and extraction features 162 of the waveguide bodies 102*a*-102*d*, or through the inclusion of additional facets or features. In addition, Type 2, Type 3, or Type 4 distributions may be developed by omitting one of the four waveguide bodies 102*a*-102*d* and by adjusting the facets or features 161, 162 of the three retained waveguide bodies.

Figure 46:
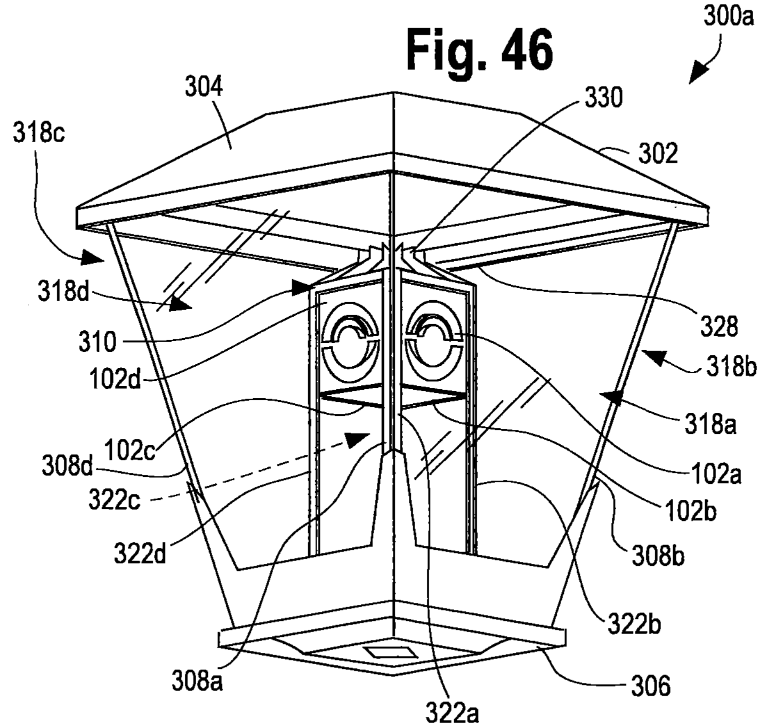
FIG. 46 is a side elevational view of an alternate embodiment of a post top luminaire utilizing a waveguide body.
Figure 47:
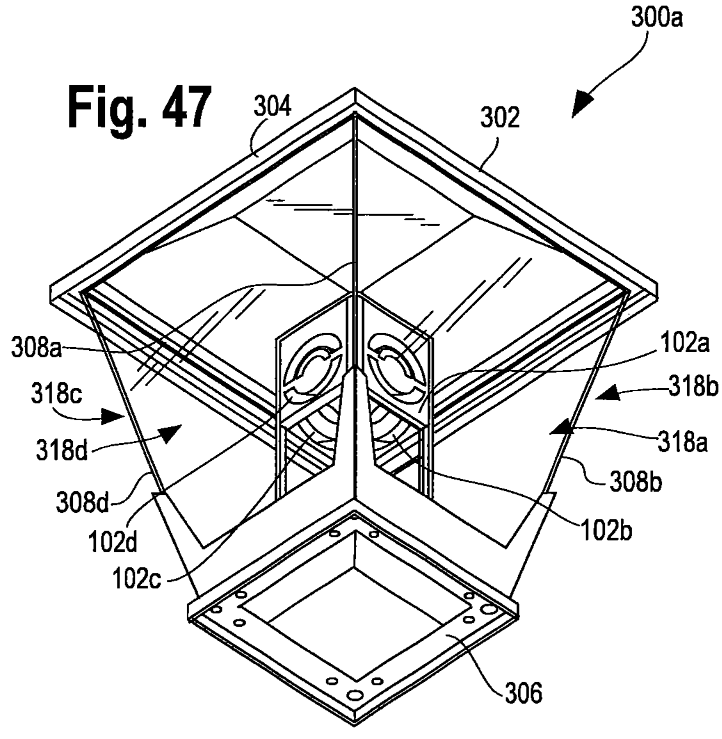
FIG. 47 is an isometric view from below of the alternate post top luminaire of FIG. 46.

Referring now to FIGS. 46 and 47, a luminaire 300*a* retains many of the features described with respect to the post top luminaire 300 of FIGS. 44 and 45. However, in this embodiment, the cylindrical support post 312 is replaced with four support members 322*a*-322*d*. Thus, the operating circuitry 314 is relocated into the cover 304. Furthermore, in the optical configuration 310*a* of FIGS. 46 and 47, the previously-described bottom surface 152 of each of the waveguide bodies 102*a*-102*d* faces out and away from the optical configuration 310*a*, while the previously-described top surface 150 of each of the waveguide bodies 102*a*-102*d* is oriented toward the interior of the square optical configuration 310*a*. Again, the optical configuration 310*a* provides a distribution of light in all directions and from each side 318*a*-318*d* of the post top luminaire 300*a*. A mounting section 328 operatively connects the square optical configuration 310*a* with the cover 304 and the operating circuitry 314 disposed therein. The mounting section 328 provides a heat sink function or is in thermal communication with a heat sink 330 arranged within the cover 304. The support members 322*a*-322*d* may also provide a heat sinking function for the square optical configuration 310*a*.

Figure 48:
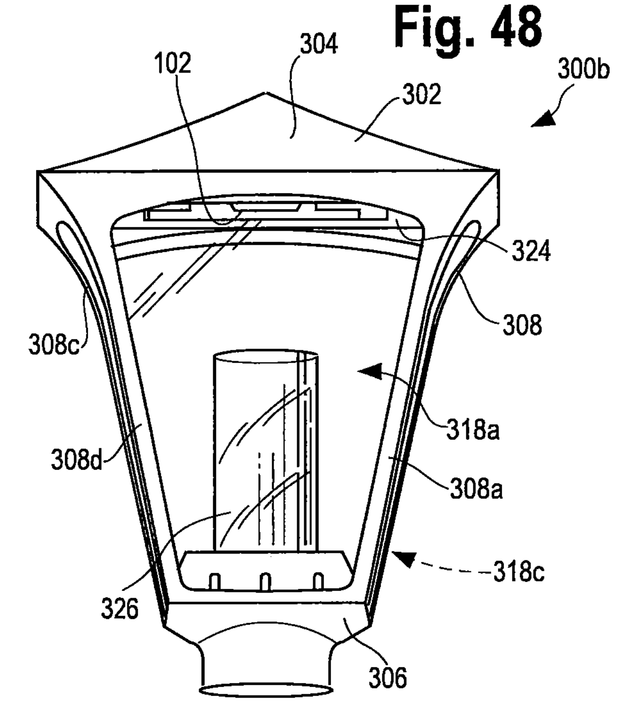
FIG. 48 is a side elevational view of an alternate embodiment of a post top luminaire utilizing the waveguide body of FIG. 11.
Figure 49:
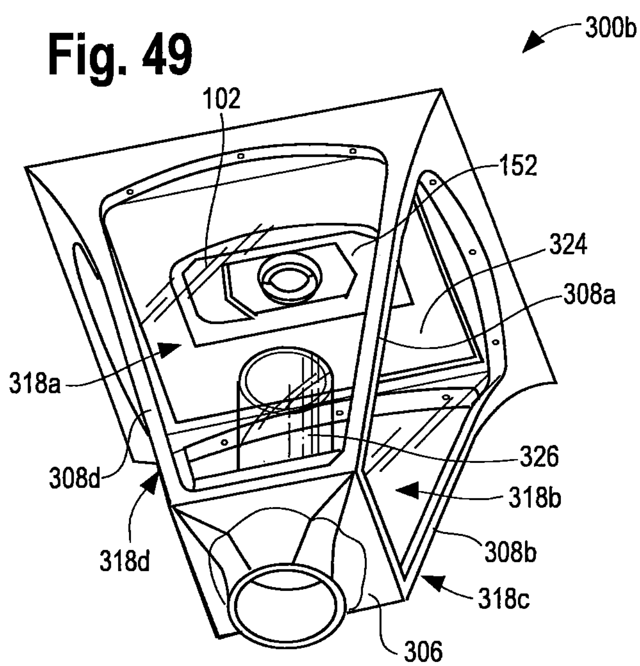
FIG. 49 is an isometric view from below of the alternate post top luminaire of FIG. 48.
Figure 50:
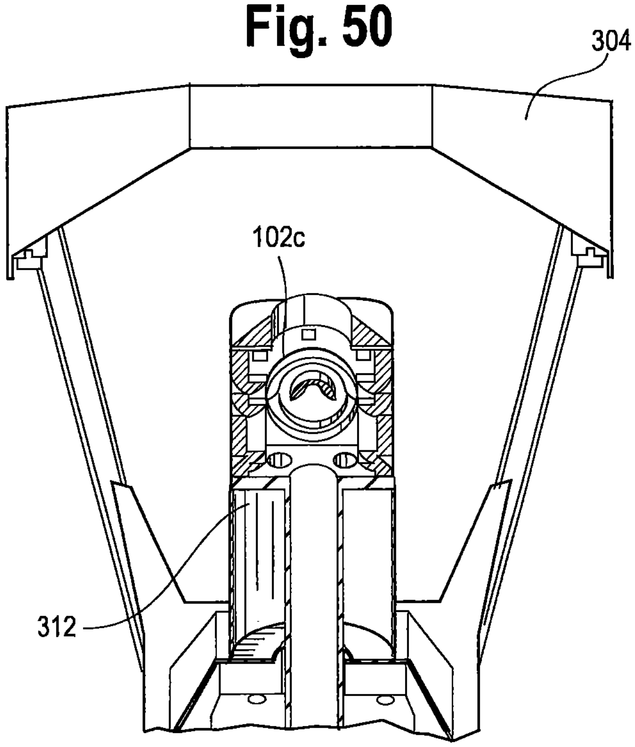
FIG. 50 is a cross-sectional view of the post top luminaire taken generally along the lines 50-50 indicated in FIG. 44.
Figure 51:
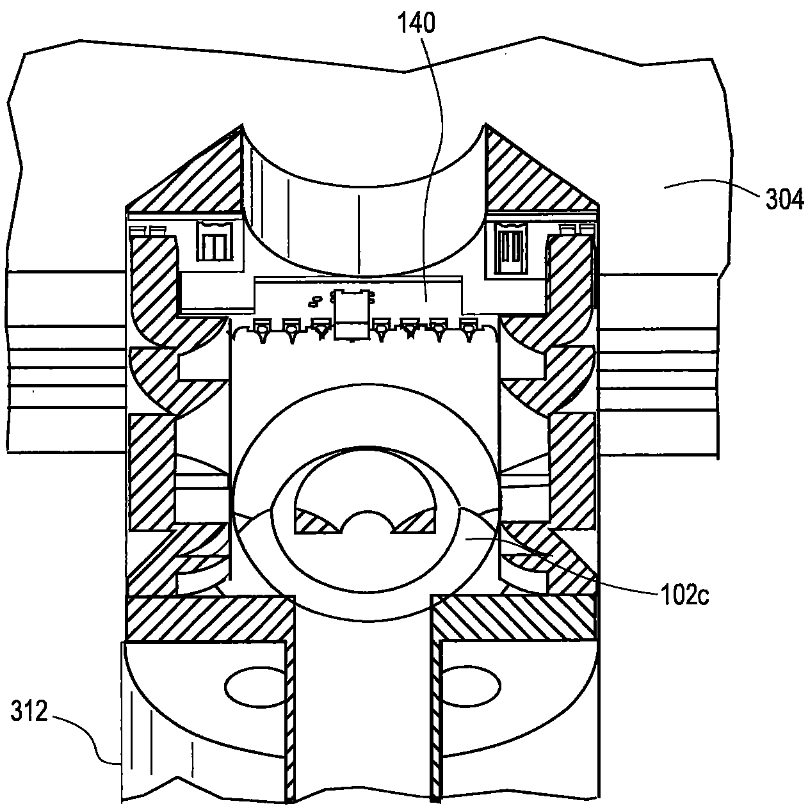
FIG. 51 is an enlarged, isometric view from below of the cross-sectional view shown in FIG. 50.

An alternate embodiment of the post top luminaire 300*b* is pictured in FIGS. 48 and 49. In this embodiment, the square optical configuration 310, 310*a* and the cylindrical support post 312 are omitted. Instead of four modified waveguide bodies 102*a*-102*d*, the optical waveguide body 102, as shown and described hereinabove for utilization in the luminaire 100, is disposed as a single waveguide within the cover 304. The waveguide body 102 is laterally arranged similar to the configuration thereof in the luminaire 100, such that the waveguide body 102 is horizontal with the bottom surface 152 facing downward toward the interior of the post top luminaire housing 302. The LED elements 136 are aligned with the coupling cavities 142 of the waveguide body 102 from one side thereof within the post top luminaire cover 304. The single waveguide body 102 is inserted in and retained by any suitable means within a lower surface 324 of the cover 304. The waveguide body 102 is proximal a center of the lower surface 204 of the cover 304, and is further arranged above, but spaced from a decorative lens 326. The operating circuitry 314 and a heatsink 330 are disposed above the waveguide body 102 within the cover 304. As with the luminaire 100, the post top luminaire 300*b* comprising the waveguide body 102 in a lateral configuration may develop a Type 5 light distribution that is emitted in 360 degrees through the four sides 318*a*-318*d* of the post top 314. This emission distribution may be facilitated by light redirected by the decorative lens. Alternatively, Type 2, Type 3, or Type 4 light distributions may also be created by modifying the refraction and extraction features 162 and/or the light redirection and reflection features 161 or other facets of the waveguide body 102 while maintaining the lateral configuration. In addition, by combining the lateral waveguide body 102 with a specially shaped decorative lens 326 in conjunction with reflection or scattering means associated with the decorative lens 326, various light distributions may be efficiently developed.

In some embodiments, the waveguide body includes a plurality of reflection and/or refraction features and a plurality of redirection features. In further embodiments, redirection and reflection features are disposed on or in a first surface of the waveguide and refraction and extraction features are disposed on or in a second surface of the waveguide opposite the first surface. Further still, the waveguide and luminaire dimensions are exemplary only, it being understood that one or more dimensions could be varied. For example, the dimensions can all be scaled together or separately to arrive at a larger or smaller waveguide body, if desired. While a uniform distribution of light may be desired in certain embodiments, other distributions of light may be contemplated and obtained using different sidewall surfaces of extraction/reflection/refraction features.

Other embodiments of the disclosure including all of the possible different and various combinations of the individual features of each of the foregoing embodiments and examples are specifically included herein. Any one of the light reflection features could be used in an embodiment, possibly in combination with any one of the light redirection features of any embodiment. Similarly, any one of the light redirection features could be used in an embodiment, possibly in combination with any one of the light reflection features of any embodiment. Thus, for example, a luminaire incorporating a waveguide of one of the disclosed shapes may include redirection and reflection features of the same or a different shape, and the redirection and reflection features may be symmetric or asymmetric, the luminaire may have combinations of features from each of the disclosed embodiments, etc. without departing from the scope of the invention.

The spacing, number, size, and geometry of refraction and extraction features 162 determine the mixing and distribution of light in the waveguide body 102 and light exiting therefrom. At least one (and perhaps more or all) of the refraction and extraction features 162 *r* any or all of the other extraction/refraction/redirection features disclosed herein may be continuous (i.e., the feature extends in a continuous manner), while any remaining extraction features may be continuous or discontinuous ridges or other structures (i.e., partial arcuate and/or non-arcuate features extending continuously or discontinuously) separated by intervening troughs or other structures.

If desired, inflections (e.g., continuous or discontinuous bends) or other surface features may be provided in any of the extraction features disclosed herein. Still further, for example, as seen in the illustrated embodiment of FIG. 11, all of the refraction and extraction features 162 may be symmetric with respect to the center line 172 of the waveguide body 102, although this need not be the case. Further, one or more of the redirection and reflection features 161 or refraction and extraction features 162 may have a texturing on the top surface 150 of the waveguide body 102, or the redirection features and reflection features may be smooth and polished. In any of the embodiments described herein, the top surface 150 of the waveguide body 102 may be textured in whole or in part, or the top surface 150 may be smooth or polished in whole or in part.

In addition to the foregoing, the waveguide body 102 and any other waveguide body disclosed herein may be tapered in an overall sense from the coupling end surface 158 to the end surface in that there is less material in the thickness dimension at the general location of the non-coupling front end surface than at portions adjacent the coupling cavities 142. Such tapering may be effectuated by providing extraction features and/or redirection features that become deeper and/or more widely separated with distance from the coupling cavities 142. The tapering maximizes the possibility that substantially all the light introduced into the waveguide body 102 is extracted over a single pass of the light therethrough. This results in substantially all of the light striking the outward directed surfaces of the redirection and reflection features 161, which surfaces are carefully controlled so that the extraction of light is also carefully controlled. The combination of tapering with the arrangement of redirection and reflection features 161 and refraction and extraction features 162 results in improved color mixing with minimum waveguide thickness and excellent control over the emitted light.

The driver circuit 118 may be adjustable either during assembly of the luminaire 100 or thereafter to limit/adjust electrical operating parameter(s) thereof, as necessary or desirable. For example, a programmable element of the driver circuit 118 may be programmed before or during assembly of the luminaire 100 or thereafter to determine the operational power output of the driver circuit 118 to one or more strings of LED elements 136. A different adjustment methodology/apparatus may be used to modify the operation of the luminaire 100 as desired.

In addition, an adjustable dimming control device may be provided inside the housing 104 and outside the reflective enclosure member 132 that houses the circuit board 140*a*. The adjustable control device may be interconnected with a NEMA ambient light sensor and/or dimming leads of the driver circuit and may control the driver circuit 118. The adjustable dimming control device may include a resistive network and a wiper that is movable to various points in the resistive network. An installer or user may operate (i.e., turn) an adjustment knob or another adjustment apparatus of the control device operatively connected to the wiper to a position that causes the resistive network to develop a signal that commands the output brightness of the luminaire 100 to be limited to no more than a particular level or magnitude, even if the sensor is commanding a luminaire brightness greater than the limited level or magnitude.

If necessary or desirable, the volume of the reflective enclosure member 132 may be increased or decreased to properly accommodate the driver circuit 118 and to permit the driver circuit to operate with adequate cooling. The details of the parts forming the reflective enclosure member 130 may be varied as desired to minimize material while providing adequate strength.

Further, any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, now U.S. Pat. No. 9,791,110, entitled "High Efficiency Driver Circuit with Fast Response" by Hu et al. or U.S. patent application Ser. No. 14/292,001, filed May 30, 2014, now U.S. Pat. No. 9,303,823, entitled "SEPIC Driver Circuit with Low Input Current Ripple" by Hu et al. incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, now U.S. Pat. No. 10,278,250, entitled "Lighting Fixture Providing Variable CCT" by Pope et al. incorporated by reference herein.

Any of the embodiments disclosed herein may include one or more communication components forming a part of the light control circuitry, such as an RF antenna that senses RF energy. The communication components may be included, for example, to allow the luminaire to communicate with other luminaries and/or with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. provisional application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

As noted above, any of the embodiments disclosed herein can be used in many different applications, for example, a parking lot light, a roadway light, a light that produces a wall washing effect, a light usable in a large structure, such as a warehouse, an arena, a downlight, etc. A luminaire as disclosed herein is particularly adapted to develop high intensity light greater than 1000 lumens, and more particularly greater than 10,000 lumens, and can even be configured to develop 35,000 or more lumens by adding LED elements and, possibly, other similar, identical or different waveguide bodies with associated LEDs in a luminaire.

Further, any LED chip arrangement and/or orientation as disclosed in U.S. patent application Ser. No. 14/101,147, filed Dec. 9, 2013, now U.S. Pat. No. 9,869,432, entitled "Luminaire Using Waveguide Bodies and Optical Elements", incorporated by reference herein and owned by the assignee of the present application, may be used in the devices disclosed herein. Where two LED elements are used in each light coupling cavity (as in the illustrated embodiments), it may be desired to position the LEDs elements within or adjacent the coupling cavity along a common vertical axis or the LED elements may have different angular orientations, as desired. The orientation, arrangement, and position of the LEDs may be different or identical in each waveguide body section of a waveguide as desired. Still further, each light coupling cavity may be cylindrical or non-cylindrical and may have a substantially flat shape, a segmented shape, an inclined shape to direct light out a particular side of the waveguide body, etc.

INDUSTRIAL APPLICABILITY

When one uses a relatively small light source which emits into a broad (e.g., Lambertian) angular distribution (common for LED-based light sources), the conservation of etendue, as generally understood in the art, requires an optical system having a large emission area to achieve an asymmetric angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and light distribution. This coupling allows the full range of angular emission from the source, including high-angle light, to be re-directed, resulting in higher optical efficiency in a more compact form factor.

The placement of multiple LED element(s) and the optics of the waveguide bodies overlay the illumination from each LED element onto each other, which further helps color mixing while maintaining a desired photometric distribution. While specific coupling features and extraction feature and/or redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, LED elements, redirection features, color mixing structures and/or cavities, extraction features, etc. described and/or claimed in U.S. patent application Ser. No. 13/842,521, now U.S. Pat. No. 9,519,095, U.S. patent application Ser. No. 13/839,949, now U.S. Pat. No. 9,581,751, U.S. patent application Ser. No. 13/841,074, filed Mar. 15, 2013, now U.S. Pat. No. 9,625,638, entitled "Optical Waveguide Body", U.S. patent application Ser. No. 13/840,563, now U.S. Pat. No. 10,436,969, U.S. patent application Ser. No. 14/101,08, 6, filed Dec. 9, 2013, now U.S. Pat. No. 9,690,029, entitled "Optical Waveguides and Luminaires Incorporating Same", U.S. patent application Ser. No. 14/101,132, filed Dec. 9, 2013, now U.S. Pat. No. 9,442,243, entitled "Waveguide Bodies Including Redirection Features and Methods of Producing Same,", U.S. patent application Ser. No. 14/101, 147, filed Dec. 9, 2013, now U.S. Pat. No. 9,869,432, entitled "Luminaire Using Waveguide Bodies and Optical Elements", U.S. patent application Ser. No. 14/101,129, filed Dec. 9, 2013, now U.S. Pat. No. 10,234,616, entitled "Simplified Low Profile Module with Light Guide for Pendant, Surface Mount, Wall Mount and Stand Alone Luminaires", and U.S. patent application Ser. No. 14/101,051, filed Dec. 9, 2013, now U.S. Pat. No. 9,366,396, entitled "Optical Waveguide and Lamp Including Same", International Application No. PCT/US14/13931, filed Jan. 30, 2014, entitled "Optical Waveguides and Luminaires Incorporating Same", and International Application No. PCT/US14/030017, filed Mar. 15, 2014, entitled "Optical Waveguide Body" incorporated by reference herein and owned by the assignee of the present application may be used in a luminaire, either alone or in combination with one or more additional elements, or in varying combination(s) to obtain light mixing and/or a desired light output distribution. Thus, for example, any of the luminaries disclosed herein disclosed herein may include one or more waveguide bodies including coupling features, one or more light redirection features, one or more extraction features or optics, and/or particular waveguide body shapes and/or configurations as disclosed in such applications, as necessary or desirable. Other waveguide body form factors and luminaries incorporating such waveguide bodies are also contemplated.

At least some of the luminaries disclosed herein are particularly adapted for use in installations, such as outdoor products (e.g., streetlights, high-bay lights, canopy lights; area lights) preferably requiring a total luminaire output of at least about 3,000 lumens or greater, and, in some embodiments, a total luminaire output of up to about 8,000 lumens, and, in other embodiments, a total lumen output from about 10,000 lumens to about 23,000 lumens. Further, the luminaries disclosed herein preferably develop a color temperature of between about 2,500 degrees Kelvin and about 6,200 degrees Kelvin, and more preferably between about 3,000 degrees Kelvin and about 6,000 degrees Kelvin, and, in some embodiments, between about 3,500 degrees Kelvin and about 4,500 degrees Kelvin. Also, at least some of the luminaries disclosed herein preferably exhibit an efficacy of at least about 90 lumens per watt, and more preferably at least about 100 lumens per watt, and more preferably, at least about 110 lumens per watt, and more preferably, about 115 lumens per watt. Also, at least some of the luminaries disclosed herein exhibit an efficacy of about 115 lumens per watt or greater. Further, at least some of the waveguide bodies used in the luminaries disclosed herein preferably exhibit an overall efficiency (i.e., light extracted out of the waveguide body divided by light injected into the waveguide body) of at least about 90 percent. A color rendition index (CRI) of at least about 80 is preferably attained by at least some of the luminaries disclosed herein, with a CRI of at least about 85 being more preferable. The luminaries disclosed herein produce a scotopic to photopic (S/P) ratio of at least 1.4, preferably at least 2.0. Any desired form factor and particular output light distribution, including up and down light distributions or up only or down only distributions, etc. may be achieved.

Embodiments disclosed herein are capable of complying with improved operational standards as compared to the prior art as follows:

TABLE-US-00001 State of the art Improved standards achievable standards by present embodiments Input coupling 90% About 95% plus improvements efficiency (coupling+through color mixing, source waveguide body) mixing, and control within the waveguide body Output efficiency 90% About 95%: improved through (extraction) extraction efficiency plus controlled distribution of light from the waveguide body Total system ~80% About 90%: great control, many choices of output distribution In certain embodiments, the waveguide bodies used in the luminaries disclosed herein may generally taper from a first edge to a second edge thereof so that substantially all light is extracted during a single pass of each light ray from the LED element(s) to the second edge of the waveguide body. This extraction strategy maximizes the incidence of light rays impinging on an outer side of each extraction feature and being reflected out a surface (or surfaces) of the waveguide body in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Still further, the waveguide body is very low profile, leaving more room for heat exchanger structures, driver components, and the like in the luminaire. Also, glare is reduced as compared with other lamps using LED light sources because light is directed outwardly in the waveguide body while being extracted from the waveguide body by the extraction features such that the resulting emitted light is substantially mixed and substantially uniformly distributed throughout the beam angle. The result is a light distribution that is pleasing and particularly useful for general illumination and other purposes using a light source, such as one or more LED element(s).

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite. Any of these conditions may be satisfied by the luminaires utilizing waveguide bodies disclosed herein through appropriate modification thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A lighting device, comprising:

a body of optically transmissive material defined by an exterior top surface and an exterior bottom surface and exhibiting a total internal reflection characteristic and comprising:

a light input surface;

a light extraction portion spaced from the light input surface;

a light transmission portion disposed between the light input surface and the light extraction portion, wherein light received at the light input surface propagates through the light transmission portion with a directional component in a first direction and no substantial directional component opposite to the first direction where the first direction extends from the light input surface toward the light extraction portion;

a back adjacent the light input surface; and a front opposite to the back;

wherein the light extraction portion comprises at least one light redirection feature and at least one light extraction feature that cooperate to:

direct a first portion of light out of the body in a second direction where the second direction comprises a directional component opposite to the first direction; and direct a second portion of light out of the body in a third direction comprising a directional component along the first direction;

wherein the first portion of light and the second portion together generate a light pattern that is substantially even with respect to the front and back of the body.

2. The lighting device of claim 1, wherein the at least one light extraction feature comprises a first light extraction feature that is proximal to the light input surface and a second light extraction feature that is distal from the light input surface relative to the first light extraction feature.

3. The lighting device of claim 2, wherein the first light extraction feature and the second light extraction feature comprise a refraction portion.

4. The lighting device of claim 1, wherein the at least one light redirection feature comprises a light reflection surface for reflecting light toward the at least one light extraction feature.

5. The lighting device of claim 1, wherein the body comprises a width dimension, a length dimension, and a thickness dimension, and wherein the at least one light extraction feature is curved in at least one of the thickness dimension, the width dimension and the length dimension.

6. The lighting device of claim 1, wherein the at least one light redirection feature comprises a first light redirection feature and a second light redirection feature.

7. The lighting device of claim 6, wherein the first light redirection feature and the second light redirection feature are formed as ridges on a surface of the body.

8. The lighting device of claim 6, wherein the first light redirection feature receives light comprising a directional component opposite to the first direction and the second light redirection feature receives light comprising a directional component along the first direction.

9. The lighting device of claim 6, wherein the light transmission portion directs light to the first light redirection feature in a first direction and to the second light redirection feature in a second direction.

10. The lighting device of claim 1, wherein the first portion of light and the second portion of light are approximately equal.

11. The lighting device of claim 1, wherein the first portion of light and the second portion of light together generate a light pattern that is one of substantially square and substantially circular.

12. A luminaire, comprising:

a body of optically transmissive material defined by an exterior first surface and an opposed exterior second surface and exhibiting a total internal reflection characteristic and comprising:

a light input surface for directing light into the body generally along a first direction;

a light extraction portion spaced from the light input surface; and a light transmission portion at least partially surrounding the light extraction portion, wherein light received at the light input surface propagates through the light transmission portion with a directional component in the first direction extending from the light input surface toward the light extraction portion;

wherein the body comprises a width dimension, a length dimension, and a thickness dimension; and wherein the light extraction portion comprises at least one light redirection feature and at least one light extraction feature that cooperate to:

direct a first portion of light out of the body in a second direction where the second direction comprises a directional component opposite to the first direction; and direct a second portion of light out of the body in a third direction comprising a directional component along the first direction;

wherein the first portion of light and the second portion together generate a light pattern that is one of substantially square and substantially circular; and a luminaire housing comprising a mounting apparatus that mounts the body in an orientation such that at least one of the length dimension and the width dimension extend in a substantially horizontal direction and the thickness dimension extends in a substantially vertical direction.

13. The luminaire of claim 12, wherein the at least one light extraction feature comprises a first light extraction feature proximal the light input surface and a second light extraction feature distal from the light input surface relative to the first light extraction feature.

14. The luminaire of claim 12, wherein the at least one light extraction feature comprises a refraction portion.

15. The luminaire of claim 12, wherein the at least one light redirection feature further comprises a light reflection surface for reflecting light toward the at least one light extraction feature.

16. The luminaire of claim 12, wherein the at least one light extraction feature is curved in at least one of the thickness dimension, the width dimension and the length dimension.

17. A luminaire, comprising:

a body of optically transmissive material defined by an exterior first surface and an opposed exterior second surface and exhibiting a total internal reflection characteristic and comprising:

a light input surface for directing light into the body primarily along a first direction;

a light extraction portion spaced from the light input surface; and a light transmission portion disposed between the light input surface and the light extraction portion and at least partially surrounding the light extraction portion, wherein light received at the light input surface propagates through the light transmission portion with a directional component in the first direction extending from the light input surface toward the light extraction portion;

a back adjacent the light input surface; and a front opposite to the back;

wherein the body comprises a width dimension, a length dimension, and a thickness dimension;

wherein the light extraction portion comprises at least one light redirection feature and at least one light extraction feature that cooperate to:

direct a first portion of light out of the body in a second direction where the second direction comprises a directional component opposite to the first direction; and direct a second portion of light out of the body in a third direction comprising a directional component along the first direction;

wherein the first portion of light and the second portion together generate a light pattern that is substantially even with respect to the front and back of the body; and a luminaire housing comprising a mounting apparatus that mounts the body in an orientation such that at least one of the length dimension and the width dimension extend in a substantially vertical direction and the thickness dimension extends in a substantially horizontal direction.

18. The luminaire of claim 17, wherein the at least one light extraction feature comprises a first light extraction feature proximal the light input surface and a second light extraction feature distal from the light input surface relative to the first light extraction feature.

19. The luminaire of claim 18, wherein the first light extraction feature and the second light extraction feature comprise a refraction portion.

20. The luminaire of claim 18, wherein the at least one light extraction surface is curved in at least one of the thickness dimension and the width dimension and the length dimension.

21. The luminaire of claim 17, wherein the at least one light redirection feature further comprises a light reflection surface for reflecting light toward the at least one light extraction feature.

22. A lighting device, comprising:

a body of optically transmissive material exhibiting a total internal reflection characteristic and comprising:

a light input surface for directing light into the body in a first direction;

a light extraction portion spaced from the light input surface; and a light transmission portion disposed between the light input surface and the light extraction portion;

wherein the light extraction portion comprises at least one light redirection feature and at least one light extraction feature that cooperate to:

direct a first portion of light out of the body in a second direction comprising a directional component opposite to the first direction; and direct a second portion of light out of the body in a third direction comprising a directional component along the first direction;

wherein the at least one light redirection feature comprises a first light redirection feature and a second light redirection feature and wherein the first light redirection feature and the second light redirection feature are curved and form concentric semi-circles.

* * * * *